(12) United States Patent
Hsieh et al.

(10) Patent No.: US 12,269,935 B2
(45) Date of Patent: Apr. 8, 2025

(54) NANOCELLULOSE AEROGELS AND FOAMS

(71) Applicant: THE REGENTS OF THE UNIVERSITY OF CALIFORNIA, Oakland, CA (US)

(72) Inventors: You-Lo Hsieh, Oakland, CA (US); Feng Jiang, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 677 days.

(21) Appl. No.: 17/558,125

(22) Filed: Dec. 21, 2021

(65) Prior Publication Data

US 2022/0195148 A1    Jun. 23, 2022

Related U.S. Application Data

(62) Division of application No. 16/362,297, filed on Mar. 22, 2019, now Pat. No. 11,248,107.

(Continued)

(51) Int. Cl.
| | |
|---|---|
| *C08L 1/02* | (2006.01) |
| *B82Y 40/00* | (2011.01) |
| *C08B 15/00* | (2006.01) |
| *C08B 15/10* | (2006.01) |
| *C08G 18/76* | (2006.01) |

(Continued)

(52) U.S. Cl.
CPC .............. *C08L 1/02* (2013.01); *C08B 15/005* (2013.01); *C08B 15/10* (2013.01); *C08G 18/7657* (2013.01); *C08J 9/0085* (2013.01); *C08J 9/28* (2013.01); *C08K 5/5406* (2013.01); *C08L 1/12* (2013.01); *H01G 11/36* (2013.01); *B82Y 40/00* (2013.01)

(58) Field of Classification Search
CPC ......... C08L 1/02; C08L 1/12; C08G 18/7657; C08K 5/5406; H01G 11/36; C08B 15/005; C08B 15/10; C08J 9/28; C08J 9/0085; B82Y 40/00
USPC ........................................................ 521/50
See application file for complete search history.

(56) References Cited

U.S. PATENT DOCUMENTS 9,255,008 B2    2/2016  Howard et al.
10,077,193 B2 *  9/2018  Kugimiya ............. C01B 33/155
(Continued)

FOREIGN PATENT DOCUMENTS

| CN | 104264260 A | 1/2015 |
| WO | 2017116598 A1 | 7/2017 |
| WO | 2020087075 A1 | 4/2020 |

OTHER PUBLICATIONS

Khasim, Journal of Electronic Materials, 2017, 46(7), 4439-4447.
(Continued)

*Primary Examiner* — Michael M. Bernshteyn
(74) *Attorney, Agent, or Firm* — Mintz, Levin, Cohn, Ferris, Glovsky and Popeo, P.C.

(57) ABSTRACT

The present disclosure provides a method for preparing an aerogel or a foam, the method comprising: forming a reaction mixture comprising a cellulose nanofibril gel, a first solvent, and one or more crosslinking agents under conditions sufficient to crosslink the gel; and contacting the crosslinked gel with a second solvent under conditions sufficient to dry the crosslinked gel, thereby forming an aerogel or foam.

9 Claims, 51 Drawing Sheets

Related U.S. Application Data

(60) Provisional application No. 62/649,915, filed on Mar. 29, 2018.

(51) Int. Cl.
  *C08J 9/00* (2006.01)
  *C08J 9/28* (2006.01)
  *C08K 5/54* (2006.01)
  *C08L 1/12* (2006.01)
  *H01G 11/36* (2013.01)

(56) References Cited

U.S. PATENT DOCUMENTS

| | | | |
|---|---|---|---|
| 10,350,576 B2* | 7/2019 | Gong | B01J 20/267 |
| 11,248,107 B2* | 2/2022 | Hsieh | C08J 9/28 |
| 11,549,854 B2 | 1/2023 | Hsieh et al. | |
| 11,654,409 B2* | 5/2023 | Bertino | B01J 13/0091 |
| | | | 521/64 |
| 2012/0216718 A1 | 8/2012 | Berglund et al. | |
| 2014/0134415 A1 | 5/2014 | Gong et al. | |
| 2015/0114907 A1* | 4/2015 | Gong | B01J 20/28023 |
| | | | 210/660 |
| 2015/0321921 A1* | 11/2015 | Zeng | C01B 33/14 |
| | | | 423/338 |
| 2016/0010279 A1 | 1/2016 | Hu et al. | |
| 2018/0040806 A1 | 2/2018 | Gong et al. | |
| 2019/0309144 A1* | 10/2019 | Hsieh | H01G 11/34 |
| 2020/0339783 A1 | 10/2020 | Cunha et al. | |
| 2020/0353437 A1* | 11/2020 | Bertino | C08J 3/075 |
| 2020/0363273 A1 | 11/2020 | Hsieh et al. | |
| 2021/0156051 A1 | 5/2021 | Hsieh et al. | |
| 2021/0381167 A1 | 12/2021 | Hsieh et al. | |

OTHER PUBLICATIONS

Li et al., "Direct Ink Write 3D Printed Cellulose Nanofiber Aerogel Structures with Highly Deformable, Shape Recoverable, and Functionalizable Properties", ACS Sustainable Chemistry & Engineering 2018, 6(2), 2011-2022.

Yang, "Flexible highly specific capacitance aerogel electrodes based on cellulose nanofibers, carbon nanotubes and polyaniline", Electrochimica Acta, 2015, 182, 264-271.

International Search Report and Written Opinion received for PCT Application No. PCT/US2019/058376, mailed on Jan. 13, 2020, 9 pages.

Gao et al. (2010) "Epitaxial Graphene on Cu(111)", Nano Letters, 10(9):3512-3516.

Geim, A.K. (Jun. 19, 2009) "Graphene: Status and Prospects", Science, 324(5934):1530-1534.

Isobe et al. (Jan. 8, 2018) "Clear Transparent Cellulose Nanopaper Prepared from a Concentrated Dispersion by High-Humidity Drying", RSC Advances, 8(8):1833-1837.

Jiang et al. (2014) "Amphiphilic superabsorbent cellulose nanofibril aerogels", Journal of Materials Chemistry A, 2(18):6337-6342.

Jiang et al. (2017) "Cellulose Nanofibril Aerogels: Synergistic Improvement of Hydrophobicity, Strength, and Thermal Stability via Cross-Linking with Diisocyanate", ACS Applied Materials & Interfaces, 9(3):2825-2834.

Jiang et al. (2013) "Chemically and Mechanically Isolated Nanocellulose and Their Self-assembled Structures", Carbohydrate Polymers, 95(1):32-40.

Jiang et al. (2013) "Controlled Defibrillation of Rice Straw Cellulose and Self-assembly of Cellulose Nanofibrils into Highly Crystalline Fibrous Materials†", RSC Advances, 3:12366-12375.

Jiang et al. (2018) "Dual Wet and Dry Resilient Cellulose II Fibrous Aerogel for Hydrocarbon-Water Separation and Energy Storage Applications", ACS Omega, 3(3):3530-3539.

Jiang et al. (2016) "Self-assembling of TEMPO Oxidized Cellulose Nanofibrils as Affected by Protonation of Surface Carboxyls and Drying Methods", ACS Sustainable Chemistry & Engineering, 4(3):1041-1049.

Kobayashi et al. (Sep. 22, 2014) "Aerogels with 3D Ordered Nanofiber Skeletons of Liquid-Crystalline Nanocellulose Derivatives as Tough and Transparent Insulators†", Angewandte Chemie—International Edition, 53(39):10394-10397.

Lotya et al. (Mar. 2009) "Liquid Phase Production of Graphene by Exfoliation of Graphite in Surfactant/Water Solutions", Journal of the American Chemical Society, 131(10):3611-3620.

Lu et al. (2012) "Preparation and Characterization of Cellulose Nanocrystals from Rice Straw", Carbohydrate Polymers, 87(1):564-573.

Pääkkö et al. (2008) "Long and Entangled Native Cellulose I Nanofibers Allow Flexible Aerogels and Hierarchically Porous Templates for Functionalities", Soft Matter, 4(12):2492-2499.

Paton et al. (2014) "Scalable Production of Large Quantities of Defect-free Few-layer Graphene by Shear Exfoliation in Liquids", Nature Materials, 13(6):624-630.

Sehaqui et al. (2010) "Mechanical Performance Tailoring of Tough Ultra-High Porosity Foams Prepared from Cellulose I Nanofiber Suspensions", Soft Matter, 6:1824-1832.

Wicklein et al. (2015) "Thermally Insulating and Fire-retardant Lightweight Anisotropic Foams Based on Nanocellulose and Graphene Oxide", Nature Nanotechnology, 10:277-283.

Xu et al. (2019) "Aqueous Exfoliated Graphene by Amphiphilic Nanocellulose and its Application in Moistureresponsive Foldable Actuators†", Nanoscale, 11:11719-11729.

Xu et al. (Mar. 22, 2013) "Cellulose Nanocrystals vs. Cellulose Nanofibrils: A Comparative Study on Their Microstructures and Effects as Polymer Reinforcing Agents", ACS Applied Materials & Interfaces, 5(8):2999-3009.

Xu et al. (May 12, 2014) "Comparison Between Cellulose Nanocrystal and Cellulose Nanofibril Reinforced Poly(ethylene oxide) Nanofibers and Their Novel Shish-Kebab-Like Crystalline Structures", Macromolecules, 47:3409-3416.

Zhang et al. (2014) "Ultralightweight and Flexible Silylated Nanocellulose Sponges for the Selective Removal of Oil from Water", Chemistry of Materials, 26:2659-2668.

Zhou et al. (Aug. 9, 2018) "Conductive Polymer Protonated Nanocellulose Aerogels for Tunable and Linearly Responsive Strain Sensors", ACS Applied Materials & Interfaces, 10:27902-27910.

Zhou et al. (Jun. 12, 2013) "Improving Electrical Conductivity in Polycarbonate Nanocomposites Using Highly Conductive PEDOT/PSS Coated MWCNTs", ACS Applied Materials & Interfaces, 5(13):6189-6200.

Zhou et al. (2020) "Nanocellulose Aerogel-based Porous Coaxial Fibers for Thermal Insulation", Nano Energy, 68(104305):9 pages.

Zhou et al. (Feb. 14, 2014) "Probing the Role of Poly(3,4-ethylenedioxythiophene)/Poly(styrenesulfonate)-Coated Multiwalled Carbon Nanotubes in the Thermal and Mechanical Properties of Polycarbonate Nanocomposites", Industrial & Engineering Chemistry Research, 53(9):3539-3549.

* cited by examiner

FIG. 28C
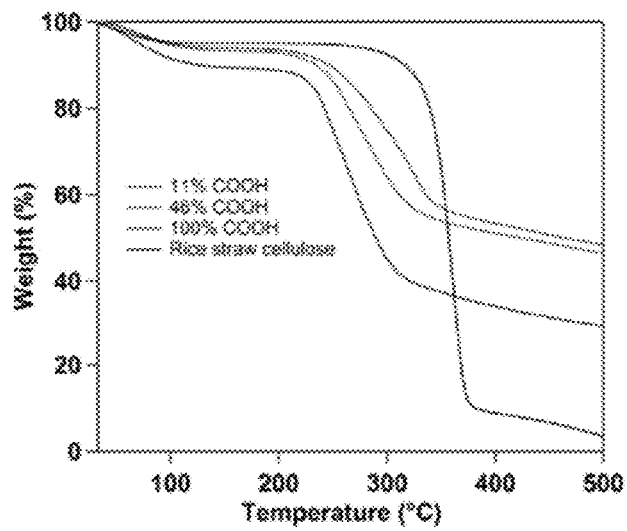
FIG. 28D
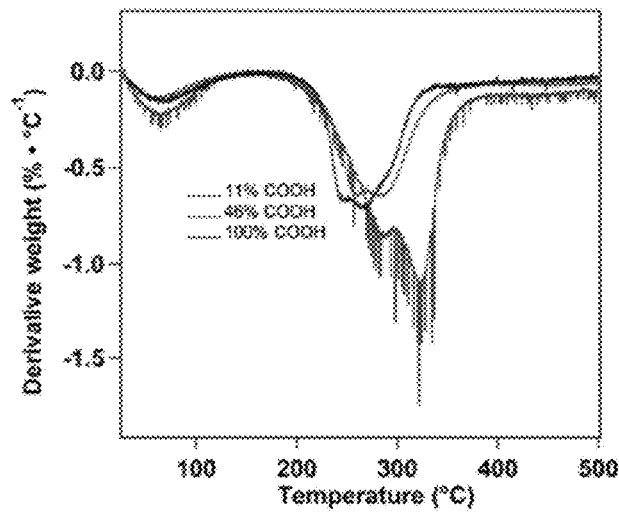
FIG. 28E
| Aerogel Samples | $T_{max1}$ (°C) | $T_{max1}$ (°C) | Char (%) | CrI (%) |
|---|---|---|---|---|
| 11% COOH | 269 | N/A | 29.6 | 75 |
| 45% COOH | 285 | N/A | 14.3 | 73 |
| 100% COOH | 289 | 322 | 17.4 | 71 |

NANOCELLULOSE AEROGELS AND FOAMS

CROSS-REFERENCES TO RELATED APPLICATIONS

This application is a continuation of U.S. application Ser. No. 16/362,297, filed Mar. 22, 2019 which claims the benefit of U.S. Provisional Application No. 62/649,915 filed Mar. 29, 2018, which is incorporated herein in its entirety for all purposes.

BACKGROUND OF THE INVENTION

Aerogels are uniquely ultra-light and ultra-porous materials with over 99.5% porosity or volume filled with air debuted in early 1930s. While most aerogels are silica or carbon based, those derived from sustainable and renewable materials are particular enticing, among which, cellulose aerogels present novel attributes such as low thermal conductivity, flexibility, excellent wet resiliency, etc. Cellulose aerogels have been most commonly produced by multi-step sol-gel processes involving cellulose dissolution, regeneration in non-solvents and solvent exchange to suitable media for either supercritical-drying or freeze-drying, demanding the use of large quantities of chemicals, such as N-methylmorpholine-N-oxide (NMMO), alkali hydroxide/urea, sodium hydroxide, calcium thiocyanate tetrahydrate, lithium chloride/dimethylacetamine (LiCl/DMAc), [11]lithium chloride/dimethyl sulfoxide (LiCl/DMSO) and ionic liquid, etc. As dissolution destroys the native cellulose I crystalline structure, the regenerated structures are either amorphous or cellulose II structure. Nanocelluloses are the crystalline domains of original sources isolated without dissolution, thus retain the cellulose I crystalline structure and represent much greener and stronger precursor for aerogels. The as fabricated nanocellulose aerogels have been extensively investigated for air/water pollutant removal, drug delivery, biomedical scaffolding, electrochemical applications, energy storage, sensors, and insulating materials.

2,2,6,6-tetramethylpyperidine-1-oxyl (TEMPO) oxidation aided with gentle mechanical treatment could convert over 97% of pure cellulose from rice straw into highly crystalline (60-70%) and ultrathin (1-2 nm) nanofibrils with high aspect ratios (500-1000). Freezing of TEMPO oxidized rice straw cellulose nanofibrils (CNFs) suspension at −20° C. followed by freeze-drying yielded honeycomb structured porous aerogel with ultra-high water absorption capacity of 116-210 g/g, excellent wet resiliency to fully recover to its original shape after 100 compression-recovery cycles and super amphiphilicity to absorb not only water but also non-polar liquids (up to 375 g/g chloroform). However, the major drawback of these CNF aerogels are their weak dry strength (Young's modulus of 54 kPa at 8.1 mg/cm$^3$ density) even though it increases modestly with increasing densities. While CNF aerogels are amphiphilic super absorbents, hydrophobization via atomic layer deposition of $TiO_2$ or vapor deposition of organosilane tunes the absorbency to selectively favor nonpolar liquids to favor applications such as oil-water separation. Neither of surface modification alters the mechanical properties of the aerogels.

The goal of this work was to simultaneously improve the mechanical properties and tune the amphiphilicity of CNF aerogels and cellulose submicron fiber aerogels. The approaches described include modification of physical and chemical properties (density, porosities, amphililicity, hydrophilicity, hydrophobicity, surfaces charges) to simultaneously improve absorption capacity, mechanical properties and hydrophobicity of CNF aerogels and cellulose submicron fiber aerogels.

BRIEF SUMMARY OF THE INVENTION

In one embodiment, the present invention provides a method for preparing an aerogel or a foam, the method comprising forming a reaction mixture comprising a cellulose nanofibril gel, a first solvent, and one or more crosslinking agents under conditions sufficient to crosslink the gel; and contacting the crosslinked gel with a second solvent under conditions sufficient to dry the crosslinked gel, thereby forming an aerogel or foam.

In another embodiment, the present invention provides a method for preparing an aerogel or a foam, the method comprising: freezing an aqueous suspension comprising cellulose nanofibrils, cellulose sub-micron fibers, or a combination thereof; freeze-drying the frozen suspension, thereby forming an aerogel or foam; and at least one of the following: (1) contacting the aerogel or foam with an organosilane under conditions sufficient to deposit the organosilane onto the aerogel or foam; or (2) heating the aerogel or foam under conditions sufficient to carbonize the aerogel or foam.

In another embodiment, the present invention provides an aerogel or foam prepared by the method comprising forming a reaction mixture comprising a cellulose nanofibril gel, a first solvent, and one or more crosslinking agents under conditions sufficient to crosslink the gel; and contacting the crosslinked gel with a second solvent under conditions sufficient to dry the crosslinked gel, thereby forming an aerogel or foam.

In another embodiment, the present invention provides an aerogel or foam prepared by the method comprising: freezing an aqueous suspension comprising cellulose nanofibrils, cellulose sub-micron fibers, or a combination thereof; freeze-drying the frozen suspension, thereby forming an aerogel or foam; and at least one of the following: (1) contacting the aerogel or foam with an organosilane under conditions sufficient to deposit the organosilane onto the aerogel or foam; or (2) heating the aerogel or foam under conditions sufficient to carbonize the aerogel or foam.

In another embodiment, the present invention provides a supercapacitor electrode comprising the aerogel or foam prepared by the method comprising: freezing an aqueous suspension comprising cellulose nanofibrils, cellulose sub-micron fibers, or a combination thereof; freeze-drying the frozen suspension, thereby forming an aerogel or foam; and at least one of the following: (1) contacting the aerogel or foam with an organosilane under conditions sufficient to deposit the organosilane onto the aerogel or foam; or (2) heating the aerogel or foam under conditions sufficient to carbonize the aerogel or foam.

BRIEF DESCRIPTION OF THE DRAWINGS

FIG. 1A shows the appearance of HCl (left) and FT (right) hydrogels. FIG. 1B shows the appearance of HCl (left) and FT (right) aerogels. FIG. 1C shows the visible light transmittance of aq. 0.6% CNFs and hydrogels (2 mm thick).

FIG. 2A shows an SEM image of FT-CNF aerogels when the scale bar is 500 μm. FIG. 2B shows an SEM image of FT-CNF aerogels when the scale bar is 2 μm. FIG. 2C shows an SEM image of FT-CNF aerogels when the scale bar is 500 nm. FIG. 2D shows an SEM image of HCl-CNF aerogels when the scale bar is 500 µm. FIG. 2E shows an SEM image of HCl-CNF aerogels when the scale bar is 2 µm. FIG. 2F shows an SEM image of HCl-CNF aerogels when the scale bar is 500 nm.

FIG. 3A shows BET specific surface, inset are specific surface area and total pore volume. FIG. 3B shows BJH pore size distribution. FIG. 3C shows a TGA spectra of FT-CNF and HCl aerogels. FIG. 3D shows compression stress-strain curve of FT-CNF and HCl-CNF aerogels.

FIG. 4A shows an SEM image when the CNF:MDI ratio is 1:1 and the scale bar is 50 µm. FIG. 4B shows an SEM image when the CNF:MDI ratio is 1:2 and the scale bar is 50 µm. FIG. 4C shows an SEM image when the CNF:MDI ratio is 1:4 and the scale bar is 50 µm. FIG. 4D shows an SEM image when the CNF:MDI ratio is 1:1 and the scale bar is 2 µm. FIG. 4E shows an SEM image when the CNF:MDI ratio is 1:2 and the scale bar is 50 µm. FIG. 4F shows an SEM image when the CNF:MDI ratio is 1:4 and the scale bar is 50 µm.

FIG. 5A shows a FTIR spectra. FIG. 5B shows a TGA spectra.

FIG. 9A shows phase-separated 1:1 v/v water-chloroform (dyed in red). FIG. 9B shows filtration setup with the CNF4MDI aerogel placed between the clap, water retained above and the denser chloroform passed through into the flask below. FIG. 9C shows purified water after filtration. FIG. 9D shows CNF4MDI before filtration. FIG. 9E shows CNF4MDI after filtration.

FIG. 10A shows ES cellulose membrane pieces before blending. FIG. 10B shows ES cellulose membrane pieces after blending.

FIG. 13A shows the absorption capacity and density. FIG. 13B shows the absorption ratio and density.

FIG. 14A shows an image of 0.1% wt of the ultra-fine ES cellulose aerogel. FIG. 14B shows an image of 0.2% wt of the ultra-fine ES cellulose aerogel. FIG. 14C shows an image of 0.3% wt of the ultra-fine ES cellulose aerogel. FIG. 14D shows an image of 0.4% wt of the ultra-fine ES cellulose aerogel. FIG. 14E shows an image of 0.5% wt of the ultra-fine ES cellulose aerogel. FIG. 14F shows an image of 0.6% wt of the ultra-fine ES cellulose aerogel. FIG. 14G shows an image of the original ES membrane. FIG. 14H shows an image of an assembled 0.1% ES aerogel.

FIG. 20A shows the absorption capacity of ES cellulose aerogel in g/g in relation to density. FIG. 20B shows the absorption capacity of ES cellulose aerogel in mL/g in relation to density.

FIG. 23A shows the lateral dimension distribution of CNF height. FIG. 23B shows the lateral dimension distributions by AFM. FIG. 23C shows the corresponding height profile along the line in FIG. 23B. FIG. 23D shows the lateral dimension distribution of CNF width. FIG. 23E shows the lateral dimension distributions by TEM. FIG. 23F shows the effect of protonation on COO$^-$Na$^+$/COOH content (mmol/g CNF) by conductometric titration.

FIG. 24A shows CNFs with 11% COOH and radial cross-sections. FIG. 24B shows CNFs with 11% COOH and longitudinal cross-sections. FIG. 24C shows CNFs with 11% COOH and external surfaces. FIG. 24D shows CNFs with 46% COOH and radial cross-sections. FIG. 24E shows CNFs with 46% COOH and longitudinal cross-sections. FIG. 24F shows CNFs with 46% COOH and external surfaces. FIG. 24G shows CNFs with 100% COOH and radial cross-sections. FIG. 24H shows CNFs with 100% COOH and longitudinal cross-sections. FIG. 24I shows 100% COOH and external surfaces.

FIG. 25A shows radial cross sections of 11% COOH aerogel with a scale bar of 10 μm. FIG. 25B shows radial cross sections of 11% COOH aerogel with a scale bar of 500 m with the inset at 1 mm. FIG. 25C shows radial cross sections of 100% COOH aerogel with a scale bar of 10 μm. FIG. 25D shows radial cross sections of 100% COOH aerogel with a scale bar of 500 μm, with the inset at 500 μm.

FIG. 26A shows incremental compression (0.4 to 0.8 strain, loading and unloading) of 0.6 wt % CNF aerogels of 11% COOH aerogel. FIG. 26B shows incremental compression (0.4 to 0.8 strain, loading and unloading) of 0.6 wt % CNF aerogels of 46% COOH aerogel. FIG. 26C shows shows incremental compression (0.4 to 0.8 strain, loading and unloading) of 0.6 wt % CNF aerogels of 100% COOH aerogel.

FIG. 28C shows the effect of protonation on aerogel chemistry, thermal behavior, and recrystallization in an TGA spectra of CNF aerogels from 0.6% wt CNF suspension. FIG. 28D shows the effect of protonation on aerogel chemistry, thermal behavior, and recrystallization in an dTGA spectra of CNF aerogels from 0.6% wt CNF suspension. FIG. 28E shows tabulation of data showing maximum degradation temperature[s]($T_{max}$), char residues at 500° C., and crystallinity index (CrI).

FIG. 29A shows a SEM image of aerogel in hydrophilic borosilicate glass showing radial cross-sections. FIG. 29B shows a SEM image of aerogel in hydrophilic borosilicate glass showing longitudinal cross-sections. FIG. 29C shows a SEM image of aerogel in hydrophilic borosilicate glass showing external surfaces. FIG. 29D shows a SEM image of aerogel in polypropylene showing radial cross-sections. FIG. 29E shows a SEM image of aerogel in polypropylene showing longitudinal cross-sections. FIG. 29F shows a SEM image of aerogel in polypropylene showing external surfaces.

FIG. 30A shows aerogel from borosilicate glass mold. FIG. 30B shows aerogel from borosilicate glass mold. FIG. 30C shows aerogel from borosilicate glass mold. FIG. 30D shows aerogel from polypropylene mold. FIG. 30E shows aerogel from polypropylene mold. FIG. 30F shows aerogel from polypropylene mold.

DETAILED DESCRIPTION OF THE INVENTION

I. General

Figure 1A:
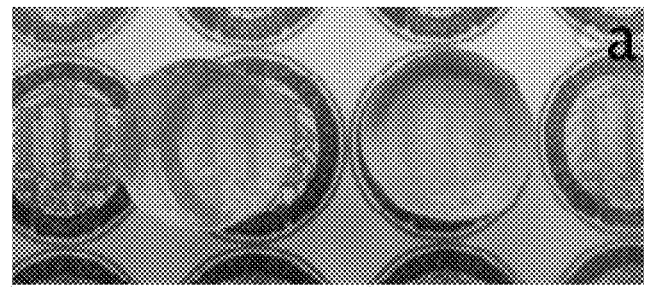
FIG. 1A-1C show the appearance of HCl and FT CNFs.

The present invention provides methods of making aerogels. The present invention provides methods of making cellulose nanofibril aerogels or cellulose sub-micron fiber aerogels, or a combination thereof. The present invention also provides a supercapacitor electrode comprising the aerogels prepared by methods of the present invention.

II. Definitions

Unless specifically indicated otherwise, all technical and scientific terms used herein have the same meaning as commonly understood by those of ordinary skill in the art to which this invention belongs. In addition, any method or material similar or equivalent to a method or material described herein can be used in the practice of the present invention. For purposes of the present invention, the following terms are defined.

"A," "an," or "the" as used herein not only include aspects with one member, but also include aspects with more than one member. For instance, the singular forms "a," "an," and "the" include plural referents unless the context clearly dictates otherwise. Thus, for example, reference to "a cell" includes a plurality of such cells and reference to "the agent" includes reference to one or more agents known to those skilled in the art, and so forth.

"Aerogel" refers to a porous solid material with high porosity and low density. The pores of the aerogel allow for passage of gas or liquid phase molecules through the material. Representative aerogels include inorganic aerogels (such as silicon-derived aerogels), organic aerogels (such as carbon-derived aerogels), and inorganic/organic hybrid aerogels. Organic aerogels include, but are not limited to cellulose aerogels, urethane aerogels, resorcinol formaldehyde aerogels, polyolefin aerogels, melamine-formaldehyde aerogels, phenol-furfural aerogels and polyimide aerogels.

"Foam" refers to a material formed with pockets of gas in a liquid or solid.

"Cellulose nanofibril gel" refers to cellulose nanofibrils fabricated into a gel form. Suitable fabrication methods include, but are not limited to, using aqueous cellulose nanofibril suspensions to form hydrogels to fabricate cellulose nanofibril gels.

"Cellulose nanofibrils" (CNF) refers to a type of nanocellulose wherein the nanofibrils are formed from cellulose. The cellulose may be chemically modified or unmodified. Nanocellulose refers to a relatively crystalline cellulose in either rod-like or fibril-like forms with nanometer scale lateral dimensions and hundreds to thousands of nm in lengths.

"Cellulose sub-micron fibers" refers to submicron-sized fibers formed from cellulose. The cellulose may be chemically modified or unmodified.

"Crosslinking agents" refers to compounds which interconnect two solid materials. A crosslinking agent is typically a bifunctional compound wherein one or more reactive functional group reacts with one solid support or material and one or more reactive functional group reacts with another solid support or material, thereby linking the two solid support or material members to each other. Representative examples of crosslinking agents include, but are not limited to, diisocyanates, polymers, coated polymers, amino acids, di(meth)acrylates, bisacrylamide, and divinylbenzenes.

"Drying" refers to a dehydration process which removes nearly all the liquid and/or moisture from the material. Representative drying methods of the present invention include, but are not limited to, freeze-drying, air-drying, supercritical-drying, vacuum drying, dielectric drying, and heating.

"Freeze-drying" refers to a low temperature dehydration process, and in some embodiments is referred to as lyopholisation or cryodesiccation. Freeze-drying refers to a process wherein liquid is removed from the material by first freezing the liquid in the product, and then lowering the pressure and removing the frozen liquid by sublimation.

"Acid" refers to a compound that is capable of donating a proton ($H^+$) under the Bronsted-Lowry definition, or is an electron pair acceptor under the Lewis definition. Acids useful in the present invention are Bronsted-Lowry acids that include, but are not limited to, alkanoic acids or carboxylic acids (formic acid, acetic acid, citric acid, lactic acid, oxalic acid, etc.), sulfonic acids and mineral acids, as defined herein. Mineral acids are inorganic acids such as hydrogen halides (hydrofluoric acid, hydrochloric acid, hydrobromice acid, etc.), halogen oxoacids (hypochlorous acid, perchloric acid, etc.), as well as sulfuric acid, nitric acid, phosphoric acid, chromic acid and boric acid. Sulfonic acids include methanesulfonic acid, benzenesulfonic acid, p-toluenesulfonic acid, triflouromethanesulfonic acid, among others.

"Diisocyanate" refers to a compound which comprises two isocyanate functional groups on the ends of the compound. Diisocyantes may react with polyols to form urethane linkages. Diisocyanates useful in the present invention include, but are not limited to, methylene diphenyl diisocyanate (MDI), toluene diisocyanate (TDI), isophorone diisocyante (IPDI), methylene dicyclohexyl diisocyante (HMDI), and mexamethelene diisocyante (HDI).

"Coated polymers" refers to polymers coated onto aerogels. Examples of coated polymers include soluble organic polymers, such as, but not limited to cellulose esters.

"Organosilane" refers to organic compound derivatives which contain a silicon atom bonding to at least one carbon atom.

"Carbonize" refers to a process of conversion of a carbon-containing source or material to form a material comprising primarily carbon. Carbonization is typically performed at high temperature.

"Electrospinning" refers to a fiber production method which uses electric force to draw charged threads of polymer solutions or polymer melts wherein the fiber diameters can be as small as some hundred nanometers.

"Hydrolysis" refers to a chemical reaction wherein water molecules are consumed, for example, in the conversion of an ester to an acid and an alcohol, or in the separation of compounds, macromolecules, polymers, biomolecules, or gels.

"Mechanical dispersion" refers to a process wherein the solutes and/or precipitates in a solution are mechanically mixed. Mechanical mixing may include, but is not limited to, high speed blending, shaking the solution, or using a stir bar and stir plate.

"Absorption capacity" refers to the difference in weight between a fully saturated aerogel and dry aerogel, divided by the weight of the dry aerogel. The liquid of the saturated aerogel can be an organic liquid or water. Absorption capacity also comprises organic liquid absorption capacity, wherein the saturation is in an organic liquid. The formula to determine absorption capacity is represented by formula (I):

$$\text{Absorption capacity} = \frac{(w_e - w_o)}{w_o} \quad (I)$$

wherein $w_e$ and $w_o$ are the weights of fully saturated and dry aerogels, respectively. The units for absorption capacity can be volume over mass, such as mL/g, or mass over mass, such as g/g, or any unit conversion equivalent.

"Specific surface area" refers to the total surface area as calculated in the Brunauer-Emmett-Teller (BET) method. The specific surface area determined by BET is the total surface area as all the porous structures adsorb the small gas molecules. The units for specific surface area can be area per volume, such as in $m^2/g$, or any unit conversion equivalent.

"Young's modulus" refers to the stiffness of a solid material, and in some embodiments may be referred to as modulus of elasticity. The units for Young's modulus can be in pressure, such as kPa, or any unit conversion equivalent.

"Ultimate stress" refers to the maximum stress that a material can withstand while being stretched or pulled before breaking. The units for ultimate stress can be in pressure, such as kPa, or any unit conversion equivalent.

"Porosity" refers to a measure of the void, or empty, spaces in a material. Porosity is a fraction of the volume of voids over the total volume, between 0 and 1, or as a percentage between 0% and 100%, wherein the higher value indicates a higher porosity.

"Supercapacitor electrode" refers to an electrode used for a high-capacity capacitor. A capacitor is a device used to store an electric charge, and a supercapacitor has a relatively higher energy density compared to a common capacitor.

"Specific capacitance" refers to the amount of electric charge needed to raise the electric potential of an isolated conductor by one gram of material. The units for specific capacitance can be in electrical capacitance per mass, such as Farad/g (F/g) or any unit conversion equivalent.

"Areal capacitance" refers to a capacitance per unit area. Capacitance is the ability of a system to store an electric charge, and is the ratio of change in an electric charge to the change in its electric potential. The units for areal capacitance can be in electrical capacitance per area, such as $F/cm^2$ or any unit conversion equivalent.

"Equivalent series resistance" refers to a resistive component of a capacitor's equivalent circuit. A capacitor may be modeled as an ideal capacitor in series with a resistor and an inductor. The resistor's value is the equivalent series resistance. In some embodiments, it may be referred to as effective series resistance. Equivalent series resistance can be measured in Ohms.

III. Aerogels, Foams and Methods of Making

In some embodiments, the present invention provides a method for preparing an aerogel or a foam, the method comprising forming a reaction mixture comprising a cellulose nanofibril gel, a first solvent, and one or more crosslinking agents under conditions sufficient to crosslink the gel; and contacting the crosslinked gel with a second solvent under conditions sufficient to dry the crosslinked gel, thereby forming an aerogel or foam.

The cellulose nanofibril gel useful in the method of the present invention can be made by any method known by one of skill in the art. For example, the cellulose nanofibril gels can be made by freeze-thawing methods. In another example, the cellulose nanofibril gels can be made by acidifying methods.

The cellulose nanofibril (CNF) can be unprotonated, partially protonated or completely protonated. For example, the CNFs surface carboxylates can be protonated from 0% to 100%, or about 1% to about 99%, or about 10% to about 90%, or about 25% to about 75%, or about 1, 2, 3, 4, 5, 10, 15, 20, 25, 30, 35, 40, 45, 50, 55, 60, 65, 70, 75, 80, 85, 90, 95, or 100%. In some embodiments, the CNFs surface carboxylates are unprotonated. In some embodiments, the CNFs surface carboxylates are partially protonated. In some embodiments, the CNFs surface carboxylates are substantially protonated. In some embodiments, the CNFs surface carboxylates are completely protonated. In some embodiments, the CNFs surface carboxylates can be protonated by about 11%. In some embodiments, the CNFs surface carboxylates can be protonated by about 46%. In some embodiments, the CNFs surface carboxylates can be protonated by about 100%.

The freeze-thawing methods useful in the method of the present invention is known by one of skill in the art. For example, the freeze thawing method comprises freezing a solution or suspension and then thawing the frozen solution or suspension to form a gel. For example, aqueous CNF suspensions can be made into cellulose nanofibril gels by freezing the aqueous CNF suspension, then thawing the frozen suspension to form a freeze-thawed cellulose nanofibril hydrogel (FT-hydrogel). The FT-hydrogel is then exchange with acetone to form a cellulose nanofibril gel. In one example, the freezing temperature is about −20° C. and the thawing temperature is ambient temperature.

The acidifying methods useful in the method of the present invention is known by one of skill in the art. For example, the acidifying method comprises adding sufficient acid to the solution or suspension and refrigerating it to form a gel. In one example, aqueous CNF suspension is treated with HCl and refrigerated overnight to form an HCl cellulose nanofibril hydrogel (HCl-hydrogel). The HCl-hydrogel is then exchanged with acetone to form a cellulose nanofibril gel.

The first solvent useful in the method of the present invention can be any solvent known by one of skill in the art. For example, the first solvent can be a polar or a non-polar organic solvent. Polar solvents include tert-butanol, ethanol, dichlormethane, ethyl acetate, dimethylformamide, dimethylsulfoxide, and acetone. Non-polar solvents include toluene, benzene, hexane, cyclohexane, and pentane. In some embodiments, the first solvent comprises acetone, ethanol, dimethyl sulfoxide, dimethylformamide, toluene, chloroform, or a combination thereof. In some embodiments, the first solvent is acetone.

Suitable crosslinking agents useful in the method of the present invention include, but are not limited to, diisocyanates, polymers, and coated polymers. In some embodiments, the one or more crosslinking agents comprise one or more diisocyanates, one or more coated polymers, or a combination thereof. In some embodiments, the one or more crosslinking agents are one more diisocyanates.

The diisocyanates useful in the method of the present invention can be any suitable diisocyanates known by one of skill in the art. Suitable diisocyanates of the present invention may include, but are not limited to, methylene diphenyl diisocyanate (MDI), toluene diisocyanate (TDI), isophorone diisocyanate (IPDI), methylene dicyclohexyl diisocyante (HMDI), and mexamethelene diisocyante (HDI). In some embodiments, the one or more diisocyanates comprise methylene diphenyl diisocyanate.

Suitable polymers and coated polymers useful in the method of the present invention include, but are not limited to, soluble organic polymers. Soluble organic polymers can be cellulose esters, biopolymers, or synthesized polymers. In some embodiments, the one or more coated polymers comprise cellulose acetate.

The crosslinking bonds useful in the method of the present invention can be any crosslinking bond formed from suitable crosslinking agents and the gels. For example, the crosslinking bonds can be urethane bonds, ester bonds, or ether bonds. In some embodiments, the crosslinking bond is a urethane bond.

The crosslinking conditions to form the crosslinking bonds useful in the method of the present invention can be any suitable crosslinking condition known by one of skill in the art. Any suitable temperature, pressure, and time can be used. For example, the temperature can be at ambient, or room temperature, or between about 20° C. to about 25° C. In some examples, the temperature and pressure can be about standard temperature and pressure. In some examples, the time can be about 2 hours to 48 hours, about 4 hours to 48 hours, about 12 hours to 48 hours, or about 24 hours to 48 hours.

A base can also be used to catalyze the reaction to form the crosslinking bonds. For example, the base can be an amine base, such as trimethylamine. In some embodiments, the crosslinking conditions can be at room temperature, for 48 hours, with trimethylamine as catalyst.

In some embodiments, the crosslinked gel formed from the method of the present invention is washed following the crosslinking step. Washing conditions useful in the method of the present invention can be any suitable washing conditions known by one of skill in the art. For example, washing conditions can be with any suitable solvent at any suitable temperature for any amount of time. For example, washing conditions can be with organic solvents at any suitable temperature wherein the crosslinked gel is washed more than once. In some examples, the temperature is ambient or room temperature. In some embodiments, the crosslinked gel is washed with the first solvent following the crosslinking step. In some embodiments, the crosslinked gel is washed with acetone.

The second solvent useful in the method of the present invention can be any solvent known by one of skill in the art. For example, the second solvent can be a polar or a non-polar organic solvent. Polar solvents include tert-butanol, ethanol, dichlormethane, ethyl acetate, dimethylformamide, dimethylsulfoxide, and acetone. Non-polar solvents include toluene, benzene, hexane, cyclohexane, and pentane. In some embodiments, the second solvent comprises tert-butanol, hexane, or a combination thereof. In some embodiments, the second solvent is tert-butanol.

Suitable drying conditions useful in the method of the present invention include, but are not limited to freeze-drying, air-drying, and supercritical-drying.

The freeze-drying conditions useful in the method of the present invention can be any suitable freeze-drying condition known by one of skill in the art. For example, a freeze-drier machine can be used for freeze-drying. Any suitable temperature, time, or pressure can be used for freeze-drying. In some examples, the freeze-drying temperature is between about −60° C. to about −10° C., about −60° C. to about −20° C., about −50° C. to about −20° C. or about −50° C. to about −10° C. In some examples, the freeze-drying temperature is about −60° C., −50° C., about −40° C., about −30° C., about −20° C., or about −10° C. In some examples, the freeze-drying pressuring can be about 0 mbar to about 10 mbar, about 0 mbar to about 0.5 mbar, about 0 mbar to about 2 mbar, from about 0 mbar to about 1 mbar, or from about 0 mbar to about 0.05 mbar. In some examples, the freeze-drying pressure can be about 0.05 mbar, about 1 mbar, about 1.5 mbar, or about 2 mbar. In some examples, the time is about 1 hour to about 24 hours, about 2 hours to about 24 hours, about 4 hours to about 24 hours, or about 6 hours to about 24 hours. In some examples, the time is about 24 hours. In some embodiments, drying the crosslinked gel comprises freeze-drying at a temperature of about −50° C. and at a pressure of about 0.05 mbar.

The air-drying conditions useful in the method of the present invention can be any air-drying condition known by one of skill in the art. For example, any suitable temperature, time, or pressure can be used for air-drying. In some examples, the temperature for air drying can be about 15° C. to about 30° C., or about 20° C. to about 25° C. In some examples the temperature can be at least about 15° C., at least about 20° C., at least about 25° C., or at least about 30° C. In some examples, the pressure can be about atmospheric pressure. In some examples, the time can be about 1 hour to about 24 hours, about 2 hours to about 24 hours, about 4 hours to about 24 hours, or about 6 hours to about 24 hours. In some embodiments, drying the crosslinked gel comprises air drying at a temperature of at least about 20° C.

In some embodiments, the reaction mixture further comprises an acid and the conditions further comprise conditions sufficient to protonate the gel. The acid useful in the method of the present invention can be any Bronsted-Lowry acid known by one of skill in the art. For example, the Bronsted-Lowry acid can be an organic acid or an inorganic acid. In some example, the inorganic acid can be a hydrogen halide such as HF, HCl, HBr, and HI. In some embodiments, the acid is hydrochloric acid.

The conditions sufficient to protonate the cellulose nanofibril gel in the method of the present invention can be any sufficient conditions known by one of skill in the art. For example, the gel can be protonated with any Bronsted-Lowry acid at any suitable temperature and time. In some examples, the temperature can be about 0° C. to about 100° C., about 0° C. to about 50° C., about 0° C. to about 25° C., about 5° C. to about 25° C., and about 10° C. to about 25° C. In some examples, the time can be about 10 minutes to about 24 hours, about 1 hour to about 24 hours, about 2 hours to about 24 hours, about 4 hours to about 24 hours, or about 6 hours to about 24 hours. In some examples, the gel can be protonated with inorganic Bronsted-Lowry acids. In some embodiments, the gel can be protonated with hydrochloric acid.

In some embodiments, the present invention provides a method for preparing an aerogel or a foam, the method comprising: freezing an aqueous suspension comprising cellulose nanofibrils, cellulose sub-micron fibers, or a combination thereof, freeze-drying the frozen suspension, thereby forming an aerogel or foam; and at least one of the following: (1) contacting the aerogel or foam with an organosilane under conditions sufficient to deposit the organosilane onto the aerogel or foam; or (2) heating the aerogel or foam under conditions sufficient to carbonize the aerogel or foam.

The cellulose nanofibrils useful in the method of the present invention can be any cellulose nanofibrils known by one of skill in the art. The cellulose nanofibrils can be modified or unmodified. For example, a modified cellulose nanofibril may contain functional groups modified onto the hydroxyl groups of cellulose to form esters.

The cellulose nanofibrils useful in the method of the present invention can be made by any method known by one of skill in the art. For example, the cellulose nanofibrils can be made from isolated pure cellulose. In some examples, the modified cellulose nanofibrils can be made with modified cellulose.

The method to make cellulose nanofibrils (CNFs) useful in the method of the present invention includes isolated pure cellulose treated under suitable TEMPO oxidation conditions to form cellulose nanofibrils. In some embodiments, isolated pure cellulose can be treated with TEMPO and NaClO under suitable conditions to form the cellulose nanofibrils. In some embodiments, neutralization of cellulose treated with TEMPO and NaClO to a pH of about 7.5 produces CNFs with about 11% of total surface COOH groups. In some embodiments, further protonation with 0.1 N HCl produces CNFs with about 46% to about 100% of total surface COOH groups. In some embodiments, further protonation with 0.1 N HCl produces CNFs with about 46% of total surface COOH groups, about 70% of total surface COOH groups, or about 100% of total surface COOH groups.

The method to make modified cellulose nanofibrils useful in the method of the present invention include modifying the hydroxyl functional groups of pure cellulose. The cellulose nanofibrils can be modified at the hydroxyl groups of cellulose. In some examples, cellulose can be freeze-dried before modification. Freeze-dried cellulose is treated with butadiene-sulfone under suitable conditions to modify the hydroxyl groups of cellulose to form 2,7-octadienyl ethers bonded to cellulose. Suitable conditions may include heating and Pd catalyst.

The cellulose sub-micron fibers useful in the method of the present invention can be any cellulose sub-micron fibers known by one of skill in the art. The cellulose sub-micron fibers can be modified or unmodified. The modified cellulose sub-micron fibers can be modified at the hydroxyl group of the cellulose. In some embodiments, modified cellulose sub-micron fibers may comprise 2,7-octadienyl functional groups modified onto the hydroxyl groups of cellulose.

The cellulose sub-micron fibers useful in the method of the present invention can be made by any method known by one of skill in the art. For example, the cellulose sub-micron fibers can be made from cellulose. In some embodiments, the cellulose sub-micron fibers can be made from cellulose acetate.

The methods to make the cellulose sub-micron fibers useful in the method of the present invention is known by one of skill in the art. For example, the cellulose sub-micron fibers can be made by an electrospinning process known by one of skill in the art. The cellulose sub-micron fibers made by the electrospinning process can form ultra-fine ES cellulose fibers. In some embodiments, the cellulose sub-micron fibers can be prepared by a method comprising electrospinning a cellulose ester, hydrolysis of the electrospun ester, and mechanical dispersion. In some embodiments, the cellulose sub-micron fibers can be made by electrospinning cellulose acetate followed by alkaline hydrolysis.

The mechanical dispersion methods useful in the present invention is known by one of skill in the art. For example, the mechanical dispersion method can be high speed blending, sonication, using a stir bar and stir plate, or shaking with hands. The high speed blending can be performed using a machine. In some embodiments, the mechanical dispersion method can be shaking with hands.

The cellulose nanofibrils, cellulose sub-micron fibers, or combinations thereof useful in the present invention can have any suitable concentration in an aqueous suspension. In some embodiments, the concentration of cellulose nanofibrils, cellulose sub-micron fibers, or combination thereof in the suspension is between about 0.01% and about 10% by weight. For example, the concentration can be between about 0.05% and about 0.8%, or about 0.05% and about 0.6%. In some embodiments, the concentration can be about 0.05%, 0.1%, 0.2, 0.3%, 0.4%, 0.5%, or 0.6%.

The freezing conditions useful in the method of the present invention can be any suitable freezing conditions known by one of skill in the art. Any suitable temperature, time, and pressure may be used for freezing. For example, the temperature can be between about −60° C. to about 0° C., about −60° C. to about −10° C., about −50° C. to about 0° C., about −50° C. to about −10° C., or about −50° C. to about −20° C. In some examples, the time can be about 1 hour to 24 hours, about 2 hours to 24 hours, about 3 hours to 24 hours, or about 4 hours to 24 hours. In some embodiments, aqueous suspensions of cellulose nanofibrils, cellulose sub-micron fibers, or combinations thereof can be frozen at—about 20° C. for about 4 hours. In some embodiments, the suspension is frozen at a temperature of about −50° C.

The conditions sufficient to deposit the organosilane onto the aerogel or foam is known by one of skill in the art. Any suitable temperature, time, and pressure may be used to deposit the organosilane onto the aerogel or foam. For example, the temperature can be about 80° C. to about 100° C., or about 80° C. to about 90° C. In some examples, the temperature can be about 80° C., about 85° C., about 90° C., or about 95° C. In some examples, the time can be about 10 minutes to 2 hours, about 10 minutes to 1 hour, or about 20 minutes to 40 minutes. In some examples, the pressure can be from about vacuum pressure to about atmospheric pressure. In some embodiments, depositing the organosilane onto the aerogel or foam comprises contacting the aerogel or foam with the organosilane at a temperature of about 85° C. for about 30 minutes under a vacuum.

The organosilane useful in the method of the present invention can be any suitable organosilane known by one of skill in the art. Suitable organosilanes include, but are not limited to, methyltrichlorosilane, dichlorodimethylsilane, trimethylsilyl chloride, trichloro(hexyl)silane, butyltrichlorosilane, trichloro(octadecyl)silane, trichlor(phenyl)silane, and tolyltrichlorosilane. In some embodiments, the organosilane is methyltrichlorosilane.

The carbonizing conditions useful in the method of the present invention can be any suitable carbonizing condition known by one of skill in the art. Any suitable temperature, pressure and time can be used. For example, the temperature can be at least 600° C. or at least 700° C. In some examples, the time can be from about 10 minutes to about 2 hours, from 10 minutes to about 1 hour, or from about 20 minutes to about 40 minutes. The carbonizing conditions may be performed under gaseous atmosphere. For example, the gaseous atmosphere may be under noble gases, such as helium, neon, argon, krypton, xenon, and radon, or nitrogen gas. In some embodiments, carbonizing the aerogel or foam composite comprises contacting the aerogel or foam composite with nitrogen gas at a temperature of at least about 800° C. for a period of about 30 minutes.

In some embodiments, the present invention provides an aerogel or foam prepared by the method comprising forming a reaction mixture comprising a cellulose nanofibril gel, a first solvent, and one or more crosslinking agents under conditions sufficient to crosslink the gel; and contacting the crosslinked gel with a second solvent under conditions sufficient to dry the crosslinked gel, thereby forming an aerogel or foam.

The aerogel or foam useful in the present invention can be any aerogel or foam prepared by the methods of the present invention. For example, the aerogel can be formed from the cellulose nanofibril gel prepared by the method of the present invention.

The aerogel or foam useful in the present invention can have any suitable density known by one of skill in the art. For example, the density can be about 1 to about 200 mg/cm$^3$. In some embodiments, the aerogel or foam can have a density between about 10 and 200 mg/cm$^3$. In some embodiments, the aerogel or foam can have a density between about 10 and about 100 mg/cm$^3$, about 10 and about 50 mg/cm$^3$, about 20 and about 50 mg/cm$^3$, about 20 and about 40 mg/cm$^3$, or about 20 and about 30 mg/cm$^3$. In some embodiments, the aerogel or foam can have a density between about 1 and 20 mg/cm$^3$, or about 1 and about 10 mg/cm$^3$. In some embodiments, the aerogel or foam can have a density of about 6.9 mg/cm$^3$. In some embodiments, the aerogel or foam can have a density of about 8.3 mg/cm$^3$.

The aerogel or foam useful in the present invention can have any suitable organic liquid absorption capacity known by one of skill in the art. In some embodiments, the aerogel or foam can have an organic liquid absorption capacity of at least about 1 to about 100 g/g. In some embodiments, the organic liquid absorption capacity can be about 40 to about 80 g/g, about 50 to about 80 g/g, or about 60 to about 80 g/g. In some embodiments, the organic liquid absorption capacity can be about 50 mL/g to about 100 mL/g. In some embodiments, the aerogel or foam can have an organic liquid absorption capacity of about 60 mL/g, about 80 mL/g, or about 100 mL/g.

The absorbed organic liquid useful in the present invention can include any suitable organic liquid known by one of skill in the art. For example, the organic liquid can be a polar or non-polar solvent. In some embodiments, the organic liquid can be chloroform.

The aerogel or foam useful in the present invention can have any suitable specific surface area known by one of skill in the art. For example, suitable specific areas can be about 100 to about 700 m$^2$/g, about 100 to about 600 m$^2$/g, about 100 to about 500 m$^2$/g about 100 to about 400 m$^2$/g, or about 100 to about 300 m$^2$/g. In some embodiments, the aerogel or foam can have a specific surface area of at least about 100 to about 230 m$^2$/g. In some embodiments, the aerogel or foam can have a specific surface area of at least about 120 to about 220 m$^2$/g. In some embodiments, the aerogel or foam can have a specific surface area of about 209 m$^2$/g. In some embodiments, the aerogel or foam can have a specific surface area of about 123 m$^2$/g. In some embodiments, the aerogel or foam can have a specific surface area of about 216 m$^2$/g. In some embodiments, the aerogel or foam can have a specific surface area of about 228 m$^2$/g.

The aerogel or foam useful in the present invention can have any suitable Young's modulus known by one of skill in the art. In some embodiments, the aerogel or foam can have a Young's modulus between about 200 and about 1,000 kPa. In some embodiments, the aerogel or foam can have a Young's modulus between about 90 and about 1,000 kPa, between about 90 and about 500 kPa, between about 90 and about 200 kPa, or between about 90 and about 100 kPa. In some embodiments, the aerogel or foam can have a Young's modulus of about 94 kPa.

The aerogel or foam useful in the present invention can have any suitable ultimate stress known by one of skill in the art. For example, the aerogel or foam can have an ultimate stress between about 25 and 500 kPa. In some examples, the aerogel or foam can have an ultimate stress between about 25 and about 200 kPa, between about 25 and about 100 kPa, between about 30 and about 80 kPa, or between about 30 and about 70 kPa. In some embodiments, the aerogel or foam can have an ultimate stress between about 60 and 500 kPa. In some embodiments, the aerogel or foam can have an ultimate stress of about 66 kPa. In some embodiments, the aerogel or foam can have an ultimate stress between about 31 and 33 kPa.

In some embodiments, the present invention provides an aerogel or foam prepared by the method comprising: freezing an aqueous suspension comprising cellulose nanofibrils, cellulose sub-micron fibers, or a combination thereof; freeze-drying the frozen suspension, thereby forming an aerogel or foam; and at least one of the following: (1) contacting the aerogel or foam with an organosilane under conditions sufficient to deposit the organosilane onto the aerogel or foam; or (2) heating the aerogel or foam under conditions sufficient to carbonize the aerogel or foam.

The aerogel or foam useful in the present invention can be any suitable aerogel or foam prepared by the methods of the present invention. For example, the aerogel can be formed from frozen aqueous suspension comprising cellulose nanofibrils, cellulose sub-micron fibers, or a combination thereof, prepared by the method of the present invention.

The aerogel or foam useful in the present invention can have any suitable density known by one of skill in the art. In some embodiments, the aerogel or foam can have a density between about 1 and 200 mg/cm$^3$. In some embodiments, the density can be between about 5 and 200 mg/cm$^3$, about 5 and about 100 mg/cm$^3$, about 5 and about 50 mg/cm$^3$, about 5 and about 15 mg/cm$^3$, or about 5 and about 10 mg/cm$^3$. In some embodiments, the aerogel or foam can have a density of about 6.9 mg/cm$^3$. In some embodiments, the aerogel or foam can have a density of about 8.3 mg/cm$^3$.

The aerogel or foam porosity useful in the present invention can have any suitable porosity known by one of skill in the art. In some embodiments, the aerogel or foam can have a porosity of at least about 90-99.9%. In some embodiments, the aerogel or foam can have a porosity of at least about 95-99.9% or at least about 97-99.9%. In some embodiments, the aerogel or foam can have a porosity of at least about 99.6-99.9%.

The aerogel or foam absorption capacity useful in the present invention can have any suitable absorption capacity known by one of skill in the art. In some embodiments, the aerogel or foam can have an absorption capacity of at least about 100 to 400 g/g. In some embodiments, the aerogel or foam can have an absorption capacity of about 201 to 373 g/g, of about 120 to 283 g/g, or about 150 to 192 mL/g.

In some embodiments, the present invention provides a supercapacitor electrode comprising the aerogel or foam prepared by the method comprising: freezing an aqueous suspension comprising cellulose nanofibrils, cellulose sub-micron fibers, or a combination thereof; freeze-drying the frozen suspension, thereby forming an aerogel or foam; and at least one of the following: (1) contacting the aerogel or foam with an organosilane under conditions sufficient to deposit the organosilane onto the aerogel or foam; or (2) heating the aerogel or foam under conditions sufficient to carbonize the aerogel or foam.

The supercapacitor electrode of the present invention can be any suitable supercapacitor electrode known by one of skill in the art. For example, the supercapacitor electrode can be constructed using two identical electrodes with cellulose filter paper as a separator into symmetric button cells. The two identical electrodes can be sealed with a manual crimper. The supercapacitor electrode can comprise the aerogel of the present invention. In some embodiments, the supercapacitor can comprise the aerogel of the present invention, and nickel foam.

The specific capacitance useful in the present invention can have any suitable specific capacitance known by one of skill in the art. For example, the specific capacitance can be at least about 50 F/g (Farad/gram), at least about 75 F/g, at least about 100 F/g, or at least about 125 F/g. In some embodiments, the specific capacitance is at least about 100 F/g.

The areal capacitance useful in the present invention can have any suitable areal capacitance known by one of skill in the art. For example, the areal capacitance can be at least about 25 mF/cm$^2$, at least about 30 mF/cm$^2$, at least about 35 mF/cm$^2$, at least about 40 mF/cm$^2$, at least about 45 mF/cm$^2$, at least about 50 mF/cm$^2$, at least about 55 mF/cm$^2$, or at least about 60 mF/cm$^2$. In some embodiments, the areal capacitance is at least about 50 mF/cm$^2$.

The equivalent series resistance useful in the present invention can have any suitable equivalent series resistance known by one of skill in the art. For example, the equivalent series resistance can be between about 1 and about 10 Ohms. In some embodiments, the equivalent series resistance can be between about 2 and about 8 Ohms, or between about 3 and about 6 Ohms. In some embodiments, the equivalent series resistance is about 4.2 Ohms.

IV. Examples

Example 1. CNF Crosslinked Aerogels

Methods

Materials. Pure cellulose was isolated from rice straw to 36% yield by a three-step 2:1 toluene/ethanol extraction, acidified NaClO$_2$ (1.4%, pH 3-4, 70° C., 6 h) and KOH (5%, 70° C., 2 h) isolation process reported previously (Lu, P.; Hsieh, Y. L., *Carbohydrate Polymers*, 2012, 87, 564-573). Cellulose nanofibrils (CNFs) were derived from the isolated pure cellulose employing 5 mmol/g NaClO/cellulose at pH 10, then neutralized to pH 7 by adding 0.5 M NaOH, followed by mechanical blending (Vitamix 5200) at 37,000 rpm for 30 min (Jiang, F.; Han, S.; Hsieh, Y.-L., *RSC Advances*, 2013, 3, 12366-12375). Hydrochloric acid (IN, Certified, Fisher Scientific), Acetone (Histological grade, Fisher Scientific), tert-butanol (Certified, Fisher Scientific), Methylene diphenyl diisocyanate (98%, Sigma Aldrich), triethylamine (99.7%, extra pure, Sigma Aldrich), chloroform (HPLC grade, EMD), methylene blue (Certified biological stain, Fisher Scientific) and Sudan IV red (Allied Chemical) were used as received without further purification. All water used was purified using a Milli-Q plus water purification system (Millipore Corporate, Billerica, MA).

Cellulose nanofibril hydrogels and acetone gels. Aqueous CNF suspensions (0.6%) were fabricated into hydrogels by either freezing—thawing (FT) or hydrochloric acid (HCl) gelation. FT hydrogels was formed by freezing CNF aqueous suspension at −20° C. for 4 hr, then thawing at ambient temperature. HCl hydrogel was obtained by adding 1 mL HCl (1 N) on top of 8 mL CNF aqueous suspension under static state in a refrigerator (4° C.) for overnight. Both FT and HCl hydrogels were immersed in HCl (0.2 N) to further protonate the surface carboxyls for enhanced gelation, then exchanged with acetone to acetone gels.

Crosslinking with diisocyanate. For crosslinking, the CNF acetone gels were placed in 80 mL acetone containing MDI at 1:1, 2:1 and 4:1 MDI:CNF mass ratio with 20 μL triethylamine as a catalyst at room temperature for 48 h. After reaction, the reaction solution turned to turbid with white precipitate, and the crosslinked CNF acetone gels were washed thoroughly with acetone to remove unreacted reagents. Both uncrosslinked and crosslinked CNF acetone gel were further exchanged to tert-butanol and then freeze-dried (−50° C., 0.05 mbar) in a freezedrier (FreeZone 1.0 L Benchtop Freeze Dry System, Labconco, Kansas City, MO). The CNF aerogels from FT and HCl gelation were designated as FT-CNF and HCl-CNF aerogel, and those cross-linked at 1:1, 2:1 and 4:1 MDI:CNF ratios were designated as CNF1MDI, CNF2MDI and CNF4MDI aerogels, respectively.

Characterization. The optical transmittance of 0.6% CNF suspension, FT- and HCl-CNF hydrogels (2 mm thick) was recorded from 350 to 800 nm using Evolution 600 UV-Vis spectrophotometer. The density of all CNF aerogels was calculated based on the dimension (length and diameter) and mass of a piece of cylindrical aerogel, as measured using a digital caliper and balance to 0.01 mm and 0.1 mg resolution, respectively. The liquid contact angles on uncrosslinked and crosslinked FT-CNF aerogel were visualized by dropping 10 μL of water (dyed with methylene blue) or chloroform (dyed with Sudan IV) on aerogel surface. The absorption capacity of CNF aerogels toward water and chloroform was measured by immersing aerogel into 20 mL liquid and allowed to saturate, and the surface liquid was blotted with filter paper and weighed. The absorption capacity (g/g) was calculated as:

$$\text{Absorption capacity} = \frac{(w_e - w_o)}{w_o} \tag{I}$$

Where $w_e$ and $w_o$ are weights of fully saturated and dry aerogels, respectively.

The cyclic absorption capacity of uncrosslinked and crosslinked FT-CNF aerogels toward chloroform were determined by completely evaporating the previously absorbed chloroform in air and then re-absorbing following the previous method. CNF aerogel was cut along the cross sections with a sharp razor, mounted with conductive carbon tape, sputter coated with gold and imaged by a field emission scanning electron microscope (FE-SEM) (XL 30-SFEG, FEI/Philips, USA) at a 5 mm working distance and 5-kV accelerating voltage. FTIR spectra of CNF aerogels as transparent KBr pellets (1:100, w/w) were obtained from a Thermo Nicolet 6700 spectrometer. The spectra were collected at ambient condition in the transmittance mode from an accumulation of 128 scans at a 4 cm-1 resolution over the regions of 4000-400 cm-1. TGA analyses of CNF aerogels were performed on a TGA-50 thermogravimetric analyzer (Shimadzu, Japan).

Each sample (5 mg) was heated at 10° C./min from 25° C. to 500° C. under purging $N_2$ (50 mL/min). The specific surface area and pore characteristics of CNF aerogels were determined by $N_2$ adsorption at 77 K using a surface area and porosity analyzer (ASAP 2000, Micromeritics, USA). Approximately 0.1 g of each sample was degassed at 35° C. for 24 h. The specific surface area was determined by the Brunauer-Emmett-Teller (BET) method from the linear region of the isotherms in the 0.06-0.20 relative $P/P_0$ pressure range. Pore size distributions were derived from desorption branch of the isotherms by the Barrett-Joyner-Halenda (BJH) method. The total pore volumes were estimated from the amount adsorbed at a relative pressure of $P/P_0$ of 0.98. Compressive tests were performed on 10 mm long cylindrical CNF aerogels using Instron 5566 equipped with a 5 kN load cell and two flat-surface compression stages. The loading compressive rates were set to the same constant 1 mm/min. Young's modulus was determined from the initial slope of σ-ε curve. The yield stress (σy) was determined at the end of elastic region and the ultimate stress (σμ) was determined at strain (ε)=0.8. Oil-water separation was investigated using CNF4MDI aerogel (5 mm thick) in between a vacuum suction filtration device. A phase-separated mixture of water/chloroform (200 mL, 50:50 v/v) solution was poured on top of aerogel membrane and filtered without pulling any vacuum. This filtration-assisted separation was repeated for up to 10 times to investigate the reusability.

Results and Discussion

CNF aerogels Characterization. The coupled TEMPO mediated oxidation and mechanical defibrillation produced 1-2 nm thick and 500-1000 nm long cellulose nanofibrils (CNFs) that contain 1.29 mmol/g surface C6 carboxylate groups, of which 86% are sodium carboxylate (Jiang, F.; Han, S.; Hsieh, Y.-L., *RSC Advances*, 2013, 3, 12366-12375). While the electrostatic repulsion among the negatively charged surface carboxylates keeps CNFs suspended in aqueous media over time, aqueous CNF suspensions become viscous at as low as 0.6% concentration due to the inter-fibril hydrogen bonding among the abundant surface C2, C3 and remaining C6 hydroxyls and protonated carboxyls and the entanglement among high aspect ratio flexible fibrils. To induce gelation of aqueous CNFs at such a low concentration, inter-CNF association was promoted by two external stimuli, i.e., slow freezing to increase local CNF concentrations to enhance inter-CNF association followed by thawing, designated as freeze-thaw (FT), and protonation with hydrochloric acid (HCl) to reduce inter-fibril electrostatic repulsion.

Figure 1B:
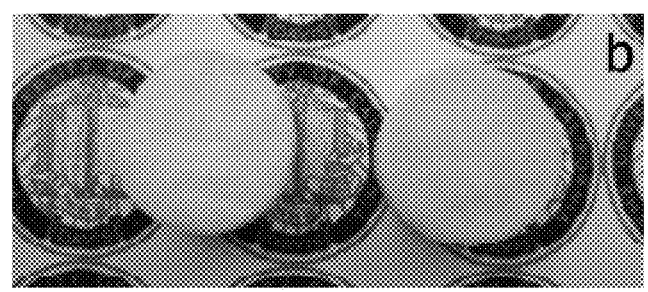
Figure 1C:
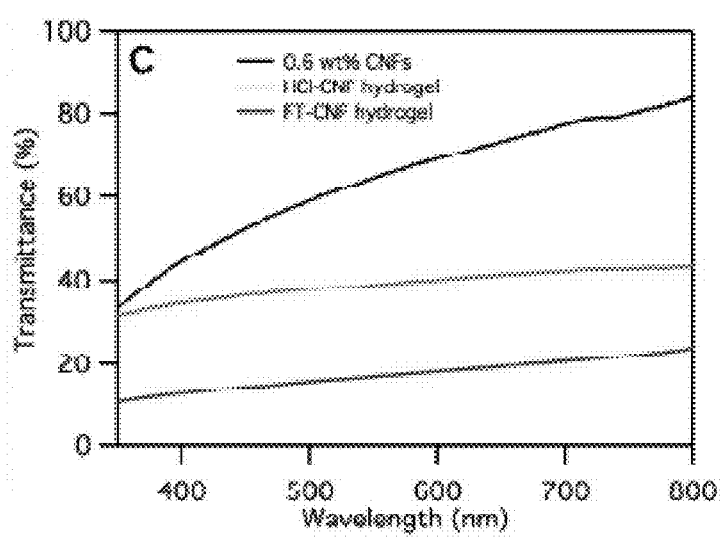

Both FT- and HCl-CNF hydrogels appeared translucent, with slightly higher clarity in the latter (FIG. 1A). This was corroborated by the lower visible light transmittance (10-24%) of FT-CNF hydrogel than that (31-43%) of HCl-CNF hydrogel (FIG. 1C). The much lower light transmittance of both CNF hydrogels, with only ⅓ thickness of light path, than the original 0.6% CNF suspension was clear evidence of greater CNF association induced by both slow freezing and reduced repulsion. For aqueous CNF suspension, the much lower 33% light transmission at 350 nm than the 84% at 800 nm was likely from greater scattering at wavelength closer to the size of CNFs as in aqueous colloidal systems. Both FT- and HCl-CNF hydrogels were solvent exchanged with acetone and tert-butanol, then freeze-dried, producing white opaque aerogels with respective densities of 6.9 and 8.3 mg/cm₃ (FIG. 1B). In the sequential solvent exchange with acetone and tert-butanol, neither gels exhibited dimensional changes from the original hydrogels, suggesting no major impact on the associated CNF structure. However, the solvent exchanged FT-CNF aerogel had slightly lower density than the 8.1 mg/cm³ density of that from only freezing (−20° C.) without solvent exchanges of the same CNFs. One possible explanation is the loss of some loosely bound CNFs during the solvent exchange steps.

Figure 2A:
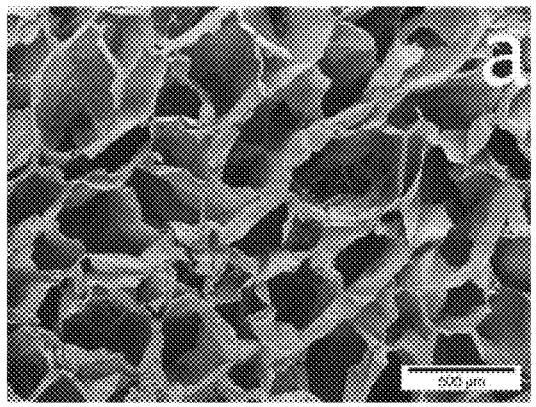
FIG. 2A-2F show the SEM images of FT-CNF and HCl-CNF aerogels.
Figure 2B:
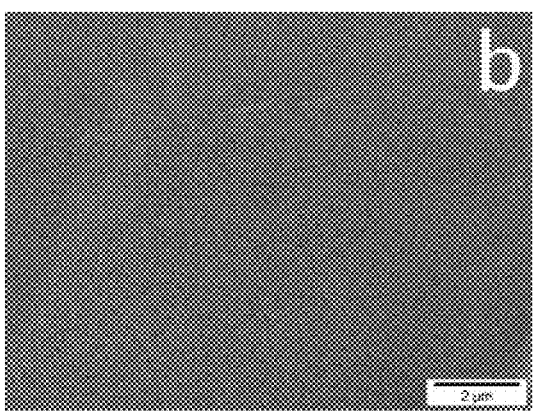
Figure 2C:
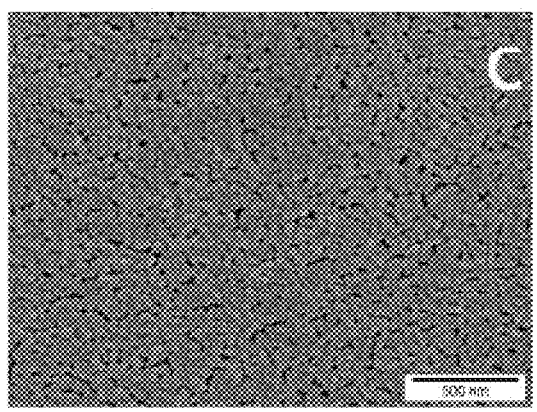
Figure 2D:
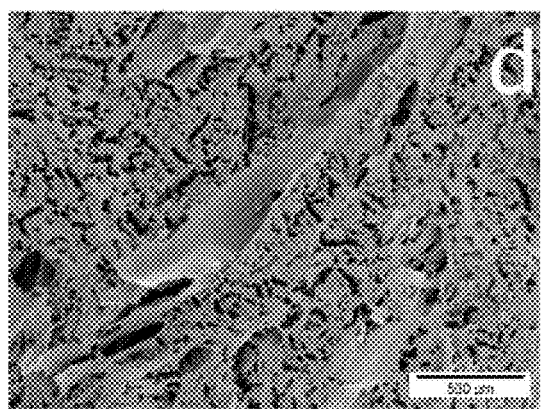
Figure 2E:
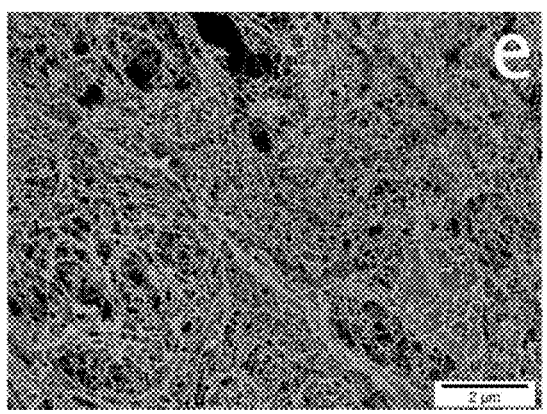
Figure 2F:
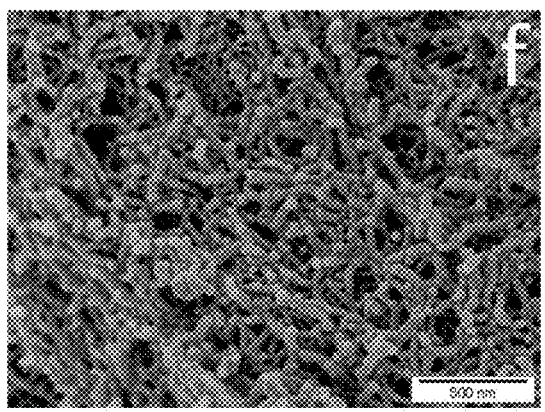

The two aerogels had grossly different morphologies. FT-CNF aerogel showed a cellular structure of biomodally distributed very large 200-500 μm wide irregularly shaped honeycomb-like cells with thin walls of closely packed self-assembled CNFs with numerous ca. 50 nm wide and hundreds nm long slit-like spaces (FIG. 2A-2C). In contrast, HCl-CNF aerogel was mostly fibrillar, with inter-fibrillar spaces ranging from hundreds nm to tens m wide (FIG. 2D-2F). While few very fine fibrils and film-like pieces were observed in FT-CNF and HCl-CNF aerogels, respectively, the major morphological differences between the two are the cellular structure with distinctly different, i.e., by three orders of magnitude, bimodal distributed pores of the former and the fibrillar structure of the latter.

Figure 3A:
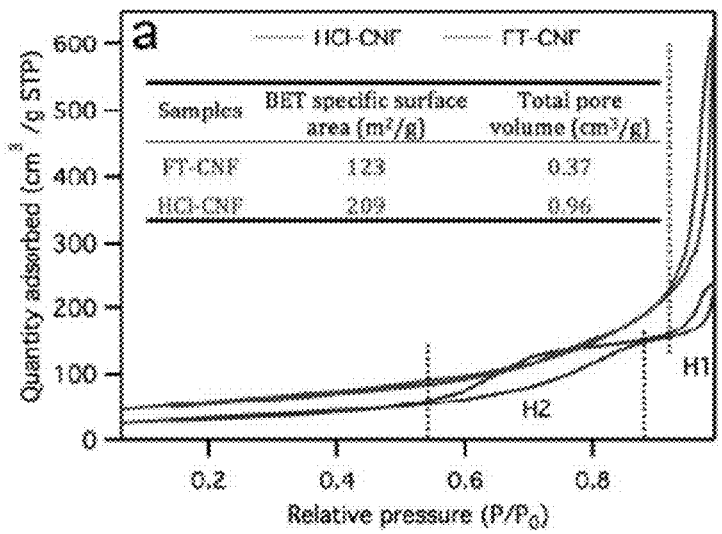
FIG. 3A-3D show characteristics of FT-CNF and HCl-CNF aerogels.
Figure 3B:
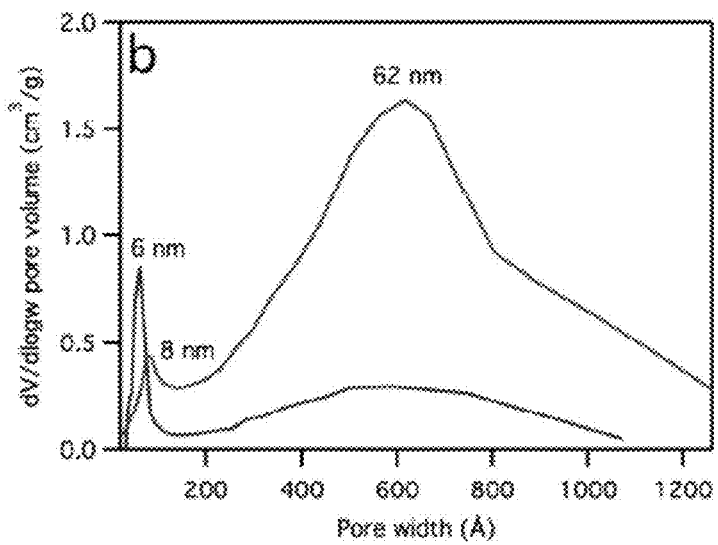

BET nitrogen adsorption-desorption behaviors of these aerogels provided further information on pores less than 100 nm and features to be discerned by the high resolution SEM. Both aerogels showed type IV isotherms, typical of mesoporous materials (FIG. 3A). FT-CNF aerogel showed an asymmetric H2 hysteresis loop between 0.6-0.8 $p/p_0$, in addition to a less intensive H1 type hysteresis loop at above 0.9 $p/p_0$ (FIG. 3B). The H2 hysteresis was attributed to pore blocking or percolation effect in ink-bottle pore structures of the mesopores, consistent with the narrow slit width observed on the thin film walls. The primary sharp peak centered at 6 nm followed by a shallow one from 20-100 nm further indicate the dominance of mesopores in FT-CNF aerogel. The HCl-CNF aerogel showed an H1 hysteresis of nearly parallel adsorption and desorption branches at $p/p_O$ above 0.9 and a small peak at 8 nm followed by a much larger and broader peak centered at 62 nm, indicating significantly more macropores than mesopores, also consistent with SEM observation. As expected, the fibrillar HCl-CNF aerogels had higher specific surface (209 m²/g) and pore volume (0.96 cm³/g) than the much better self-assembled FT-CNF aerogel (123 m²/g and 0.37 cm³/g, respectively).

Figure 3C:
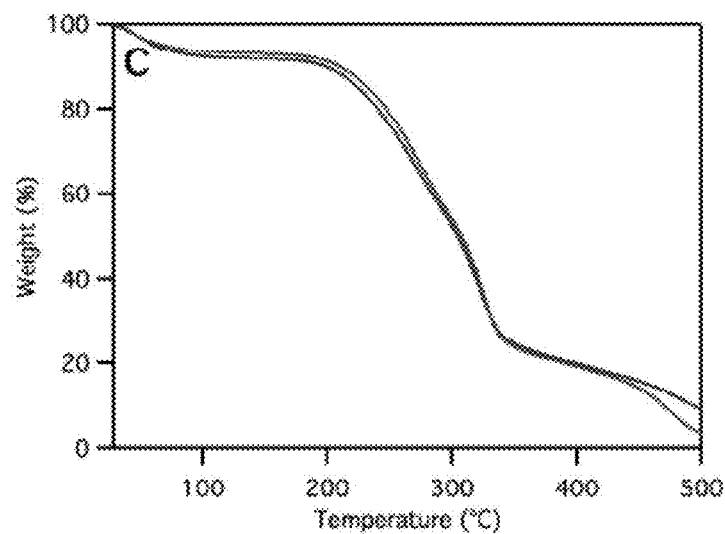
Figure 3D:
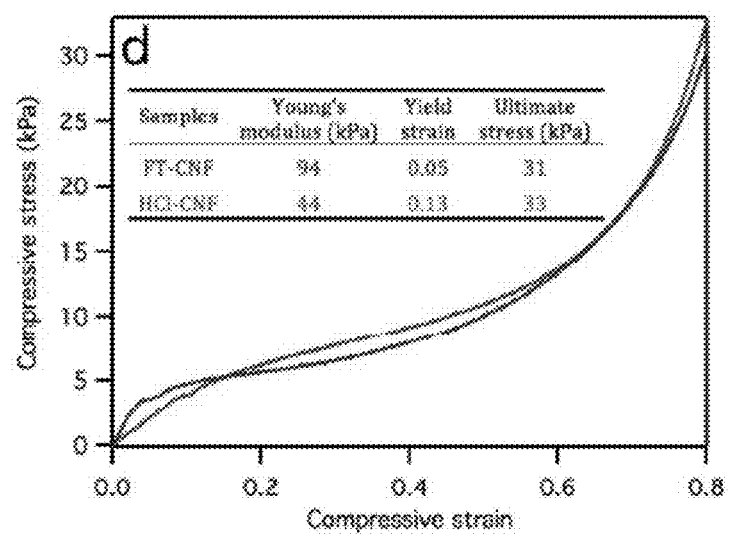

Both FT- and HCl-CNF aerogels exhibited similarly thermal behaviors, i.e., similarly hygroscopic, containing 7-8.2% moisture, losing 75% of mass from 200 to 345° C. and yielding 9.1 and 3.6% chars at 500° C., respectively (FIG. 3C). While the extent of char from HCl-CNF aerogel was similar to native cellulose, the nearly tripled amount of char from FT-CNF aerogel was attributed to its much extensively assembled and packed filmlike structures and lower specific surface to heat exposure. Both aerogels were flexible and could be compressed to up to 0.8 strain while remaining physically intact, showing three stress-strain regions of initial linear elastic, then plastic deformation and the final densification (FIG. 3D). FT-CNF aerogel showed a steeper linear elastic deformation region with more than doubled Young's modulus of 94 kPa but less than half 0.05 yield strain as compared to the 44 kPa Young's modulus and 0.13 yield strain for HCl-CNF aerogel. While both aerogels showed similar 31-33 kPa ultimate stress, FT-CNF aerogel had significantly higher specific Young's modulus (13.6 MPa/g·cm³) and ultimate stress (4.5 MPa/g·cm³) than HCl-CNF aerogel (5.3 and 4.0 MPa/g·cm³, respectively) due to its well-assembled CNF walls in an interconnected honeycomb structure.

When normalized by density, the specific Young's modulus and ultimate stress of FTCNF aerogel are 13.6 MPa/g·cm³ and 4.5 MPa/g·cm³, respectively, over three times higher modulus than other nanocellulose based aerogels from freezing and freeze-drying, such as silylated aerogel from homogenized oat straw nanocellulose frozen at −196° C. (4.1 MPa/g·cm³ specific Young's modulus at 6.7 mg/cm³) (Zhang, Z.; Sebe, G.; Rentsch, D.; Zimmermann, T.; Tingaut, P., Chemistry of Materials, 2014, 26, 2659-2668), ca, 70% higher modulus than aerogel from enzymatically degraded and homogenized softwood pulp microfibrillated cellulose frozen at −196° C. (8 MPa/g·cm³ specific Young's modulus at 7 mg/cm³)(Sehaqui, H.; Salajkova, M.; Zhou, Q.; Berglund, L. A., Soft Matter, 2010, 6, 1824-1832) or −180° C. (8-9 MPa/g·cm³ specific Young's modulus at density of 20-30 mg/cm³)(Paakko, M.; vapaavuori, J.; Silvennoinen, R.; Kosonen, H.; Ankerfors, .; Lindstrom, T.; Berglund, L. A.; Ikkala, O. Soft Matter, 2008, 4, 2492-2499), 44 times ing modulus of glutaraldehyde crosslinked TEMPO oxidized eucalyptus pulp frozen at −78° C. (<0.3 MPa/g·cm³ specific ultimate stress at 0.8 strain),$_{39}$ but similar to TEMPO oxidized softwood nanocellulose aerogel unidirectionally frozen at 15 K/min (<13.5 MPa/g·cm³ specific Young's modulus at 5.6 mg/cm³) (Wicklein, B,; Kocjan, A.; Salazar-Alvarez, G.; Carosio, F.; Camino, G.; Antonietti, M.; Bergstrom, L.; Nature Nanotechnology, 2015, 10, 277-283). Since the latter frozen at a slow 15 K/min rate also consisted of honeycomb like structure, the higher modulus in both cases were consistent with more extensive assembling of CNFs into well packed thin wall in the honeycomb structure.

FT-CNF aerogel absorbed 112.1 and 100.8 mL/g of water and chloroform respectively, without appreciable deformation, indicating amphiphilicity with slightly higher hydrophilicity. In contrast, HCl-CNF aerogel shrank immediately upon exposure to the same liquids, releasing trapped air bubbles, therefore, absorbing only 28.0 and 30.2 mL/g water and chloroform, respectively, only a third of those by the FT-CNF aerogel. The shrinking of HCl-CNF aerogel was attributed to the fibrous structure, as observed by SEM, which collapsed from the surface tension of absorbed liquid. Based on the higher mechanical strength and better shape retention with absorbed liquids, only FT-CNF aerogel was further crosslinked with MDI.

MDI crosslinking of CNF aerogel. FT-CNF hydrogels were solvent exchanged into acetone gels, then crosslinked with MDI using triethyleamine as a catalyst. Based on the 4.19 mmol/g surface hydroxyls and 1.29 mmol/g carboxyls for CNFs, the 1:1, 1:2 and 1:4 CNF/MDI w/w ratios were calculated to be 1:1.45, 1:2.90 and 1:5.80 OH/COOH:NCO molar ratios for CNF1MDI, CNF2MDI, and CNF4MDI, respectively, all with excess MDI crosslinker. Neither acetone exchange nor MDI crosslinking caused dimensional changes but the crosslinked acetone gels became more opaque (Figure S1). All MDI-crosslinked acetone gels were solvent exchanged with tert-butanol and then freeze-dried into white MDI-crosslinked aerogels, appearing essentially the same as the uncrosslinked aerogels, however, in higher densities of 8.2, 9.8 and 11.5 mg/cm₃ for FT-CNF1MDI, CNF2MDI and CMF4MDI, respectively, or 19, 42 and 67% density increases.

Figure 4A:
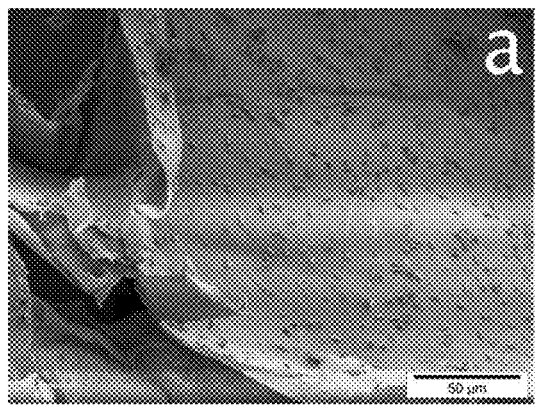
FIG. 4A-4F show SEM images of FT CNF-MDI aerogels at varied CNF:MDI ratios.
Figure 4B:
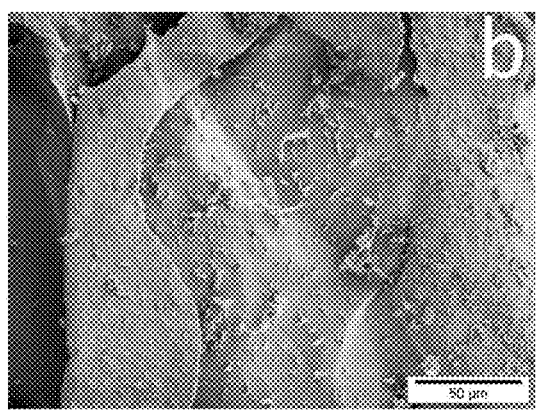
Figure 4C:
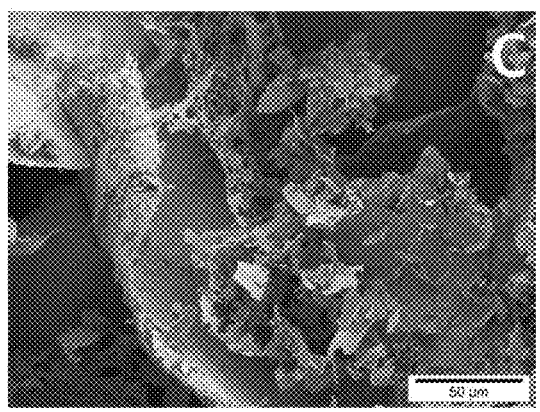
Figure 4D:
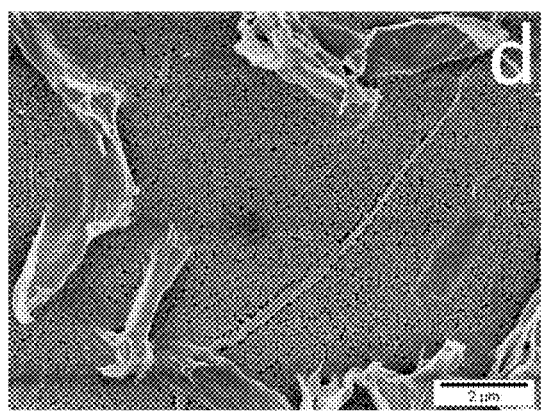
Figure 4E:
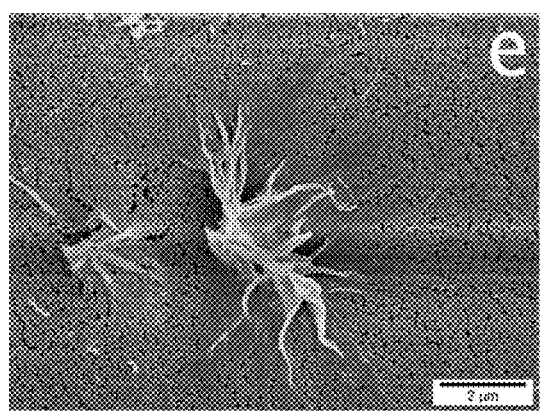
Figure 4F:
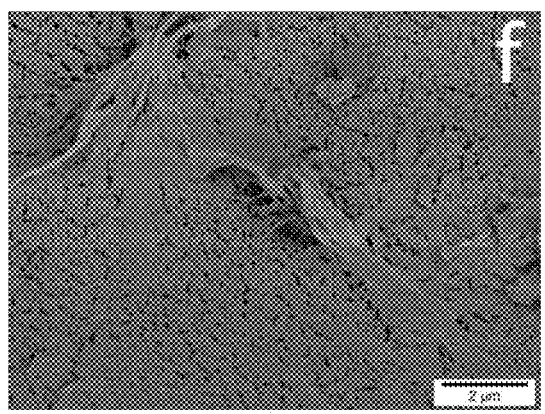

MDI crosslinked FT-CNF aerogels retained similar honeycomb structures as the unmodified one but with larger and more aggregates within the pores at higher MDI:CNF ratios. In contract to the smooth pore wall for the unmodified CNF aerogel (FIG. 2B), the pore walls of MDI crosslinked aerogels were more fully covered with aggregates that increased wth increasing MDI ratios (FIG. 4A-4C), indicating more extensively reacted MDI with CNF. Closer inspection on the pore walls showed that the tens of nm slit-like spaces were mostly retained after crosslinking (FIG. 4D-4F). However, it is also shown that MDI aggregates could fuse into the spaces and anchor onto the pore wall, which was more prominent at higher MDI ratios.

Crosslinking between MDI and the hydroxyls on FT-CNF aerogel was confirmed by the presence of urethane link as evident by the appearance of new peaks at 1540.8 and 1234.2 cm-1, corresponding to the C—N stretching and N—H bending of amide II and III, respectively. The aromatic skeletal vibration at 1511.9 and 1598.7 cm-1 increased with increasing MDI crosslinking agent, showing increasing presence of MDI. A new peak at 2270 cm-1 ascribing to the vibration of N=C=O (isocyanate) in MDI also appeared on the crosslinked aerogels and increased in intensity with increasing MDI:CNF ratios, showing increasing presence of unreacted isocyanates. However, the unreacted isocyanate peaks did not intensify to the same extents as the urethane nor the aromatic skeletal, indicating MDI participating more in crosslinking than not, but nevertheless offering reactive sites for introducing other functionalities on the aerogel surfaces.

Figure 5A:
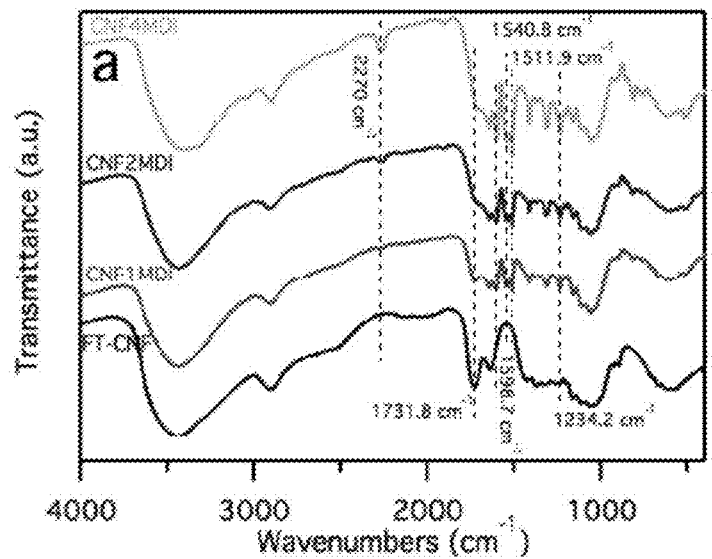
FIG. 5A-5B show spectra of pure and MDI crosslinked FT-CNF aerogel.
Figure 5B:
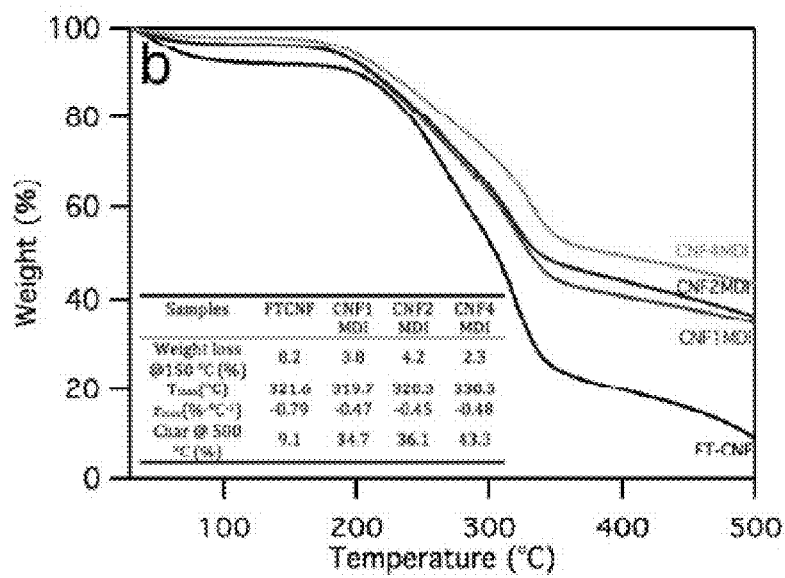

Reacting CNF aerogel with MDI reduced moisture contents (determined at 150° C.) from 8.2% for FT-CNF to 3.8, 4.2 and 2.3% for CNF1MDI, CNF2MDI and CNF4MDI, respectively, significantly reducing the hygroscopicity by 50% for CMF1MDI and CNF2MDI and over 70% for CNF4MDI. The MDI-crosslinked aerogels decomposed at a considerably lower rate of $-0.45\%\oplus°$ $C._{-1}$ than $-0.79\%\oplus°$ $C._{-1}$ for FT-CNF, but in the same 200-350° C. range (FIG. 5B), retaining higher mass at the end of the primary stage of decomposition, i.e., 350° C. The derivatives of these TGA curves showed a peak at 268° C. ascribed to degradation of carboxylated CNF surface chains while the primary degradation peak centered at around 321° C. for FT-CNF, CNF1MDI and CNF2MDI and slightly higher 331° C. for CNF4MDI. Most significantly, the char residues significantly increased to 34.7, 36.1 and 43.3% with increasing MDI ratios from the 9.1% for FT-CNF. The more than tripled and quadrupled char residues could be ascribed to the aromatic moiety and low oxygen content in MDI, and along with lower decomposition rates attest to improved thermal stability of MDI crosslinked CNF aerogel.

Figure 6A:
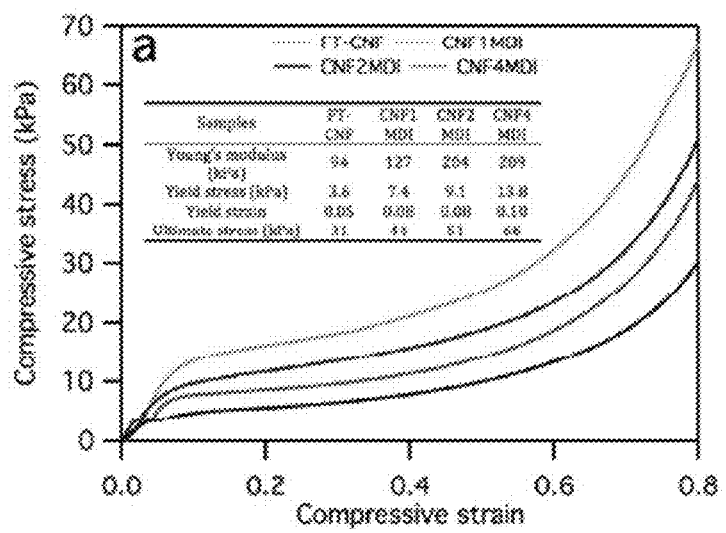
FIG. 6A shows compressive stress-strain curves of pure and MDI crosslinked FT-CNF aerogels.

The MDI crosslinked FT-CNF aerogels exhibited significantly increased modulus from 94 KPa for FT-CNF aerogel to 127, 204 and 209 MPa with increasing MDI ratios (FIG. 6A), clearly evident of strengthening via MDI crosslinking. Both yield stress and strain increased as the MDI ratio increased, up to more than tripled and doubled for CNF4MDI aerogel, respectively. However, elastic deformation could only sustain for up to 0.1 compressive strain for CNF4MDI, followed by a large plastic deformation, leading to non-recovery compression. The ultimate stress also increased with increasing MDI, doubling to 66 kPa for CNF4MDI aerogel.

Figure 6B:
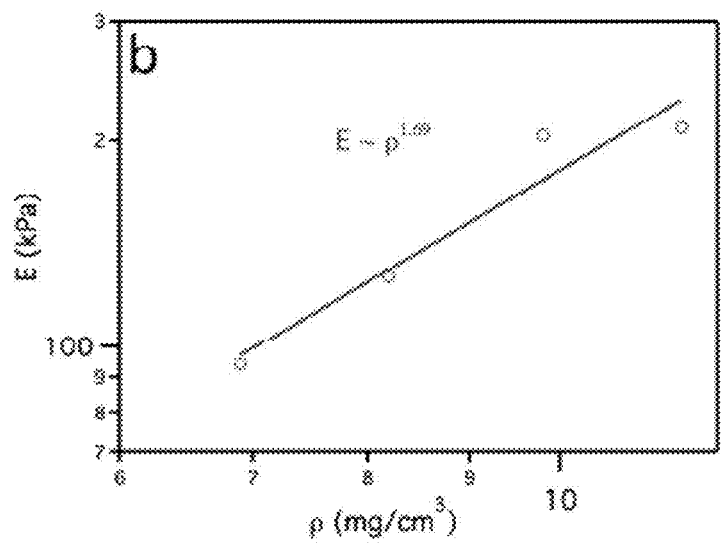
FIG. 6B shows log-log plots of Young's modulus.
Figure 6C:
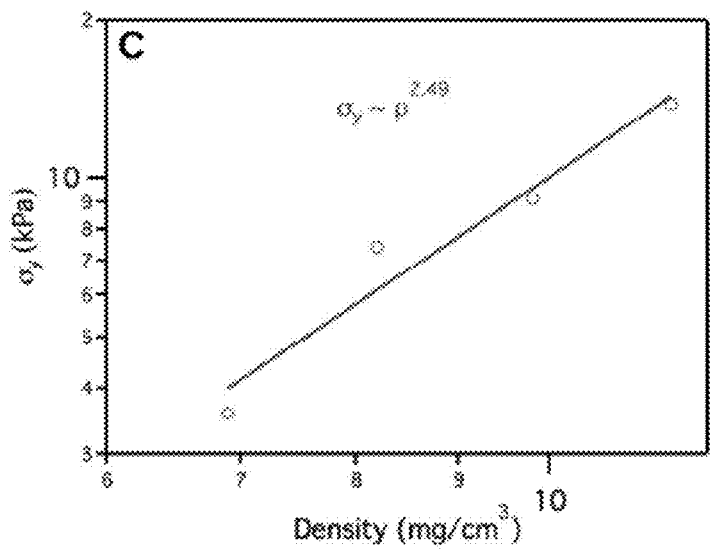
FIG. 6C shows log-log plots of yield stress.
Figure 6D:
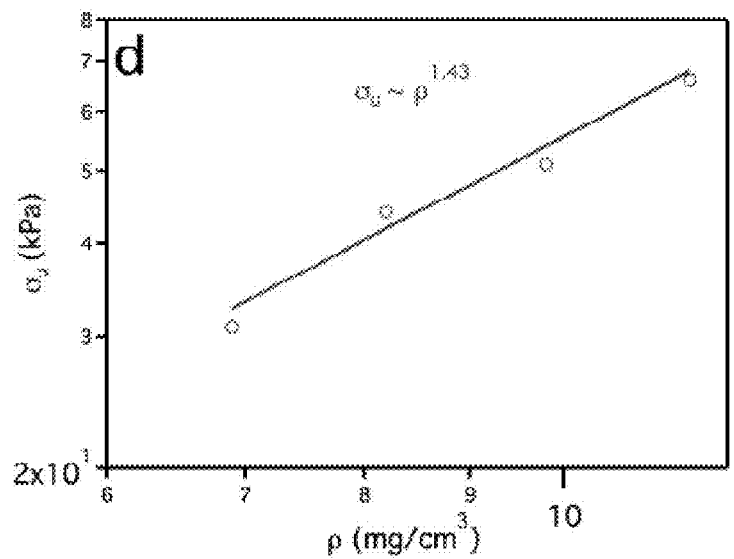
FIG. 6D shows log-log plots of ultimate stress versus density of aerogels.

Since the aerogel density also increased with the MDI crosslinking, Young's modulus (E), yield stress ($\sigma_y$) and ultimate stress ($\sigma_u$) were plotted against their density ($\varphi$ in log-log scale (FIG. 6B-6D), and fitted with a power law expression, $$E \text{ or } \sigma \sim \rho^n$$

where n is the scaling factor. All mechanical properties increased with increasing densities, with greater than 1 scaling factor n, showing non-linear relationships. The scaling factors for Young's modulus, yield stress and ultimate stress of MDI crosslinked FT-CNF aerogels were determined to be 1.69, 2.49 and 1.43, respectively. This is in contrast to the 1 scaling factor, or no scaling law effect, previously observed for TEMPO oxidized cellulose nanofibrils aerogel at density from 4-40 mg/cm³ (Kobayashi, Y.; Saito, T.; Isogai, A., *Angewandte Chemie-International Edition*, 2014, 53, 10394-10397). Therefore, the scaling law effect was attributed to the crosslinking of CNFs with the rigid MDI molecules, imposing greater improvement in mechanical properties over slightly increased aerogel density.

Figure 7A:
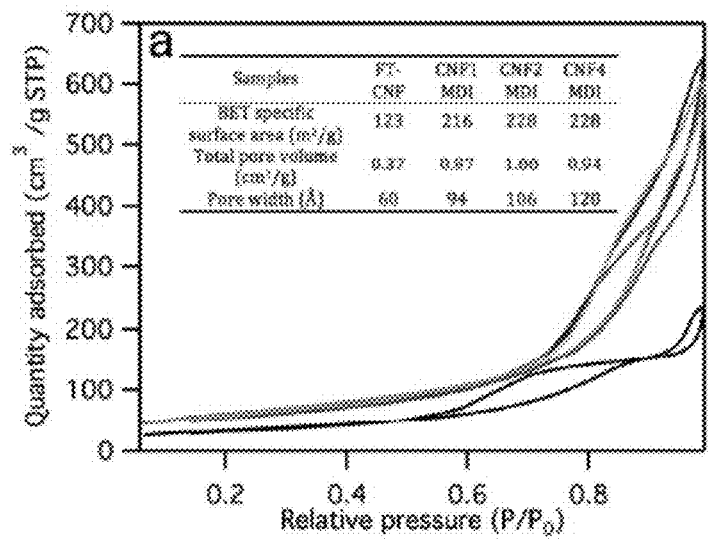
FIG. 7A shows BET nitrogen adsorption-desoption isotherm of pure and MDI crosslinked FT-CNF aerogel.
Figure 7B:
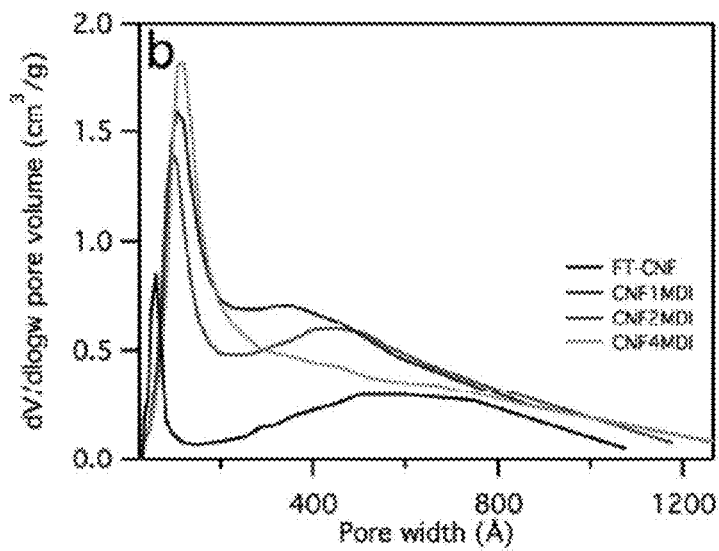
FIG. 7B shows pore size distribution of pure and MDI crosslinked FT-CNF aerogel.

MDI-crosslinked FT-CNF aerogels showed similarly type IV BET nitrogen adsorption-desorption isotherms, with the typical H1 hysteresis at $p/p_0$ above 0.7 (FIG. 7A). With increasing MDI, the crosslinked FT-CNF aerogels shift the bimodal pore distribution of the FT-CNF aerogel, i.e., a sharp peak at 6 nm and a shallow broad peak centered at 60 nm, to increasing intensities and sizes (9.4, 10.6 and 12.0 nm for CNF1MDI, CNF2MDI and CNF4MDI, respectively) of the smaller pore to essentially monodistributed pore size of CNF4MDI aerogel (FIG. 7B). Both specific surface area and pore volume increased from respective 123 m²/g and 0.37 cm³/g for the FT-CNF aerogel to 216 m²/g and 0.87 cm³/g for CNF1MDI aerogel, and 228 m²/g and 1.00 cm³/g for CNF2MDI aerogel. The almost doubled specific surface area and tripled pore volume of CNF2MDI aerogel indicated that additional smaller mesopore were created with the MDI crosslinking, either within the MDI aggregates or in the interspaces between MDI and CNF cellular wall surfaces. The high specific surface area and pore volume is consistent with the SEM observation that shows the tens of nm wide slit-like spaces were well preserved after crosslinking. At the highest MDI, CNF4MDI aerogel did not show further increased specific surface, but slightly decreased the pore volume to 0.94 cm³/g. Silica aerogel crosslinked with diisocyanate has also showed improved mechanical properties and hydrophobicity, however, the original high specific surface area of 700 m²/g was significantly decreased to as low as 8 m²/g as the pores were filled with diisocyanate.

Figure 8A:
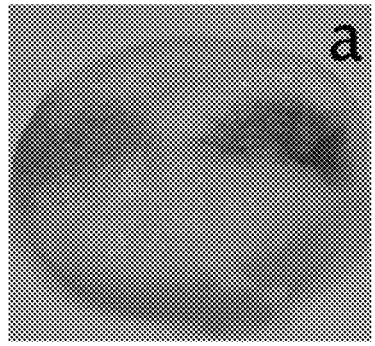
FIG. 8A shows water (dyed in blue with methylene blue) and chloroform (dyed in red with Sudan IV red) absorption onto FT-CNF aerogel.
Figure 8B:
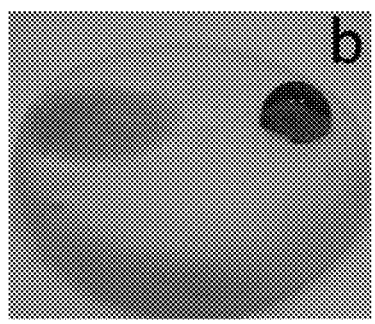
FIG. 8B shows water (dyed in blue with methylene blue) and chloroform (dyed in red with Sudan IV red) absorption onto CNF1MDI aerogel.
Figure 8C:
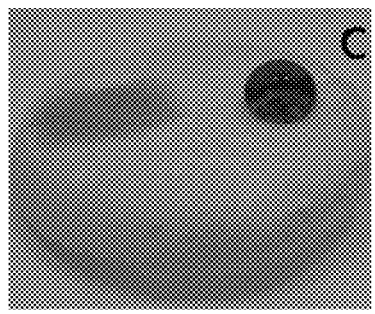
FIG. 8C shows water (dyed in blue with methylene blue) and chloroform (dyed in red with Sudan IV red) absorption onto CNF2NDI aerogel.
Figure 8D:
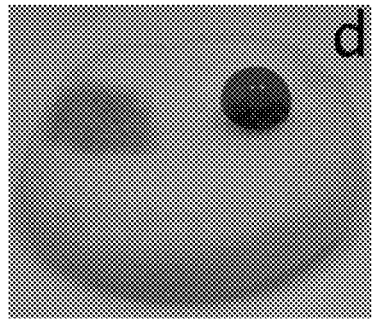
FIG. 8D shows water (dyed in blue with methylene blue) and chloroform (dyed in red with Sudan IV red) absorption onto CNF4MDI aerogel.
Figure 8E:
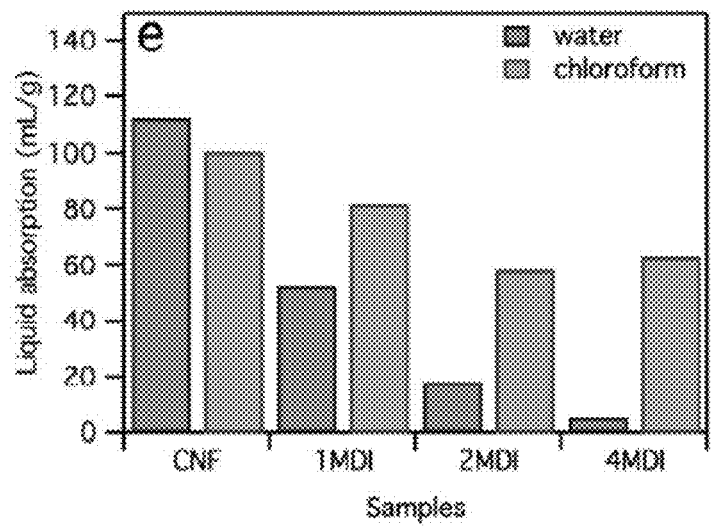
FIG. 8E shows absorption capacity of CNF aerogels toward water and chloroform.

Liquid affinity and separation of MDI crosslinked FT-CNF aerogel. FT-CNF aerogel is amphiphlic, capable of absorbing slightly more water (112.1 mL/g) than chloroform (100.8 mL/g) (FIGS. 8A and 8E). These liquid absorption values correspond to 77.7 and 69.9% of the pore capacity of 144.3 mL/g calculated from the aerogel density (6.9 mg/cm³) and crystalline cellulose density (1600 mg/cm³). All MDIcrosslinked FT-CNF aerogels became clearly more hydrophobic with water beading up on the surfaces (FIG. 8B-8D). The increasingly larger water contact angles with higher MDI (FIG. 8B-8C) are consistent with increasing differences between non-polar chloroform and polar water absorption (FIG. 8E). However, absorption of both polar and non-polar liquids decreased with increasing crosslinking, i.e., slightly decreased chloroform absorption to 81.7, 58.5, and 63.6 mL/g, but more sharply reduced water absorption to 52.8, 18.1 and 5.3 mL/g for CNF1MDI, CNF2MDI and CNF4MDI, respectively. The chloroform absorption corresponded to 69.9, 67.3, 57.6 and 73.7% of the pore capacities calculated from the actual densities of the crosslinked aerogels, i.e., of 144.3, 121.3, 101.4 and 86.3 mL/g for FT-CNF, CNF1MDI, CNF2MDI and CNF4MDI, respectively. The 70-74% chloroform absorption capacities of MDI-crosslinked CNF aerogels are in fact slightly higher than the 58-70% capacities of the lighter (2.7-8.1 mg/cm³ densities), suggesting higher pores accessibility.

Figure 8F:
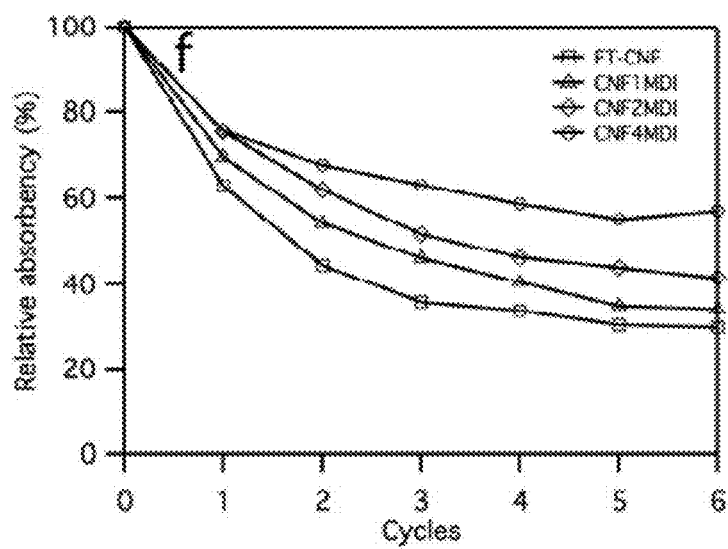
FIG. 8F shows cyclic absorption of chloroform onto CNF aerogels.
Figure 9A:
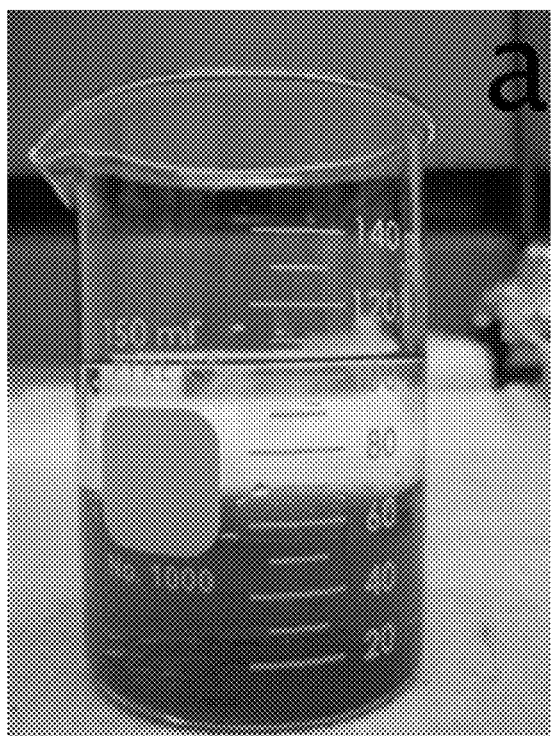
FIG. 9A-9E show oil-water separation using CNF4MDI as a filter.
Figure 9B:
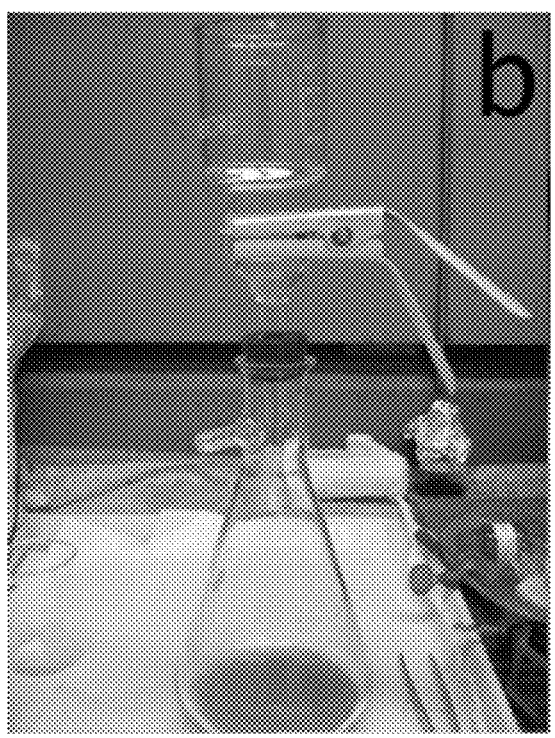
Figure 9C:
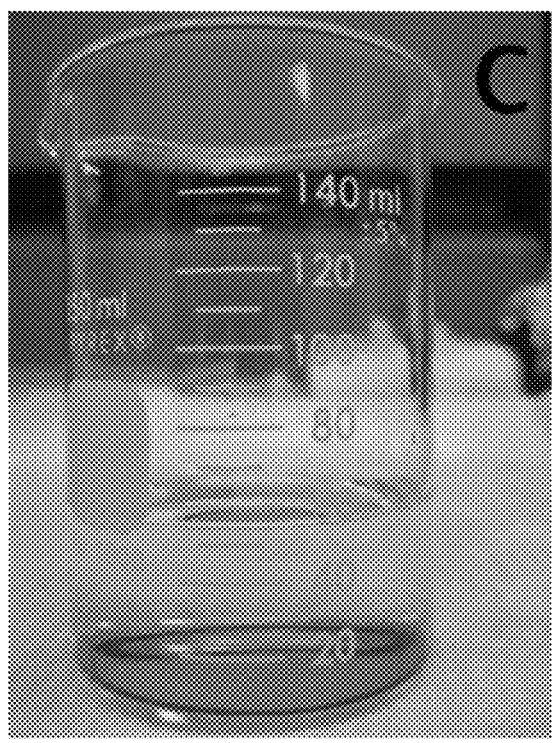
Figure 9D:
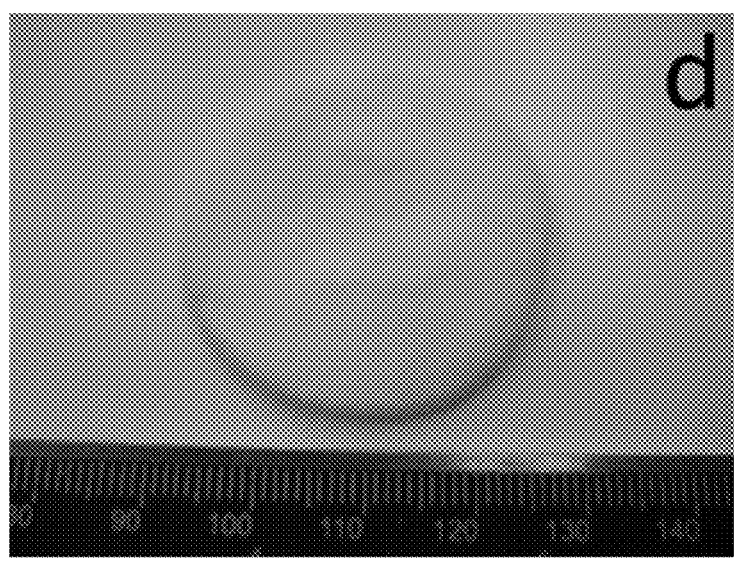
Figure 9E:
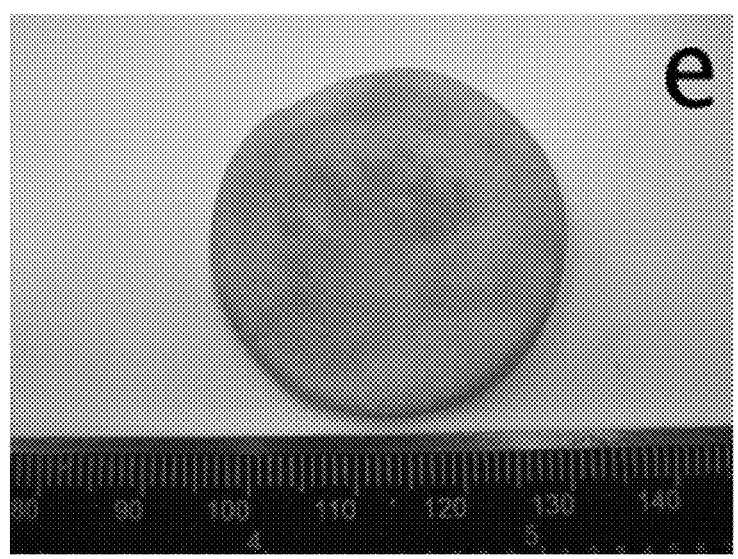

The cyclic absorption of chloroform was investigated by evaporating the absorbed chloroform prior to the next absorption cycle (FIG. 8F) to show drastic decreases in absorption in the first three cycles and stabilized after 5 cycles. Such decreased absorption was attributed to shrinkage in both lateral and thickness directions and the extent of shrinkage decreased with increasing MDI ratios. The dimensional shrinkage reduced chloroform absorption as the cycles increased, lowering to 29.9, 34.2, 41.5 and 57% for FT-CNF, CNF1MDI, CNF2MDI and CNF4MDI, respectively, after six cycles. In consistent with the less dimensional shrinkage, the CNF4MDI aerogel showed the highest relative absorbency, indicating that the MDI crosslinked structure is more rigid to resistant against shrinkage caused by the surface tension during liquid evaporation.

Separation of oil from water was evaluated via simple filtration using the most hydrophobic and least hydrophilic CNF4MDI aerogel (FIG. 9A-9E). Chloroform (dyed in red color) and water were mixed at 1:1 ratios and immediately phase separated. Upon pouring over a 5 mm thick disc CNF4MDI aerogel filter (FIG. 9D), chloroform pulled by house vacuum and permeated through the lipophilic CNF4MDI aerogel into the flask below while water was retained above by the hydrophobic CNF4MDI aerogel filter, effectively separating water and oil. The used aerogel filter retained some chloroform as shown by the red color, but remain effective in separating chloroform-water mixture for up to ten times. This repetitive filtration capability of this MDI-crosslinked CNF aerogel filter demonstrated clearly advantage for efficient and cyclical separation of large amount of oil pollutant from water, without being limited by the actual absorption capacity of the materials.

Conclusions

Gelation of TEMPO oxidized cellulose nanofibrils via both freezing-thawing and hydrochloric acid methods were explored to form CNF hydrogels that were further modified through chemical crosslinking with MDI. Freezing-thawing treatment resulted in slightly less transparent hydrogel, showing 10-24% transmittance at 350-800 nm wavelength as compared to the 31-43% for HCl hydrogel. Solvent exchanging to acetone and tert-butanol followed by freeze-drying yielded similarly white opaque aerogel with respective densities of 6.9 and 8.3 $mg/cm^3$ for FT- and HCl-CNF aerogels. FT-CNF aerogel showed honeycomb structure containing both 200-500 μm wide large pores and numerous slit-like spaces of less than 50 nm on the pore walls, with 123 $m^2/g$ specific surface area and 0.37 $cm^3/g$ pore volume. In contrast, HCl-CNF aerogel appeared mostly fibrillar structure with a few hundreds of nm wide spaces among the nanoparticulates, showing higher specific surface area and pore volume of 209 $m^2/g$ and 0.96 $cm^3/g$, respectively. The more extensively assembled honeycomb structure of FT-CNF aerogel led to better performance in terms of thermal stability (char residues of 9.1 vs. 3.6% for HCl-CNF aerogel), mechanical properties (Young's modulus of 94 vs. 44 kPa for HCl-CNF aerogel) and liquid absorption capacity (water absorption capacity of 112.1 vs. 28.0 mL/g for HCl-CNF aerogel). MDI crosslinking of FT-CNF aerogel led to an increase in density of 19, 42, and 67% at 1:1, 2:1, and 4:1 MDI:CNF ratios, respectively. The successful crosslinking of FT-CNF aerogel with MDI was confirmed from the aggregates formed on the thin pore walls, as well as FTIR peaks at 1540.8 and 1234.2 $cm^{-1}$ for C—N stretching and N—H bending of amide II and III. MDI crosslinking clearly improved the thermal stability of CNF aerogel showing more than four times increase in the char residues, as well as almost half degradation rate. Mechanical properties were also significantly improved after crosslinking, showing power law scaling effect vs. density with scaling factor of 1.69, 2.49 and 1.43 for Young's modulus, yield stress and ultimate stress, respectively. Besides, both specific surface area and pore volume significantly increased from 123 $m^2/g$ and 0.37 $cm^3/g$ to 228 $m^2/g$ and 1.00 $cm^3/g$ after crosslinking. Most importantly, MDI crosslinking improved the hydrophobicity of the CNF aerogel, showing significantly reduced water absorption capacity from 112.1 to 5.3 mL/g. Therefore, the crosslinked aerogel could be used as filter membrane to achieve oil-water separation via a simple filtration method.

Example 2. Electrospun Cellulose Aerogels

Methods

Materials. Ultra-fine cellulose fibrous membrane were prepared by electrospinning of cellulose acetate followed by alkaline hydrolysis. The as-obtained cellulose membrane was cut into 5×5 mm pieces and then dispersed in water by high speed blending (37,000 rpm, 5 min). Methyltrichlorosilane (99%, Sigma-Aldrich), methylene blue (Certified biological stain, Fisher Scientific), hexane (Certified ACS, Fisher Scientific), decane (Certified, Fisher Scientific), cyclohexane (HPLC grade, EM Science), acetone (Histological grade, Fisher Scientific), xylene (GR ACS, EM Science), toluene (Certified ACS, Fisher Scientific), pump oil (Maxima C Plus, Fisher Scientific), DMSO (GR, EMD), chloroform (Certified ACS, Fisher Scientific).

Fabrication of electrospun (ES) cellulose aerogel. ES cellulose aerogels were fabricated by freezing of aqueous suspensions of ultrafine ES cellulose fibers (0.1-0.6 wt %) at −20° C. for 5 h followed by freeze-drying. Vapor deposition of methyltrichlorosilane on ES cellulose aerogel (0.4%) was conducted at 85° C. for 30 min in a vacuum oven. Carbonization of ES cellulose aerogel (0.6%) was conducted by heating in nitrogen at 10° C./min to 800° C. and then held at 800° C. for 30 min.

The carbonized cellulose nanofiber aerogel (CNA) was used to prepare supercapacitor electrode without binder and conductive additive. Roughly 1 mg CNA was directly applied to 1 $cm^2$ nickel foam and the resulting electrode was roller pressed to 50 μm in thickness to improve the contact of nanofiber and nickel foam. The supercapacitor cells were constructed by using two identical electrodes with cellulose filter paper as separator into symmetric button cells and sealed with a manual crimper (CR2032, MTI). 6 M KOH in water was the electrolytes.

Results and Discussion

Figure 10A:
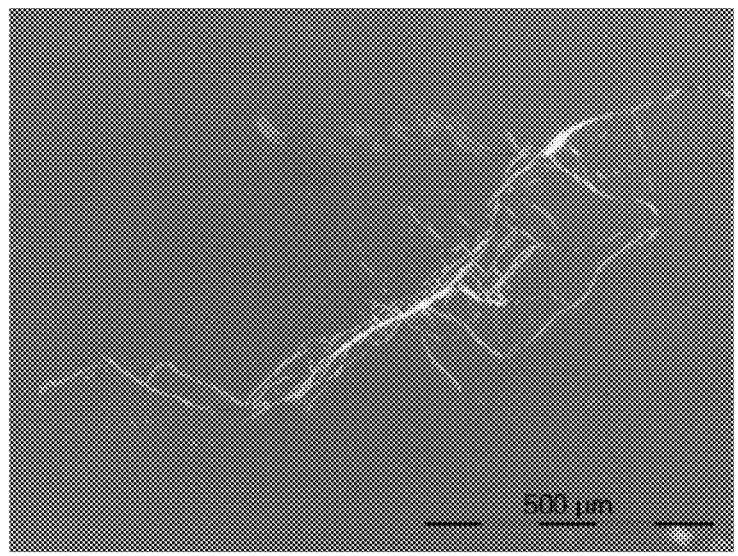
FIG. 10A-10B show light microscopy images of ES cellulose.
Figure 10B:
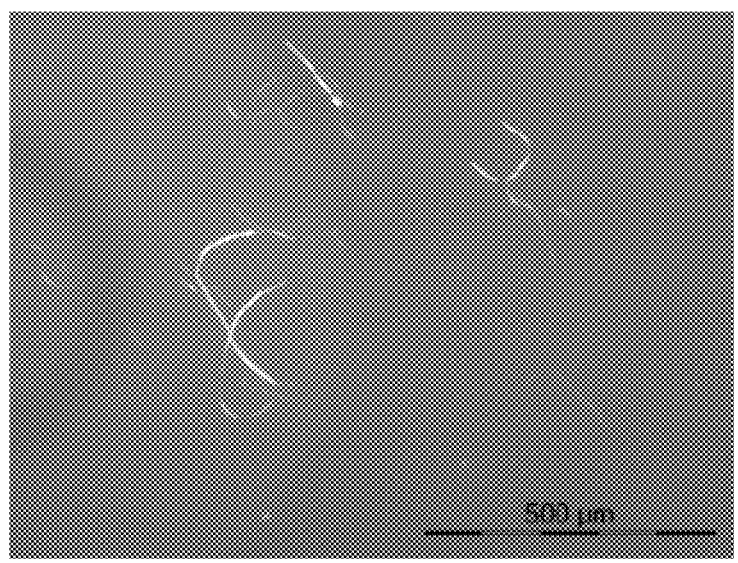

Blending 5 $cm^2$ ES cellulose membrane pieces generated ultra-fine fibers ranged from few hundred μm to over one cm in lengths (FIG. 10A-10B).

Figure 11A:
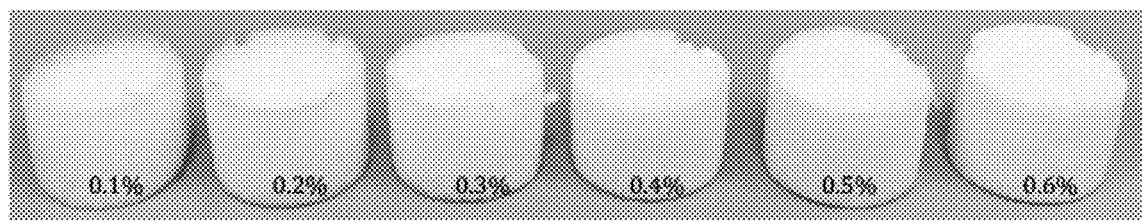
FIG. 11A shows 0.1-0.6 wt % of ultra-fine ES cellulose fibers.
Figure 11B:
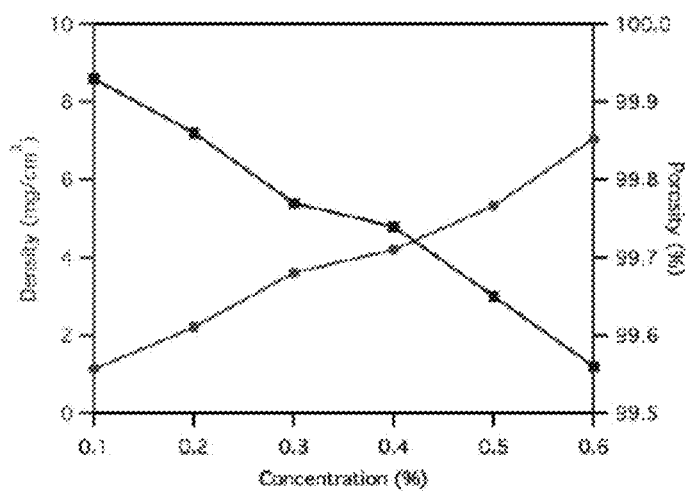
FIG. 11B shows the ES cellulose fibers densities and porosities.

Aqueous suspensions (0.1-0.6 wt %) of these ultra-fine ES cellulose fibers were self-assembled into super-light weight aerogels with densities ranging from 1.1-7.0 $mg/cm^3$ and porosity of 99.6-99.9%, via freezing and freeze-drying (FIG. 11A-11B).

Figure 12:
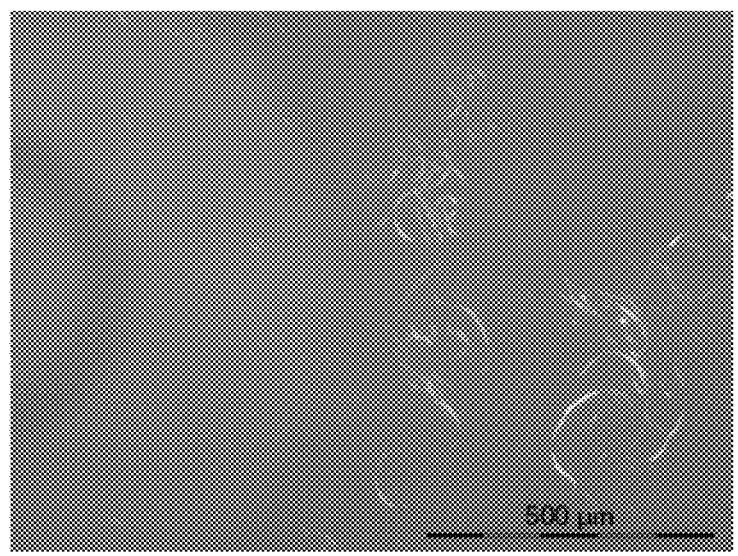
FIG. 12 shows ES cellulose aerogels after redispersion in water by light microscopy image.

The ES cellulose aerogels were readily dispersed in water into the original ultra-fine fibers by simple hand shaking as observed by the light microscopy image (FIG. 12).

Figure 13A:
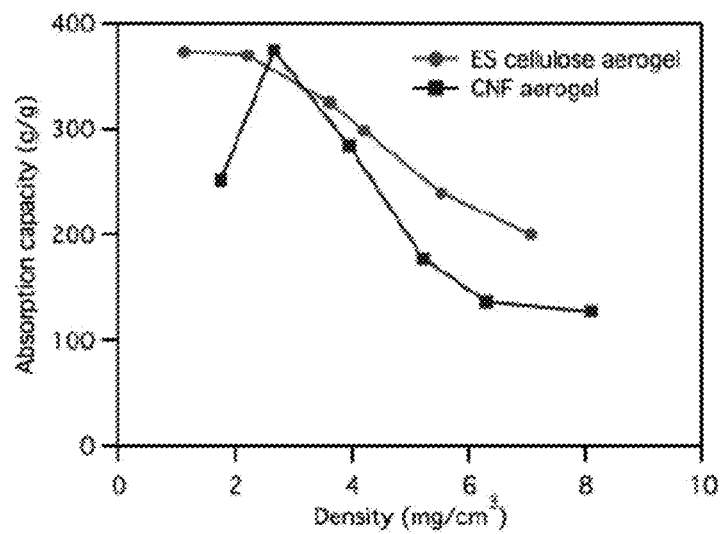
FIG. 13A-13B show absorption and density of ES cellulose fibers.
Figure 13B:
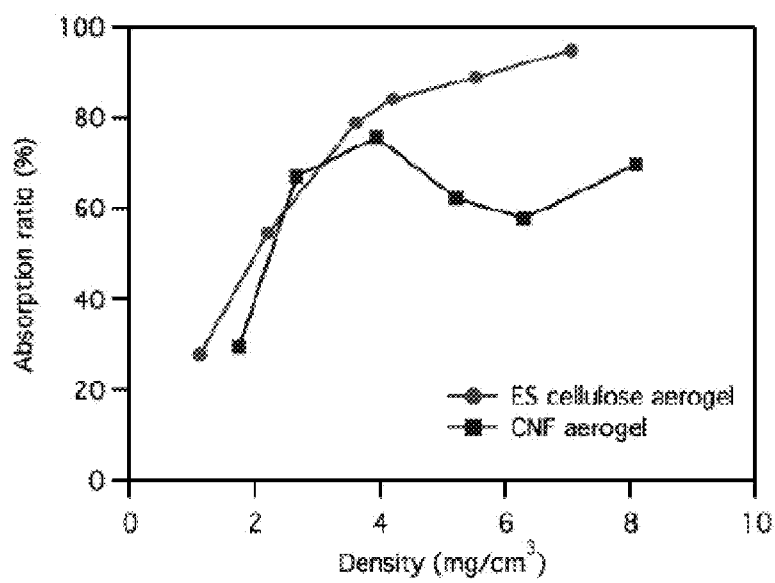
Figure 14A:
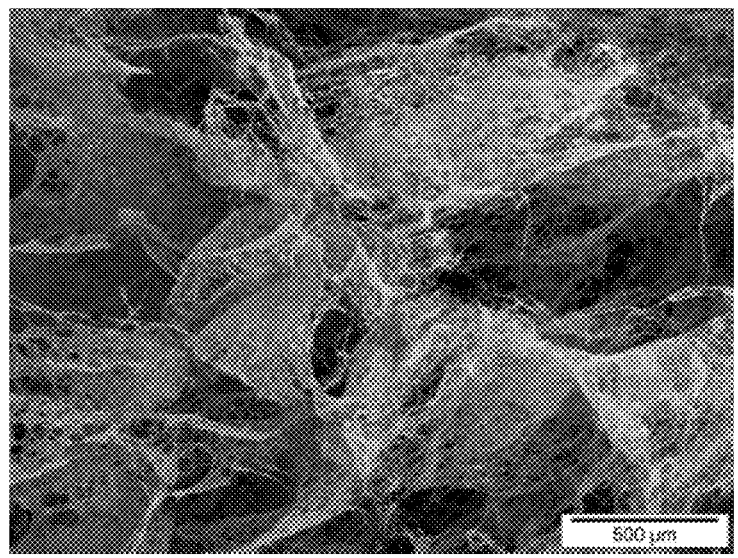
FIG. 14A-14H show SEM images of the ES cellulose aerogels.
Figure 14B:
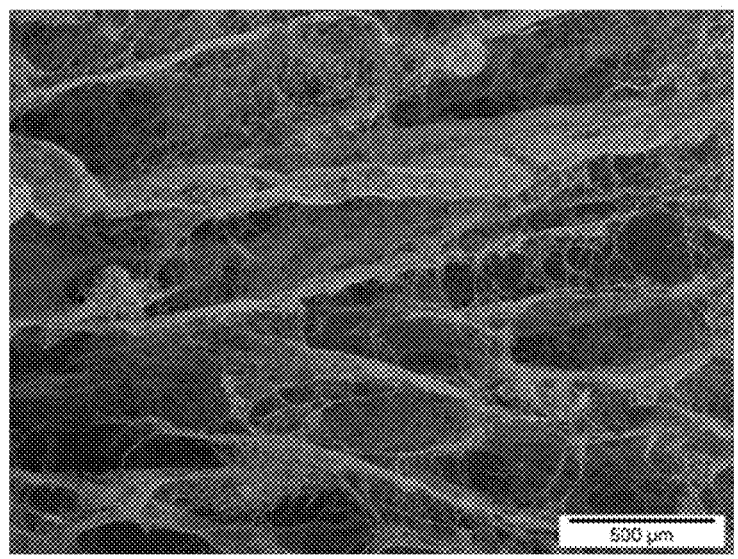
Figure 14C:
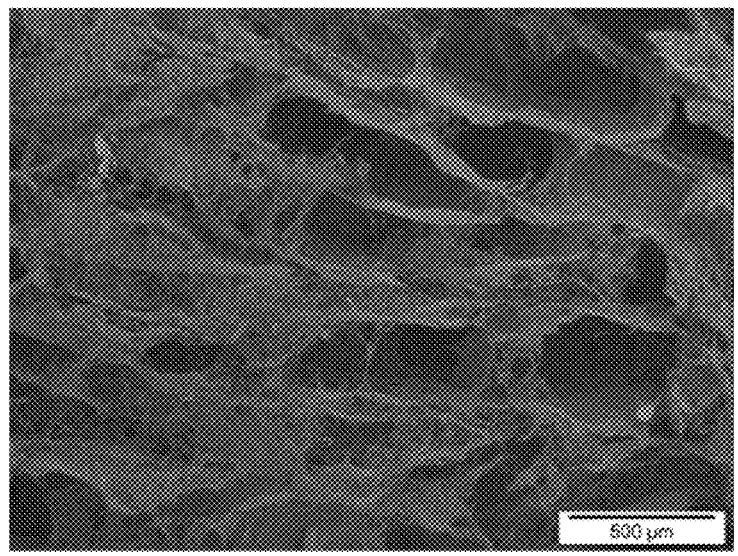
Figure 14D:
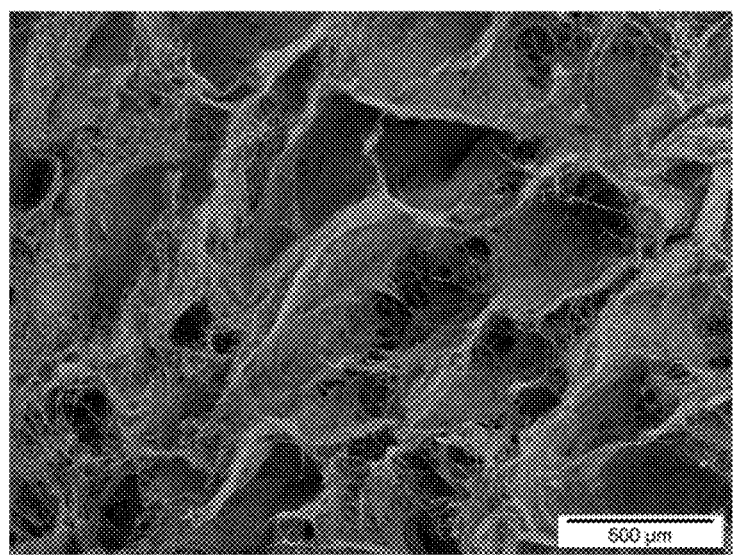
Figure 14E:
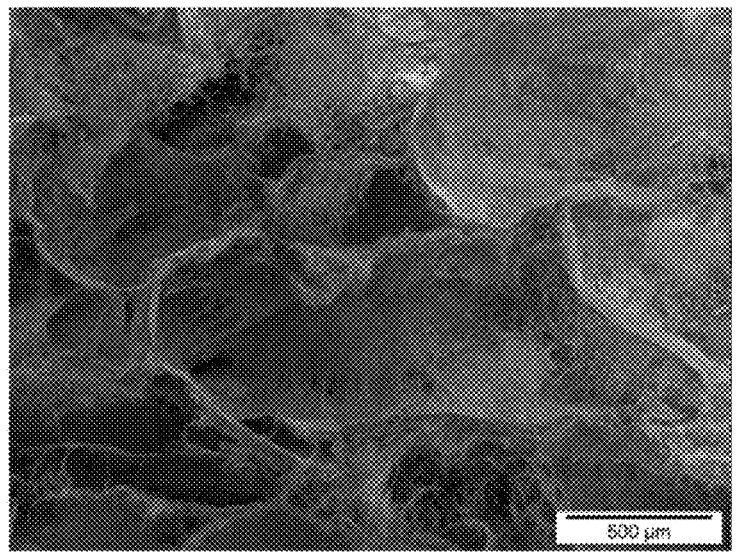
Figure 14F:
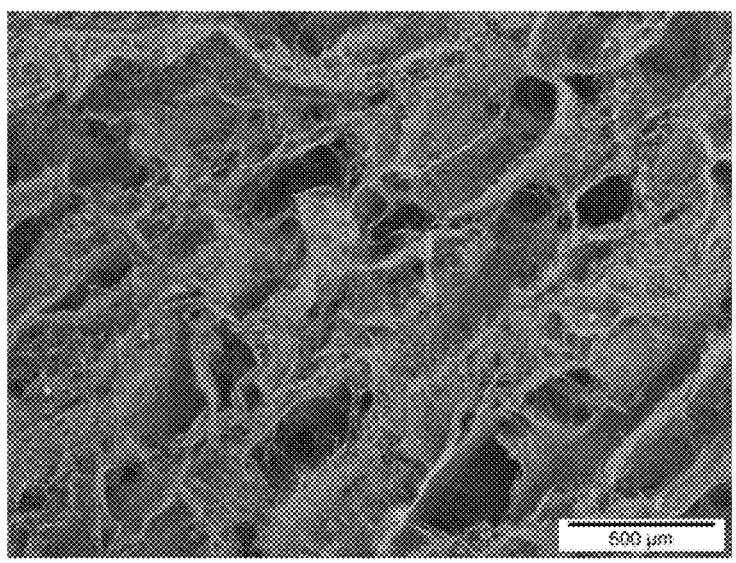
Figure 14G:
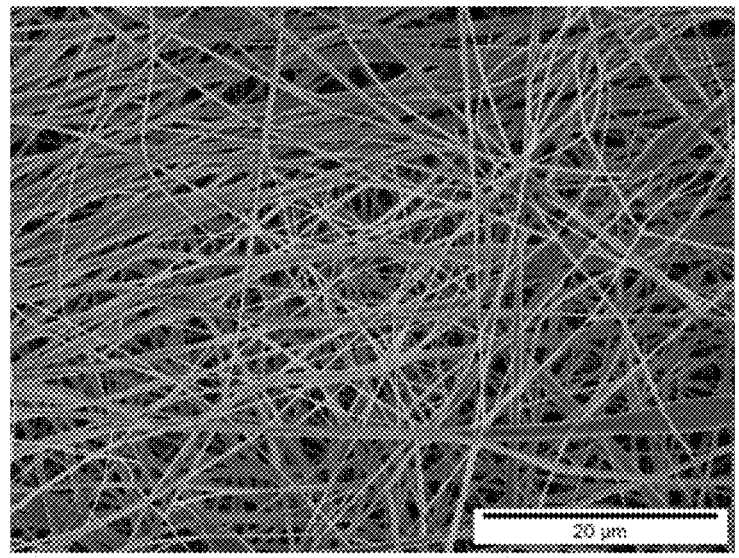
Figure 14H:
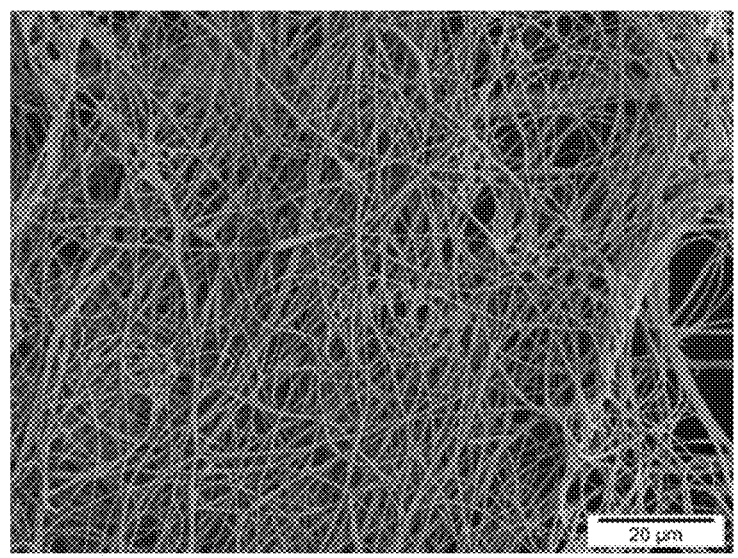

The ES cellulose aerogels are super-absorbents toward organic liquids, as demonstrated by the 201-373 g/g of absorption capacity toward chloroform, decreasing with the increased aerogel density (FIG. 13A). Based on the theoretical absorption capacity calculated from the density of aerogel, over 95% of the pores within aerogel were accessible, much higher than the 70% accessible pores for aerogels assembled from cellulose nanofibrils (CNFs).

The SEM images of the ES cellulose aerogels showed highly porous structures with large pores of over several hundreds of microns wide (FIG. 14A-14H). Closer inspection of the pore walls indicated that they were all assembled by the micron-sized ES fibers, and the fibers are arranged randomly similar to the original ES membrane. This is in contrast to the closely packed self-assembled cellulose nanofibrils into film-like structures as in the case of CNF aerogel. The micron-sized ES fibers overlay each other forming a loose network structure, which contribute to the more accessible pores as indicated by the liquid absorption capacity.

Figure 15A:
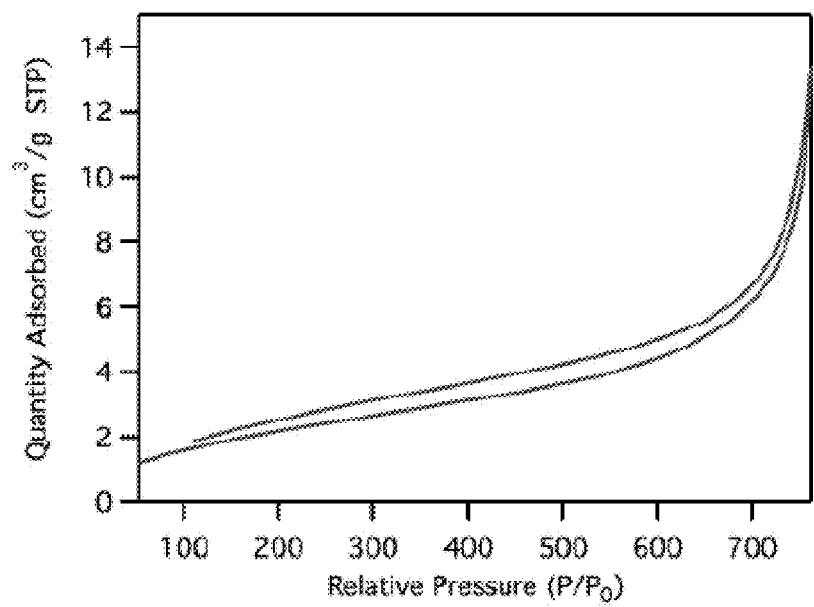
FIG. 15A shows BET absorption-desorption of the ES cellulose aerogel.
Figure 15B:
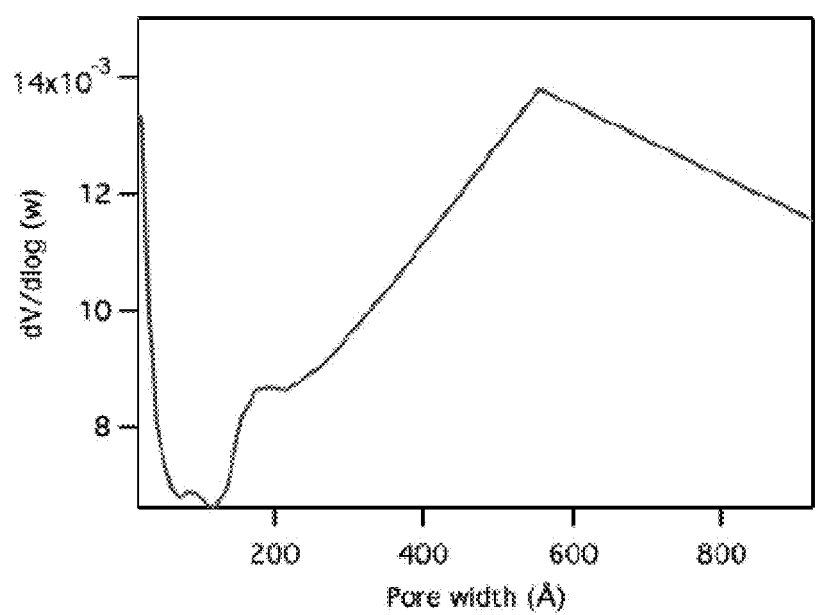
FIG. 15B shows pore size distribution of ECF aerogel.

BET N2 adsorption-desorption of the ES cellulose aerogel showed macro-porous structure with specific surface area and pore volume of 7.9 $m^2/g$ and 0.016 $cm^3/g$, respectively, similar to the 7.6 $m^2/g$ and 0.015 $cm^3/g$ for the original ES membrane (FIG. 15A-15B).

Figure 16:
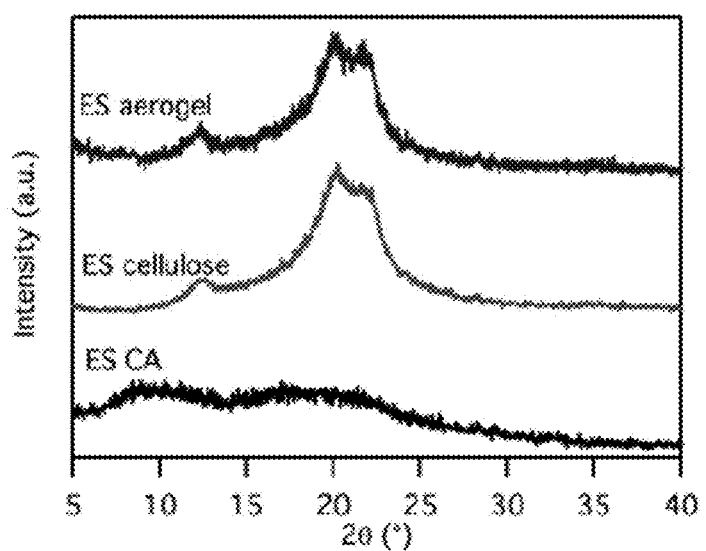
FIG. 16 shows XRD spectra of ES cellulose membrane and aerogel.

XRD spectra showed both ES cellulose membrane and aerogel showed similarly cellulose II crystalline structure (FIG. 16). Self-assembled ES cellulose aerogels resembled the original ES cellulose membranes in specific area or crystalline structure as evident by both BET and XRD.

Figure 17A:
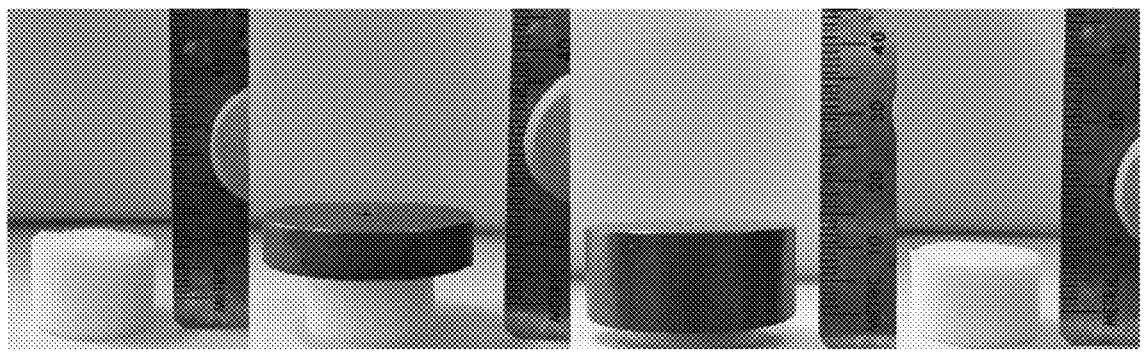
FIG. 17A shows that a piece of ES cellulose aerogel could withstand a 2 oz weight, or over 2250 times of its own weight.
Figure 17B:
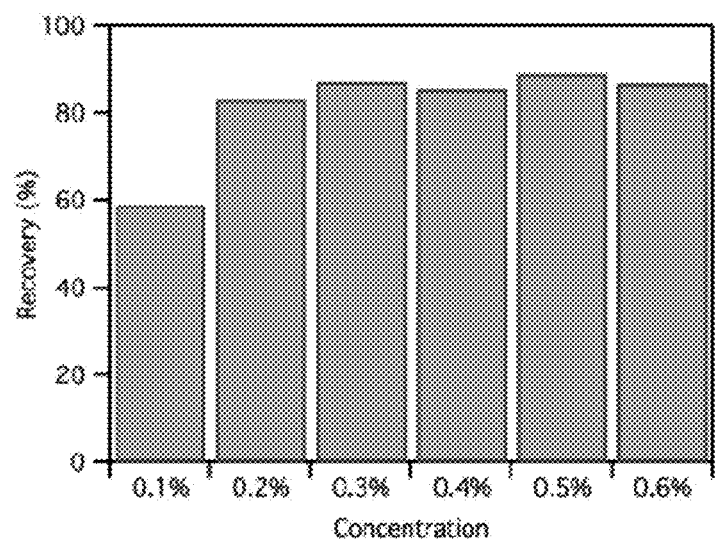
FIG. 17B shows the ES cellulose aerogel recovery % in relation to the concentration.
Figure 17C:
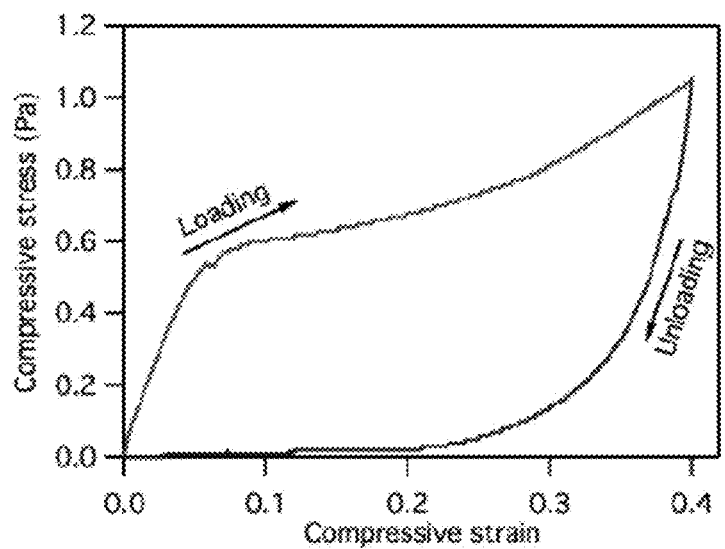
FIG. 17C shows the loading-unloading curve of the 0.4% ES aerogel.
Figure 18A:
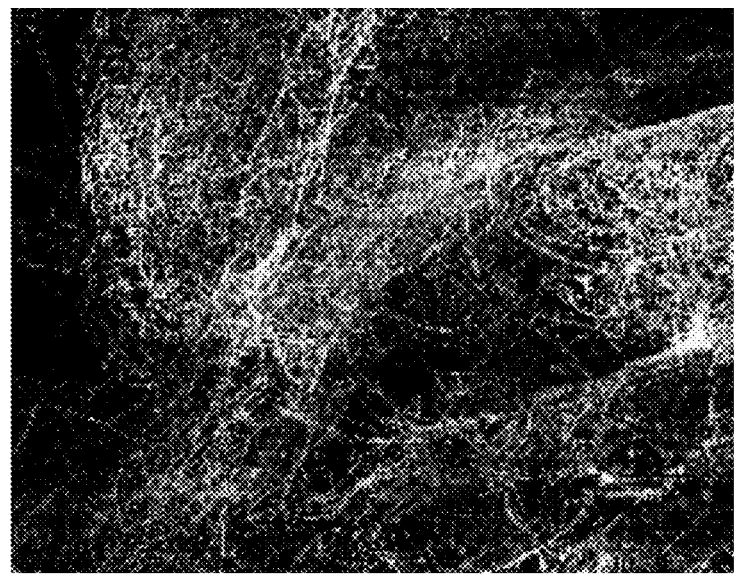
FIG. 18A shows SEM of silanized ECF aerogel.
Figure 18B:
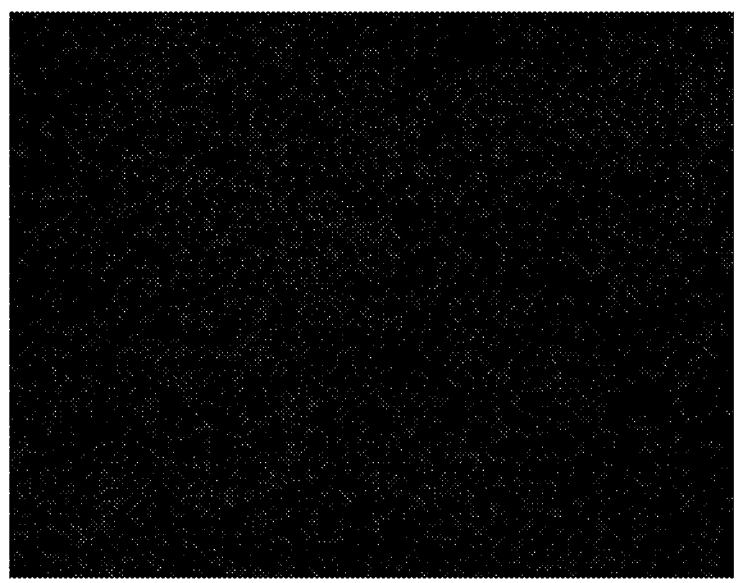
FIG. 18B shows EDS C (58.8 at %) mapping of silanized ECF aerogel.
Figure 18C:
FIG. 18C shows EDS O (38.3 at %) mapping of silanized ECF aerogel.
Figure 18D:
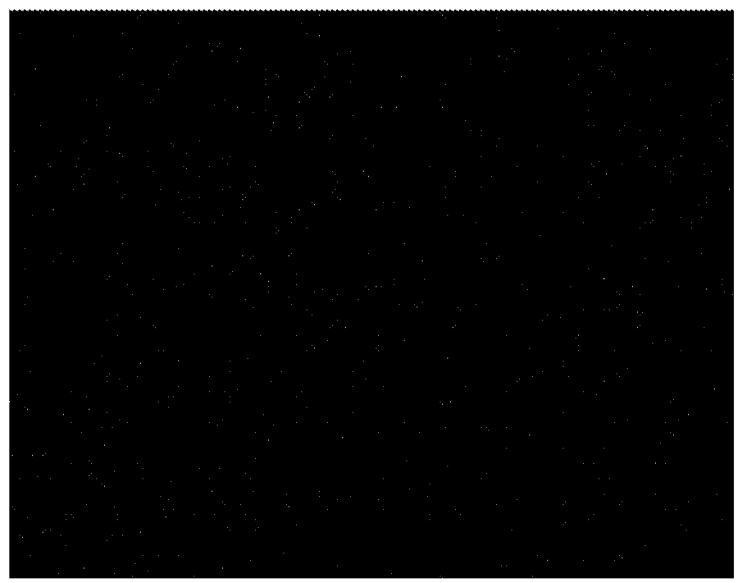
FIG. 18D shows EDS Ci (2.5 at %) mapping of silanized ECF aerogel.

ES cellulose aerogels showed interesting dry shape recovery properties in air (FIG. 17A), in contrast to the CNF aerogel that does not recover once compressed in air. The pictures showed that a piece of aerogel (25.2 mg) could withstand a 2 oz weight, or over 2250 times of its own weight. Doubling the weight to 4 oz deformed the aerogel, but the aerogel recover to 86% of its original dimension upon removal of the load (FIG. 17B). The loading-unloading curve of the 0.4% ES aerogel showed that the aerogel starts to recover once the loading is released and the stress does not return to 0 until the strain recover to 0.1, indicating good shape recovery properties (FIG. 17C).

The ES cellulose aerogel was modified with methyltrichlorosilane to render it hydrophobicity and retain shape when exposed to water. The EDS mapping of the modified ES cellulose aerogel showed uniformly Si atom distribution with 2.5% atomic concentration, indicating uniform surface reaction of cellulose fibers with methyltrichlorosilane.

Figure 19A:
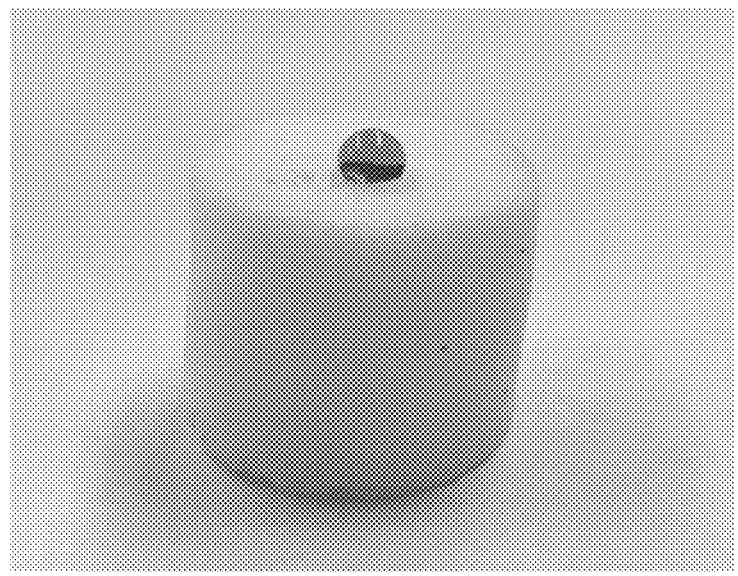
FIG. 19A shows the hydrophobicity of the ES cellulose aerogel with a water droplet deposited on the ES cellulose aerogel.
Figure 19B:
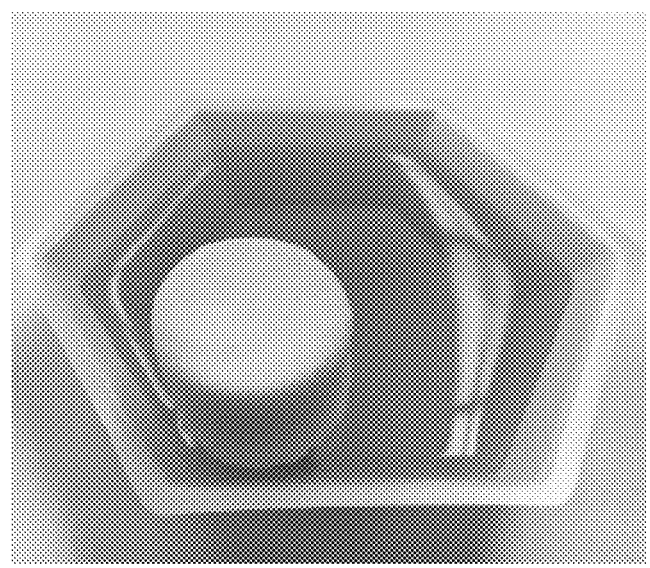
FIG. 19B shows the ES cellulose aerogel floating on the water surface.

The increased hydrophobicity could be clearly demonstrated by the large contact angle between a water droplet deposited on the modified ES cellulose aerogel that could stand on the water surface without absorbing any water (FIG. 19A). This is completely opposite to the immediate disintegration of the original ES cellulose aerogel when placed in water.

Figure 20A:
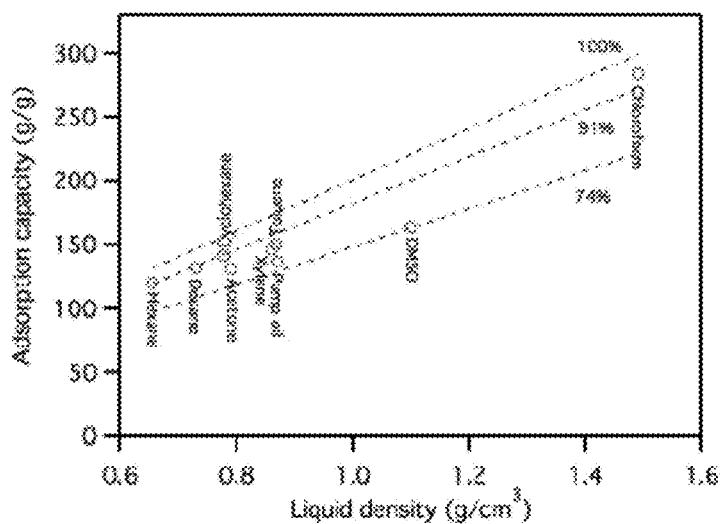
FIG. 20A-20B show the absorption capacity of the ES cellulose aerogel in relation to the density and the liquid used for absorption.
Figure 20B:
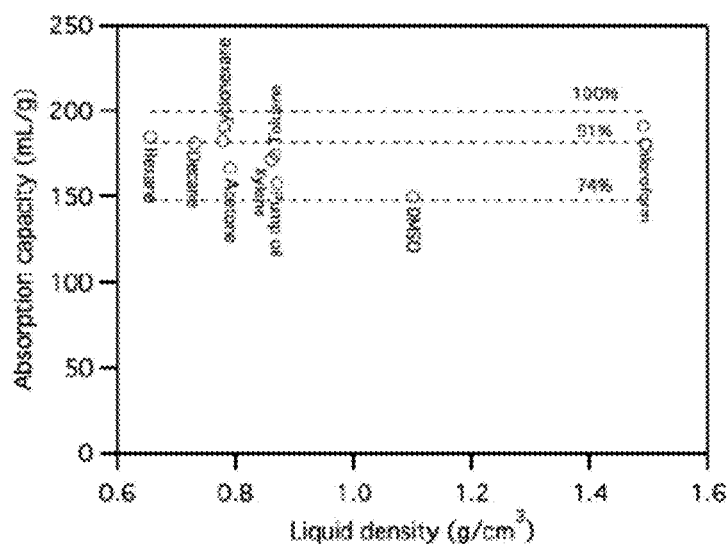

The absorption capacity of the unmodified ES cellulose aerogel ranges from 120-283 g/g, or 150-192 mL/g, depending on the density, viscosity and polarity of the liquid used for absorption (FIGS. 20A-20B). For chloroform, it could be observed that the absorption capacity accounts to over 96% of the theoretical absorption capacity, indicating most of the pores were accessible for liquid absorption.

Figure 21:
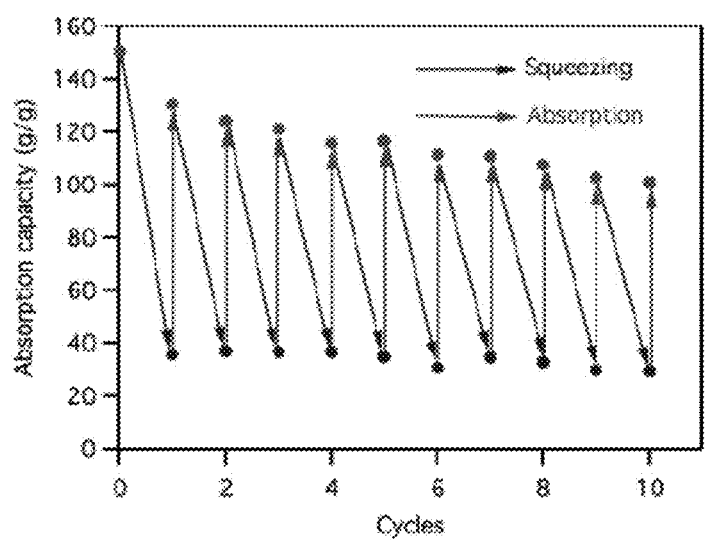
FIG. 21 shows the squeezing-reabsorption capacity cycle of the ES cellulose aerogel.
Figure 22A:
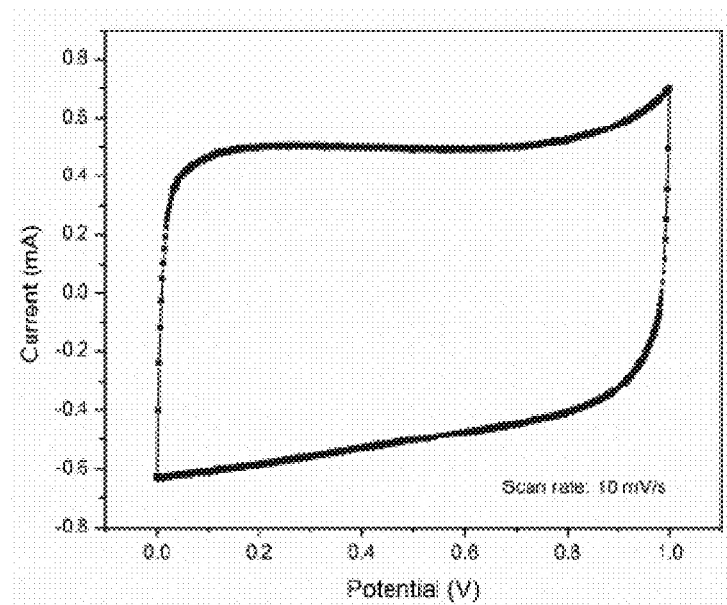
FIG. 22A shows a cyclic voltammogram of the ES cellulose aerogel.
Figure 22B:
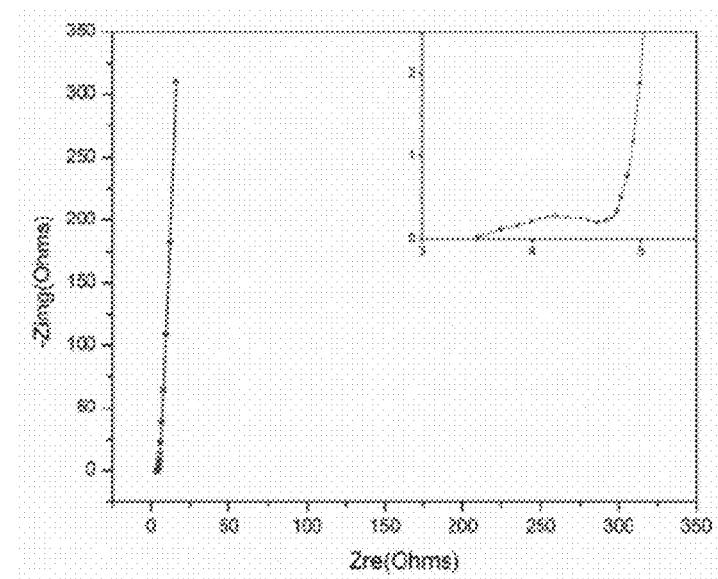
FIG. 22B shows a Nyquist plot of the ES cellulose aerogel.
Figure 22C:
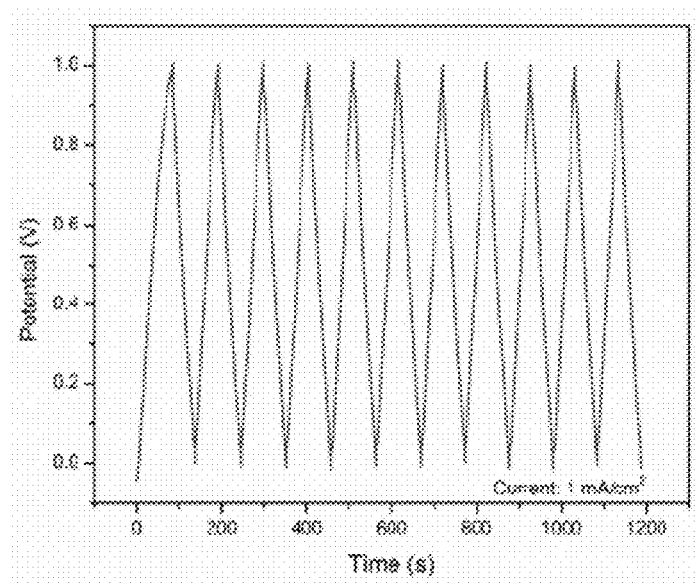
FIG. 22C shows the constant current charge/discharge curves at 1 mA/cm$^2$ of carbonized ECF aerogel.
Figure 23A:
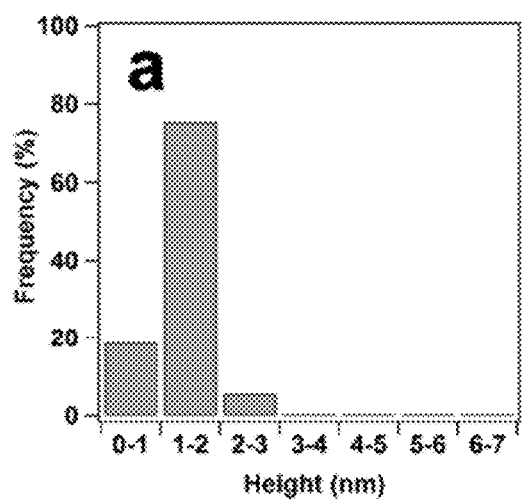
FIG. 23A-F show characterizations of CNFs in aqueous state.
Figure 23B:
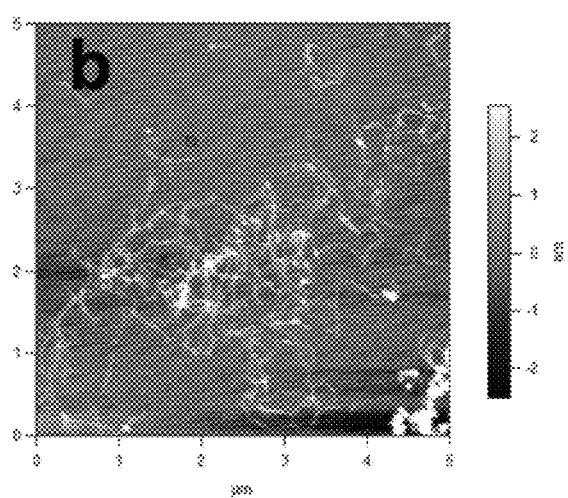
Figure 23C:
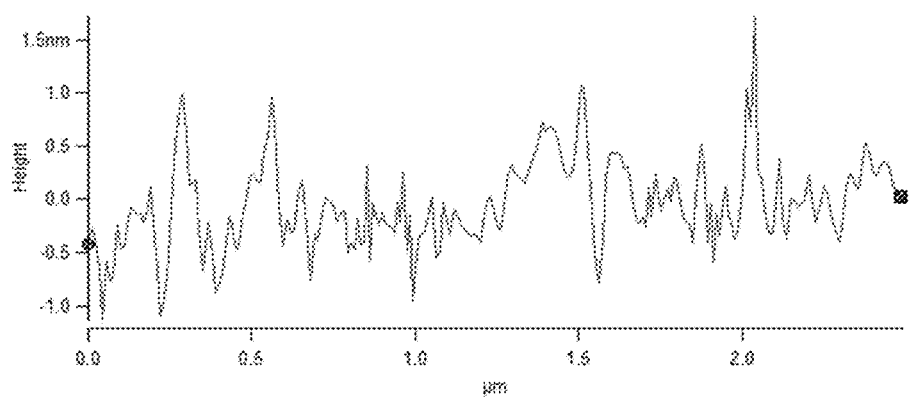
Figure 23D:
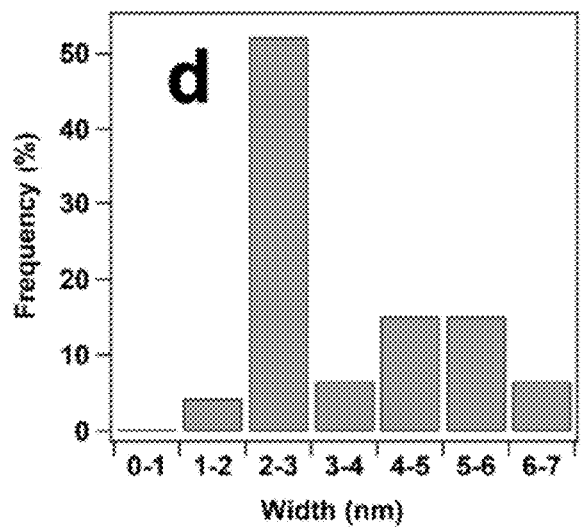
Figure 23E:
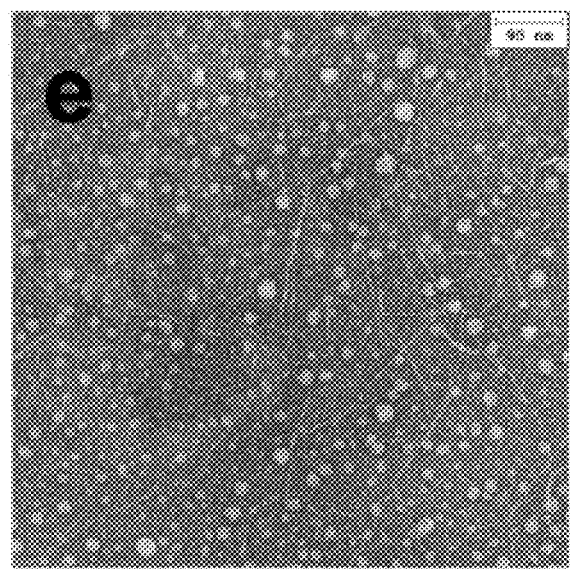
Figure 23F:
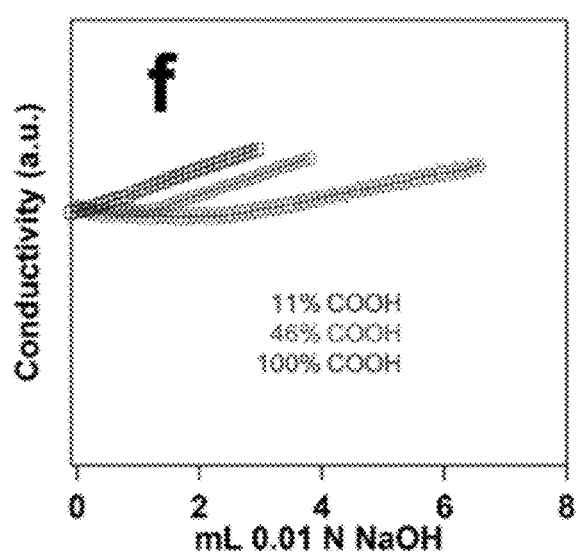
Figure 24A:
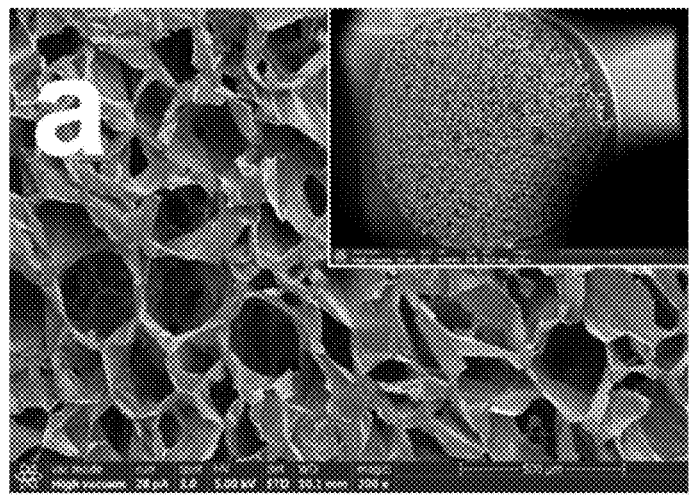
FIG. 24A-24I show the effect of protonation on aerogel morphology by freezing 0.6 wt % CNF suspensions at −20° C. followed by freeze drying.
Figure 24B:
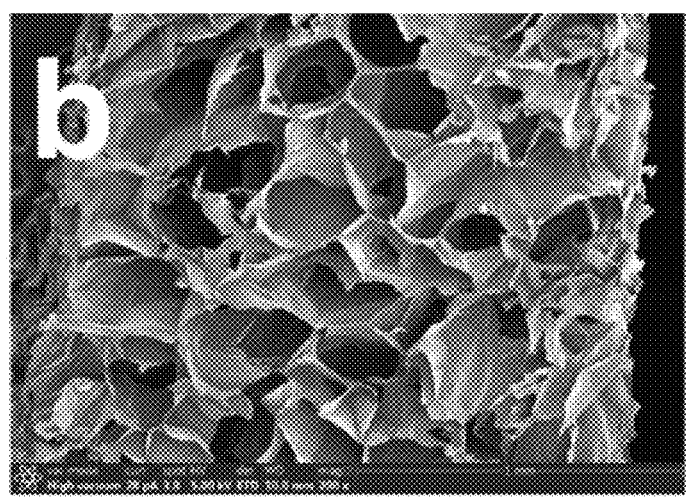
Figure 24C:
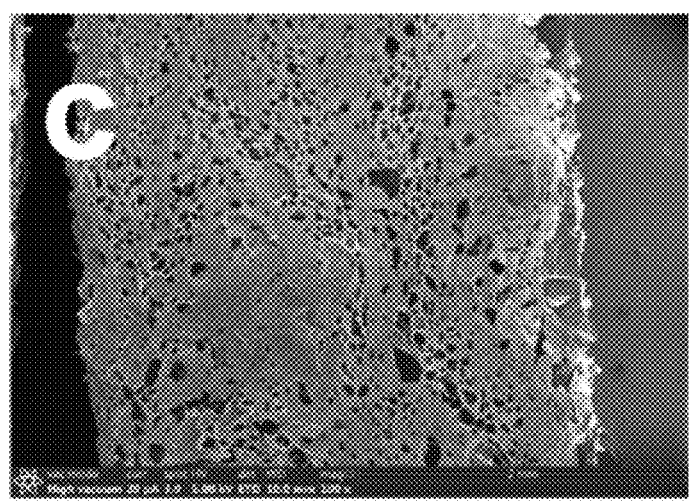
Figure 24D:
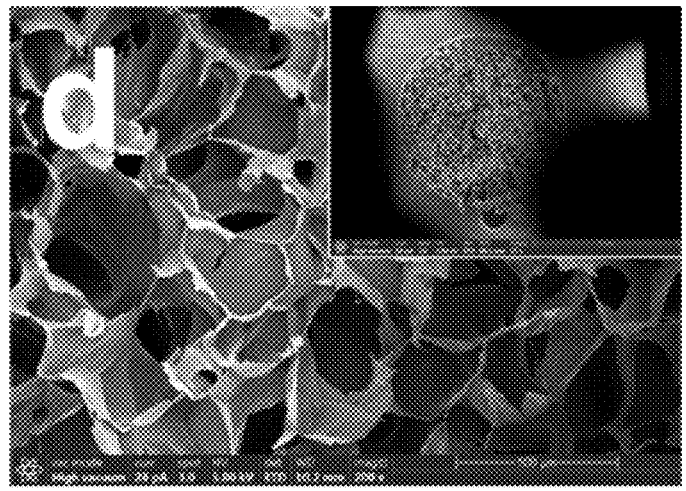
Figure 24E:
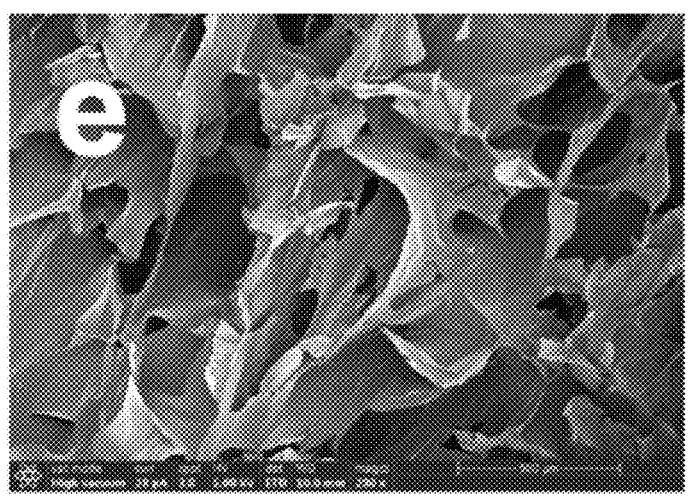
Figure 24F:
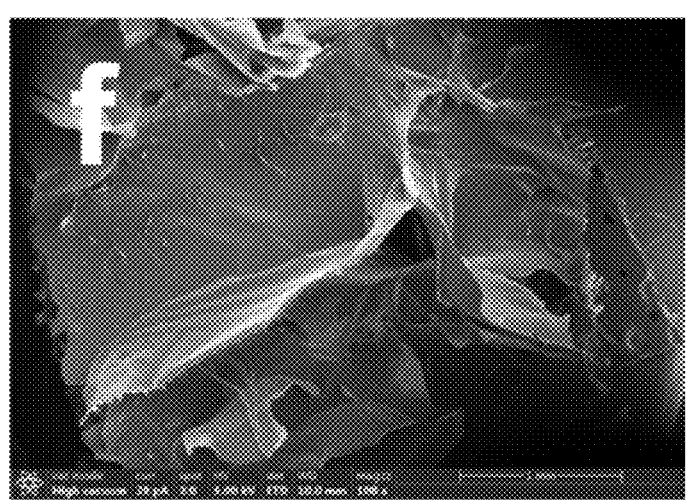
Figure 24G:
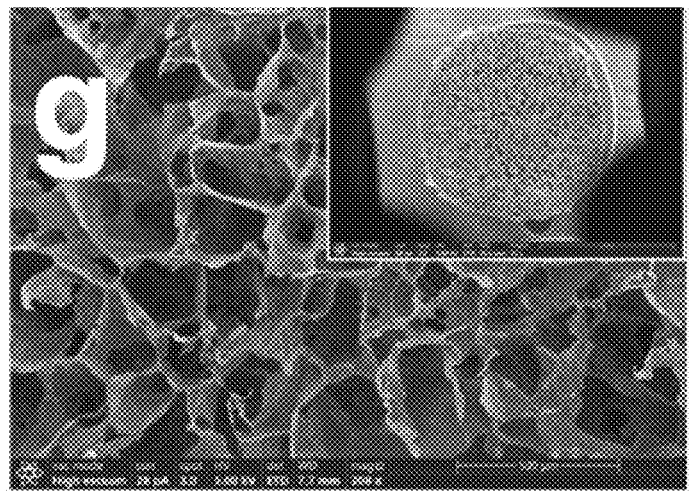
Figure 24H:
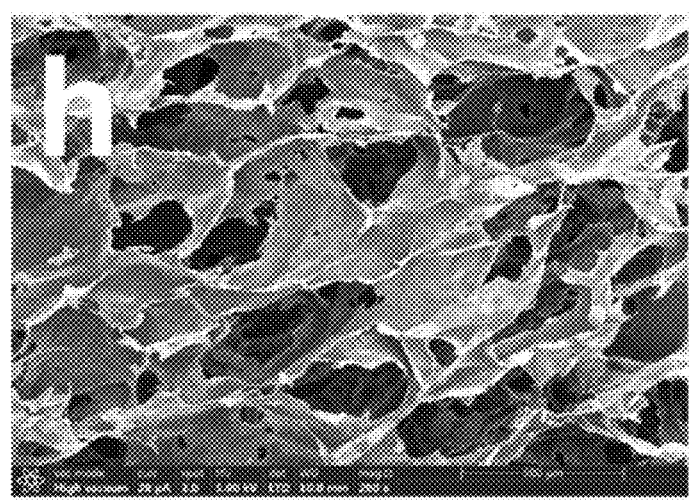
Figure 24I:
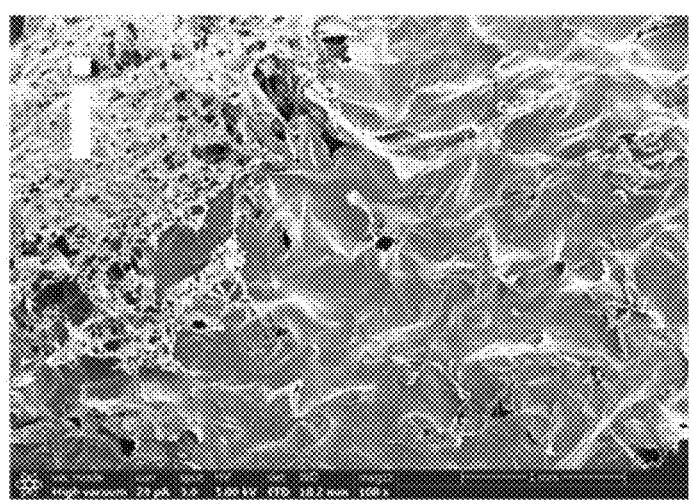
Figure 25A:
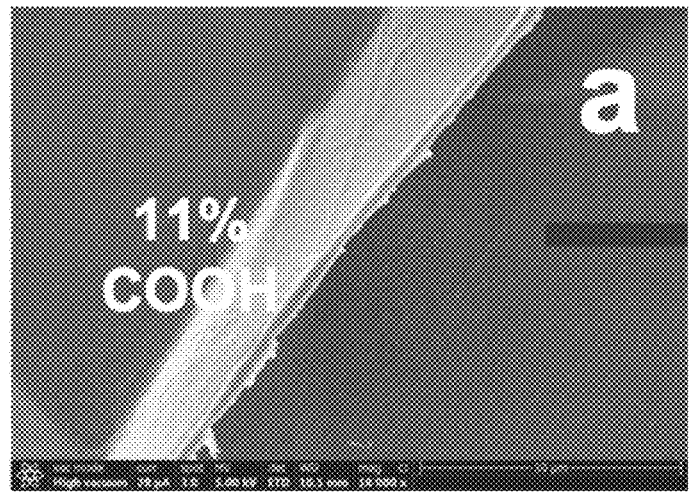
FIG. 25A-25D show the effect of protonation on cellular pore wall thickness and macropore diameter.
Figure 25B:
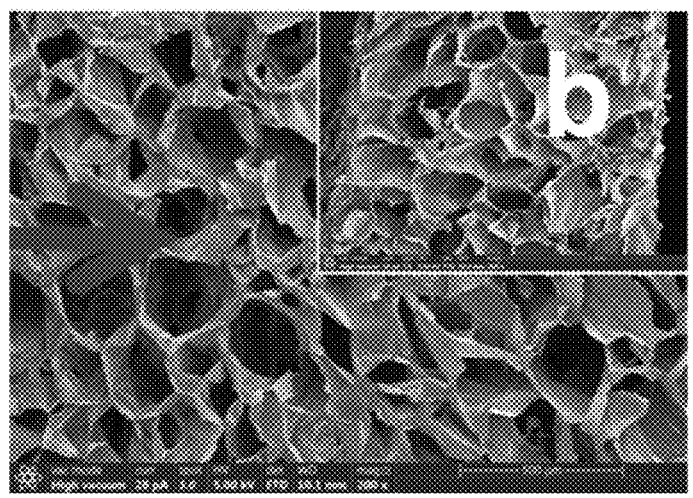
Figure 25C:
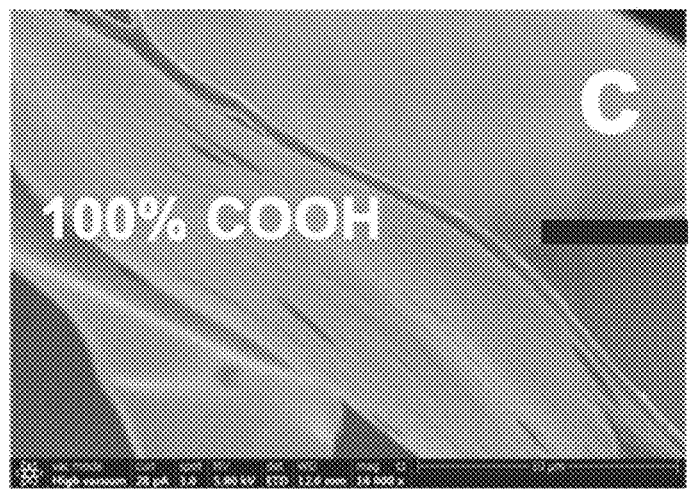
Figure 25D:
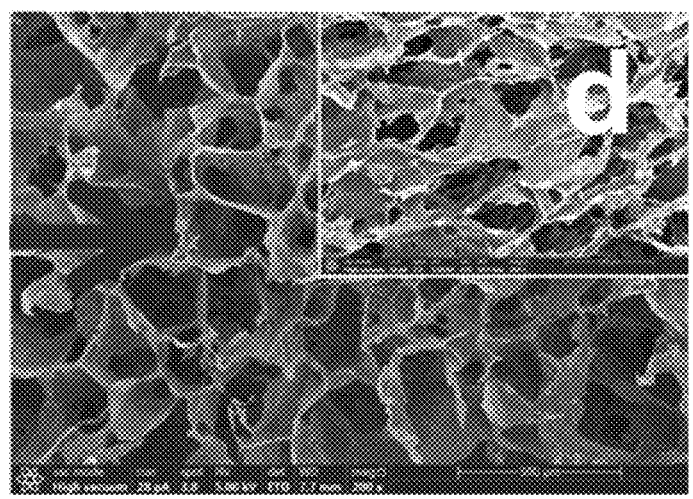
Figure 26A:
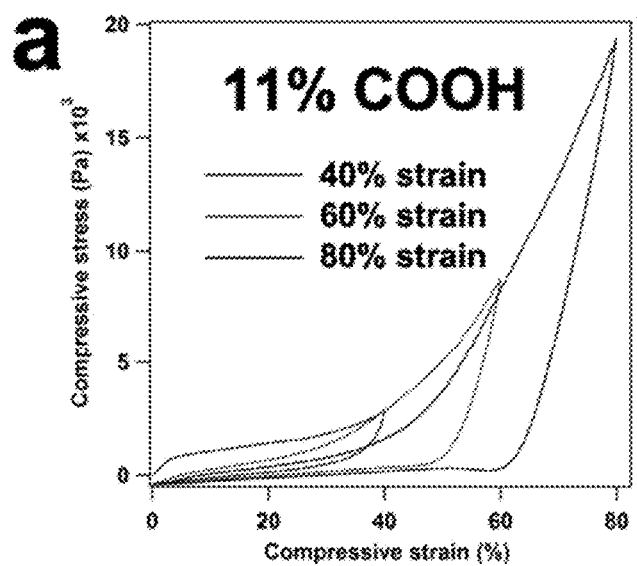
FIG. 26A-26C show the effect of protonation on aerogel wet-strength.
Figure 26B:
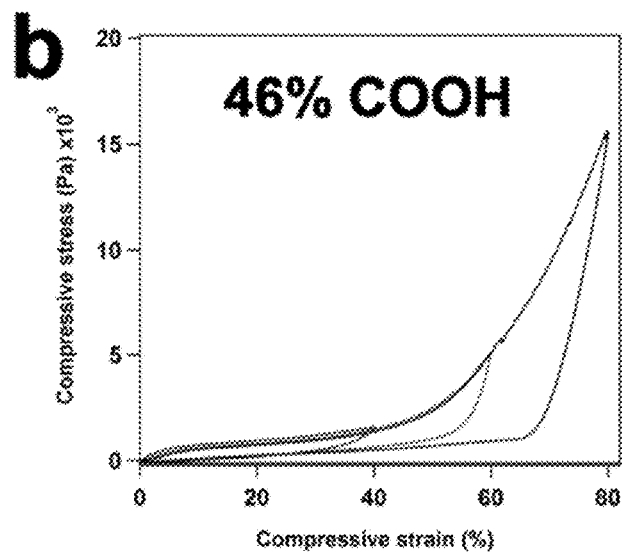
Figure 26C:
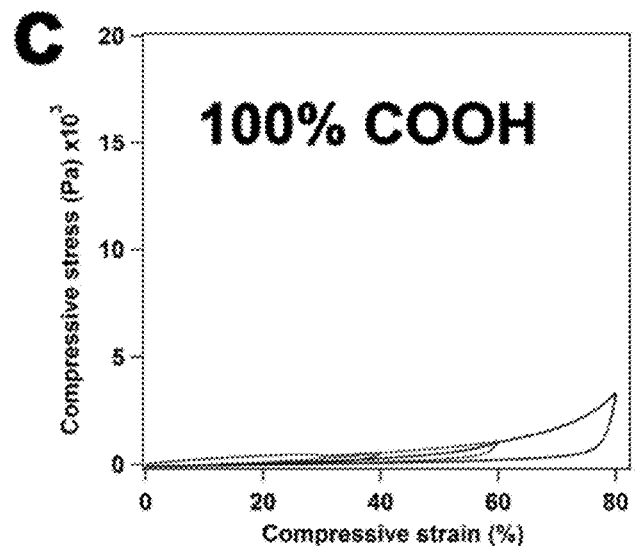
Figure 26D:
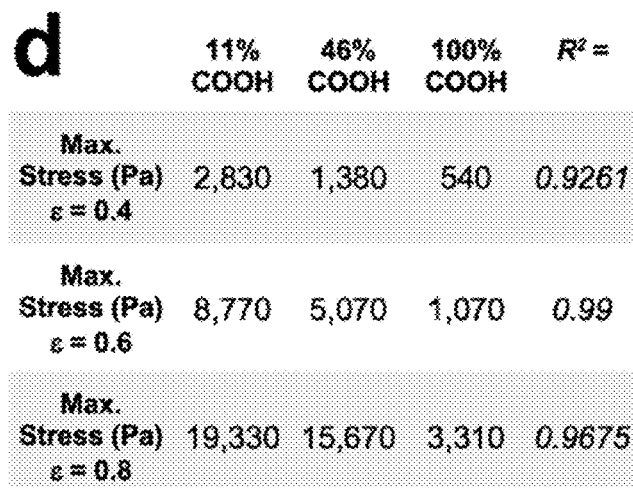
FIG. 26D shows the corresponding maximum stress at 0.4, 0.6, and 0.8 strain as effected by protonation.

Besides, the modified ES cellulose aerogel showed excellent shape recovery properties in organic solvents, enabling recovery or removing of absorbed toluene by simple squeezing and re-using of the aerogel for further absorption. This simple squeezing-reabsorption does lower the reabsorption capacity of the aerogel, but could maintain over 67% of its original absorption capacity in ten cycles (FIG. 21). Therefore, this aerogel is an excellent candidate for oil removal and could be easily recovered.

The ES cellulose aerogel could be facilely carbonized into carbon aerogel to be used for supercapacitor. The specific capacitance of the CNA electrode was calculated to be 103 F/g and 51.3 $mF/cm^2$. The cell voltage was set to be 1 V due to the limitation of aqueous electrolyte. The equivalent series resistance was calculated to be 4.2 Ohms based on the Nyquist plot at 1 kHz.

Example 3. Protonated CNF

Materials and Methods

Materials. Pure cellulose was isolated from rice straw (Calrose variety) to 38% yield by a three-step 2:1 toluene/ ethanol extraction, acidified $NaClO_2$ (1.4%, pH 3-4, 70° C., 6 h) and KOH (5%, 1 day RT, 2 hrs 90° C.) isolation process as reported previously. Hydrochloric acid (HCl, 1 N, Certified, Fisher Scientific), sodium hydroxide (NaOH, 1 N, Certified, Fisher Scientific), sodium hypochlorite solution (NaClO, 11.9%, reagent grade, Sigma-Aldrich), 2,2,6,6-tetramethylpiperidine-1-oxyl (TEMPO, 99.9%, Sigma-Aldrich), sodium bromide (NaBr, BioXtra, 99.6%, Sigma-Aldrich), decane (Certified ACS, Fisher Scientific), and chloroform (HPLC grade, EMD) were used as received. All water used was purified by Mili-Q plus water purification system (Milipore Corporate, Billerica, MA).

CNFs Isolation and Protonation. Cellulose nanofibrils (CNFs) were isolated from pure rice straw cellulose via TEMPO-mediated oxidation followed by mechanical blending. Briefly, 1.0 g of rice straw cellulose was oxidized in an aqueous solution of 0.016 g TEMPO, 0.1 g of NaBr, and 5 mmol NaClO at pH 10.0. Following termination of oxidation, the reaction mixture was neutralized to pH 7.5 using 0.5 N HCl. After centrifugation and dialysis, TEMPO-oxidized cellulose was blended (Vitamix 5200, Vitamix Corporation) at 37 000 rpm for 30 min and centrifuged (5000 rpm, 15 min) to collect the supernatant. Protonation of surface carboxyls was tuned by adding specific amounts of 0.1 N HCl to dilute CNF dispersions, stirring for 30 min, then followed with dialysis. All dispersions were concentrated using a rotary evaporator (Buchi Rotavapor R-114) to 0.6 wt % and stored at 4° C. for aerogel fabrication.

Aerogel Preparation. Aerogels were prepared as previously reported. Briefly, 0.6 wt % concentration of aq. CNF suspensions were frozen (−20° C., 15 h), then lyophilized (−47° C., 0.05 mbar, 2 days, Free Zone 1.0 L Benchtop Freeze Dry System, Labconco, Kansas City, MO) to yield CNF aerogels.

Characterizations. For aqueous state CNF suspensions, a OAKTON pH/CON 510 series meter with probe was used to measured ionic conductivity. Regarding solid state CNFs, cylindrical aerogels were cut into 10 mm long sections. The dimensions (length and width) and mass were measured using a digital caliper and balance to 0.01 mm and 0.1 mg resolution, respectively, to calculate the aerogel density ($\rho_a$, mg $cm^{-3}$). The porosity was calculated as:

$$\text{Porosity (\%)} = \left(1 - \frac{\rho_a}{\rho_c}\right) \times 100\% \quad (1)$$

where $\rho_c$ is the bulk density of cellulose taken as 1600 mg/$cm^3$. The amphiphilic liquid affinity was examined by measuring the liquid absorption capacity (g/g) of CNF aerogels as:

$$\text{Measured absorption capacity} = \frac{(w_e - w_o)}{w_o} \quad (2)$$

where $w_e$ and $w_o$ are weights of fully saturated and dry aerogels, respectively. The pore volume of aerogels was calculated as $$\text{Pore volume} = \frac{\text{Porosity}}{\rho_a} \quad (3)$$

Aerogel pore morphology was characterized using scanning electron microscopy (SEM). Aerogels were mounted on conductive carbon tape and imaging performed on a Quattro Environmental SEM-FEG (ThermoFisher). A powder diffractometer (PANanalytical, Malvern Panalytical) was used for wide angle X-ray diffraction (XRD) of aerogels with length of 5 mm compressed to 1 mm thick sheets between glass slides and scanned from 5 to 40° in a continuous mode using Ni-filtered Cu K$\alpha$ radiation ($\lambda$=1.5406 Å) at an anode voltage of 45 kV and a current of 40 mA. The crystallinity index (CrI) was calculated from the peak intensity of the 200 crystalline plane peak ($I_{200}$, 2$\theta$=22.6°) and the intensity minimum between the 200 and 110 ($I_{am}$, 2$\theta$=18.7°) peaks using the following empirical equation:

$$CrI = \frac{I_{200} - I_{am}}{I_{200}} \times 100\% \quad (4)$$

The mechanical behavior of CNF aerogels was measured with a 5566 Instron universal testing machine at a constant 2.5 mm min$^{-1}$ compressive strain rate and 2.5 N load cell with two flat-surface compression stages. Cylindrical aerogels of 10 mm length were compressed incrementally at 0.4, 0.6 and 0.8 strain.

Results and Discussion

CNF Characteristics. Pure rice straw cellulose was defibrillated in water by one coupled TEMPO-mediated oxidation and mechanical blending to yield at near complete conversion of cellulose nanofibrils (CNFs). Neutralization to pH 7.5 at the end of the reaction protonated 11% of the total 1.17 mmol COOH g$^{-1}$ surface carboxyl groups to free carboxyls. Further protonation with 0.1 N HCl produced CNFs with 0.54 and or 0.18 mmol-COOH g-1 or 46 and 100% surface carboxyl COOH. The dimensions of CNFs are characterized by AFM and TEM to have average thickness of 1.38 nm±0.4, width of 2.49 nm±0.3, and length of up to 1 μm.

Aerogel Structures and Morphology. Aqueous CNFs (0.6%) were frozen (−20° C., 15 h) in borosilicate glass tubes, then freeze dried (−47° C., 0.05 mbar, 2 d) into white aerogels. With increasing protonation, the diameters of aerogels were closer to the 14-mm ID of the glass tubes, i.e., less shrinkage, leading to lower densities of 8.0, 6.6 and 5.2 mg/cc, porosities as well as pore volumes of 123, 153 and 196 cc/g for 11, 46 and 100% protonated CNFs, respectively (Table 1). The relationship between pore volume and protonation was linear ($R^2$=0.99). These improved pore volumes are also reflected in increased absorption of polar (water) and non-polar (chloroform, decane) liquids. While aerogel from the more charged CNFs absorbs more water (103 mL/g) than the non-polar (86, 78 mL/g) liquids, i.e., slightly more hydrophilic, those from the more protonated CNFs become more balanced amphiphilic. Increasing protonation from 11 to 46 and 100% protonated also improve wet stability of aerogels for 18 h to 24 h and over 32 h. All aerogels-remain intact at pH 2 and in decane for at least 30 days and more stable under acidic conditions

TABLE 1

The effect or protonation on aerogel properties, aerogel shape retention, and cell geometry and surface chemistry.

| Protonation | 11% COOH | 46% COOH | 100% COOH |
|---|---|---|---|
| Diameter (mm) | 12 ± 0.1 | 12.3 ± 0.1 | 13.1 ± 0.1 |
| Density (mg/cc) | 8.0 ± 0.6 | 6.6 ± 0.8 | 5.2 ± 0.8 |
| Porosity (%) | 99.5 ± 0.0 | 99.6 ± 0.1 | 99.7 ± 0.1 |
| Pore volume (cc/g) | 123 ± 8.5 | 153 ± 19.0 | 196 ± 31.1 |
| Water absorption (mL/g) | 103 ± 7.2 | 117 ± 17.4 | 166 ± 19.3 |
| Decane absorption (mL/g) | 78 ± 4.3 | 119 ± 22.9 | 163 ± 29.2 |
| Chloroform absorption (mL/g) | 86 ± 10.9 | 113 ± 26.1 | 154 ± 23.1 |
| wet stability: pH 10 | 18 h | 24 h | >32 h |
| wet stability: pH 7 | 24 h | 24 h | >32 h |
| wet stability: pH 5.7 | 48 h | 5 days | >30 days |
| wet stability: pH 2 | >30 days | >30 days | >30 days |
| wet stability: decane | >30 days | >30 days | >30 days |

All aerogels showed isotropic pore morphologies, i.e. similar macro-scale pores in both radial and longitudinal cross-sections (FIG. 24A-24I). Closer examination by SEM of aerogel cross-sections showed slightly increasing pore diameters with increasing protonation; i.e. smaller pore diameter (207±48 μm) of that from 11% COOH to larger pore diameter (227±45 μm) of the 100% COOH CNF aerogels. The cellular pore wall thickness decreased with increasing protonation; i.e. from 835±371 to 522±171 nm for the 11 and 100% COOH aerogels, respectively (FIG. 25A-25D).

Wet Compression Strength. All aerogels were readily and fully saturated when immersed in water and their wet-strength measured by cyclic loading and unloading compressions. Aerogels at all protonation levels withstood over 0.8 compressive strain, showing near complete recovery once the load was released. Specifically, the unloading curves returned to zero at $\varepsilon$=0 at all three 0.4, 0.6 and 0.8 incremental strains, showing complete shape recovery even at high strains. In addition, all aerogels display inverse linear relationships of their wet-compressive strength at all strain levels with increasing protonation. At 0.8 strain the compressive stress of the 11, 46, and 100% COOH aerogels were 19.3, 15.7, and 3.3 kPa, respectively (FIG. 26A-26D). The lower wet compressive strength of the more protonated CNF aerogels may be attributed to lower densities and thinner cell wall geometry.

Our previously reported 25.3 kPa maximum compressive stress at $\varepsilon$=0.8 for the aerogel with similar density (8.1 mg cm$^{-3}$) and protonation level (11% COOH), but from more oxidized (1.29 mmol g$^{-1}$) CNF. The slightly higher compressive stress of 25.3 kPa than 19.3 kPa of lower oxidation (1.17 mmol g$^{-1}$) at comparable density and protonation suggest the level of oxidation influences such property.

Figure 27A:
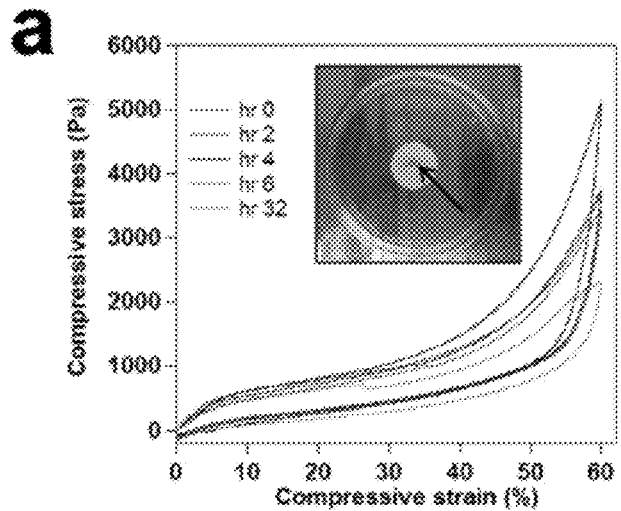
FIG. 27A show water immersion (pH 5.7) on the compressive wet-strength and dimensional integrity of 11% COOH aerogel with inset image showing core fraction following 32 h compressive test.
Figure 27B:
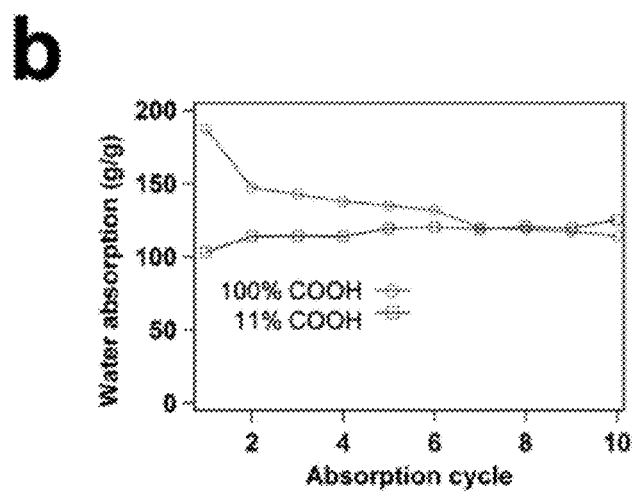
FIG. 27B shows the effect of protonation on aerogel cyclic water absorption and capacity retention.
Figure 27C:
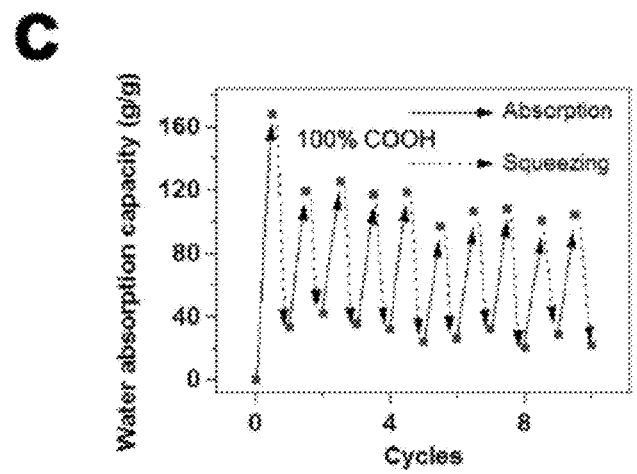
FIG. 27C shows additional absorption-squeezing of 100% COOH aerogel showing progressive loss of absorptive capacity and shape recovery attributed to aerogel ductility

Aerogels fully saturated and immersed in water (pH 5.7) disintegrated within 24-48 h under static state and can be quickened to 24-32 h under agitation. The wet-compressive strength of aerogels fully immersed in water under cyclic loading-unloading at $\varepsilon$=0.6 strain over time (0, 2, 4, 6 and 32 h) show similar hysteresis, but lowered maximum stress (FIG. 27A-27C). The compressive strength reduced by over a quarter within the first 2 hours, i.e. from approximately 5 kPa to 3.5 kPa. At 32 h the maximum wet compressive stress at 6=0.6 strain was halved, and the loading curve showed an aberration to which was attributed the fracturing of the aerogel at its core (FIG. 27A, inset). Hence, while the 11% protonated aerogels are capable of cyclic absorption-squeezing with fully recoverable pore structure to maintain high absorptive capacity, the maximum stress at ε=0.6 strain deteriorate over time.

Most impressively, is that aerogel wet stability was enhanced by either protonation of the CNFs, or increased acidity of the immersing media. Remarkably, as well, was that superior wet stability of aerogels could be achieved when saturated and immersed in nonpolar and aliphatic decane, which could open new opportunities for application in other organic liquids.

Figure 28A:
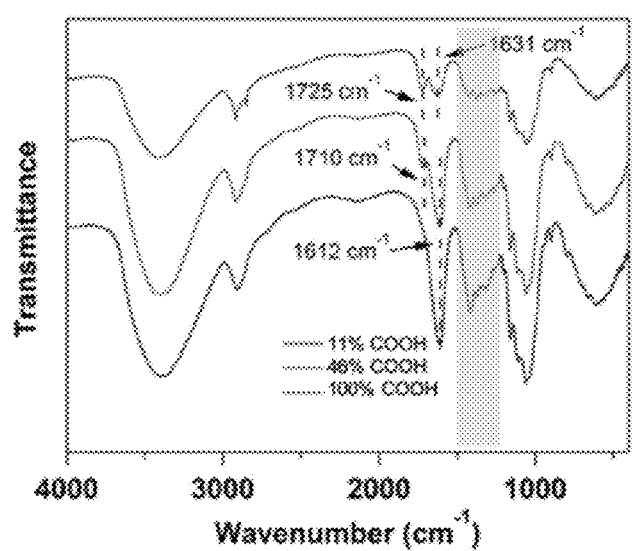
FIG. 28A shows the effect of protonation on aerogel chemistry, thermal behavior, and recrystallization in an FTIR spectra of CNF aerogels from 0.6% wt CNF suspension.

Characterization of Aerogels by FTIR, TGA and XRD. FTIR spectra of all three CNF aerogels showed typical cellulose characteristics peaks at 3394 $cm^{-1}$ (O—H stretching), 2911 $cm^{-1}$ (C—H stretching), 1477 $cm^{-1}$ (H—C—H and O—C—H in-plane deformation), 1371 $cm^{-1}$ (C—H deformation vibration), 1317 $cm^{-1}$ (H—C—H wagging vibration), 1201 $cm^{-1}$ (C—O—H in-plane deformation), 1163 $cm^{-1}$ (C—O—C asymmetric bridge stretching of the 3-glycosidic linkage), 1057 $cm^{-1}$ (C—O—C pyranose ring skeletal vibration), and 897 $cm^{-1}$ ($C_1$—O—$C_4$ deformation of the β-glycosidic linkage) (FIG. 28A). The major spectral differences among the three CNF aerogels resided at 1725 and 1612 $cm^{-1}$, corresponding to the respective carbonyl stretching in COOH and $COO^-Na^+$. A sharp peak at 1612 $cm^{-1}$ for the 11% COOH spectrum was indicative of substantial sodium carboxylate content to overlap with the O—H deformation peak corresponding to absorbed water, generally appearing around 1632 $cm^{-1}$. As surface COOH content was increased from 11% to 46%, a small peak was observed at 1710 corresponding to the COOH carbonyl stretching. The disappearance of the 1612 $cm^{-1}$ peak in the 100% COOH spectrum further confirmed the complete $COO^-Na^+$ to COOH conversion, consistent with the conductometric titration data, and with the O—H deformation of hygroscopic water reappearing at 1631 $cm^{-1}$.

Figure 28B:
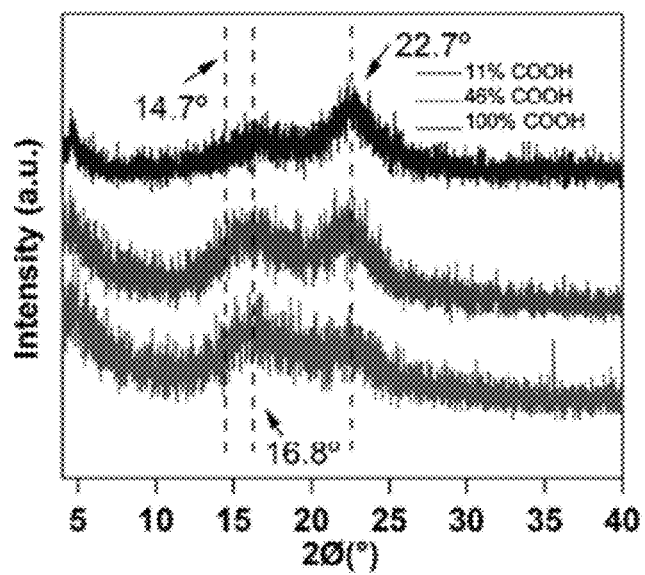
FIG. 28B shows the effect of protonation on aerogel chemistry, thermal behavior, and recrystallization in an XRD spectra of CNF aerogels from 0.6% wt CNF suspension.
Figure 29A:
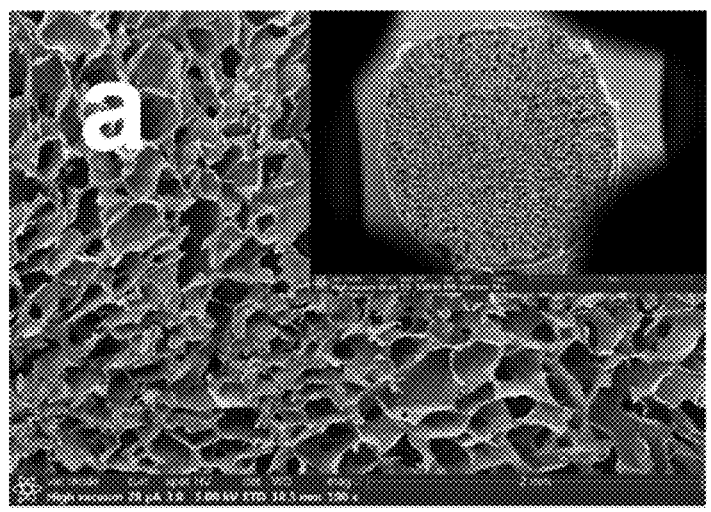
FIG. 29A-29F show the effect of interfacial tube properties on 11% COOH aerogel morphology.
Figure 29B:
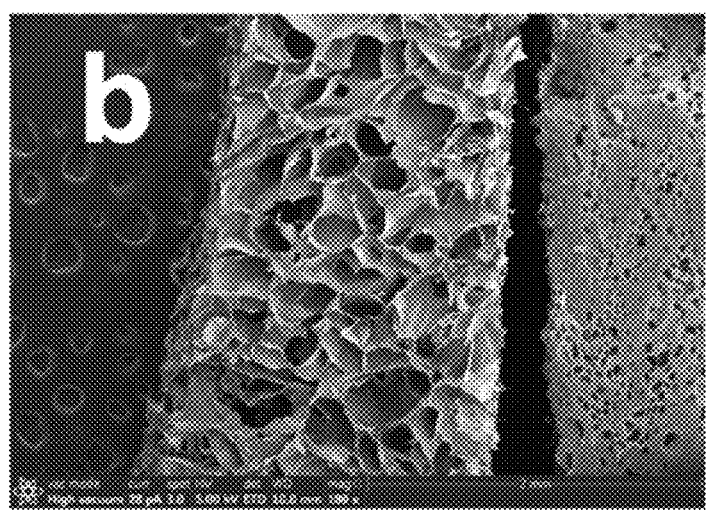
Figure 29C:
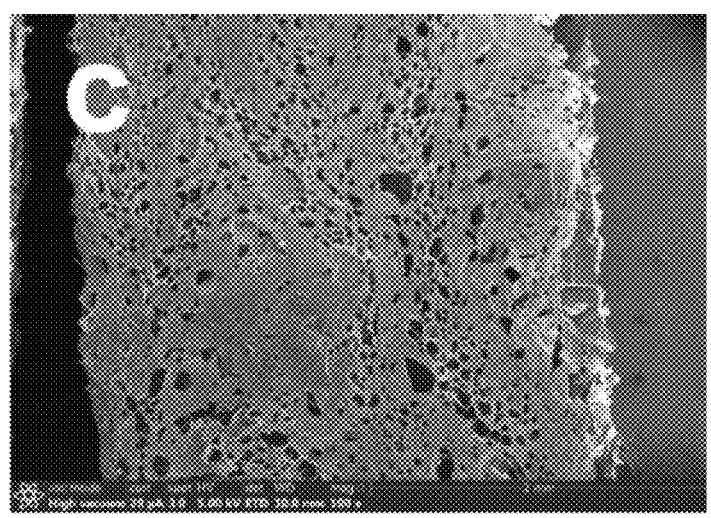
Figure 29D:
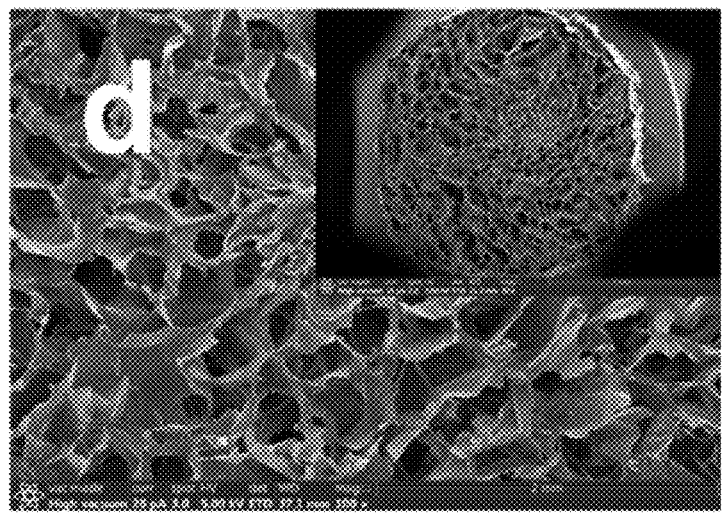
Figure 29E:
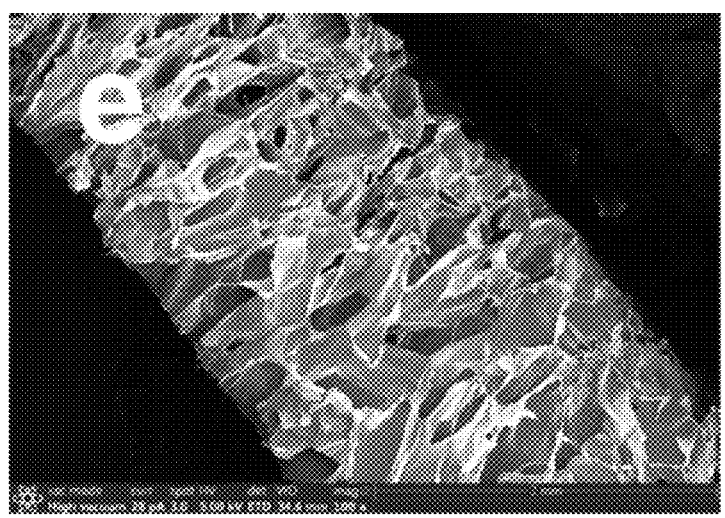
Figure 29F:
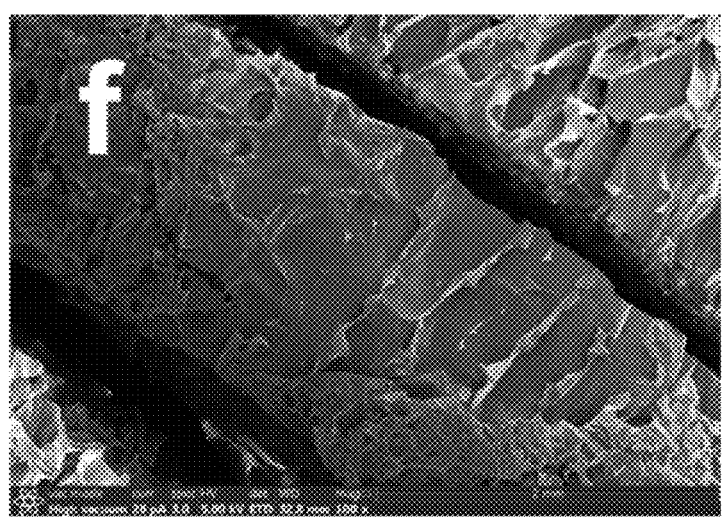
Figure 30A:
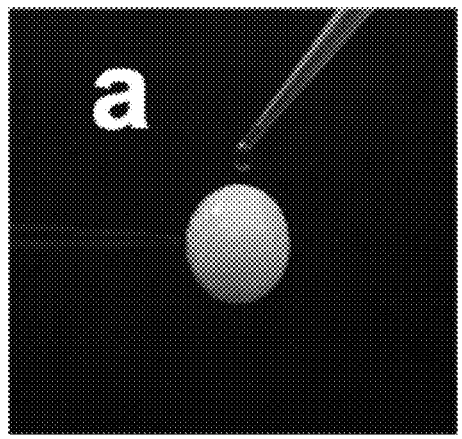
FIG. 30A-30F show the effect of hydrophilic versus hydrophobic tubes on 11% COOH aerogel morphology and external wetting behavior.
Figure 30B:
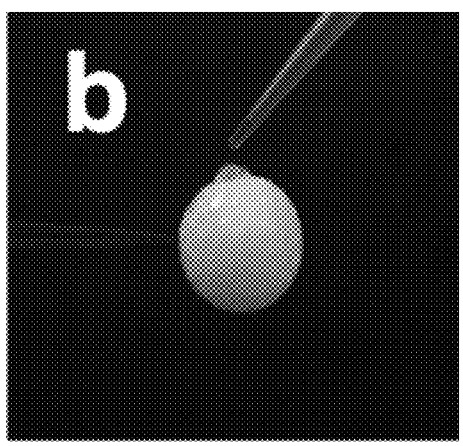
Figure 30C:
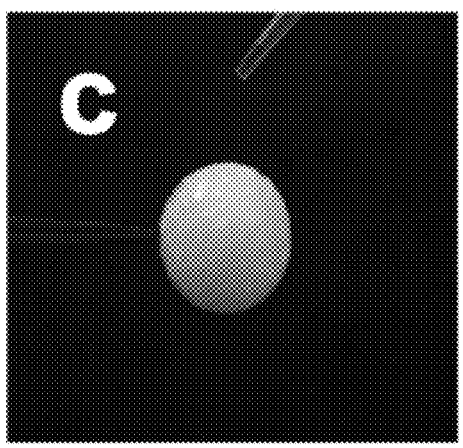
Figure 30D:
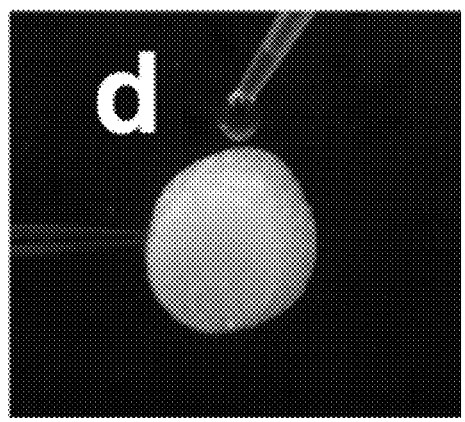
Figure 30E:
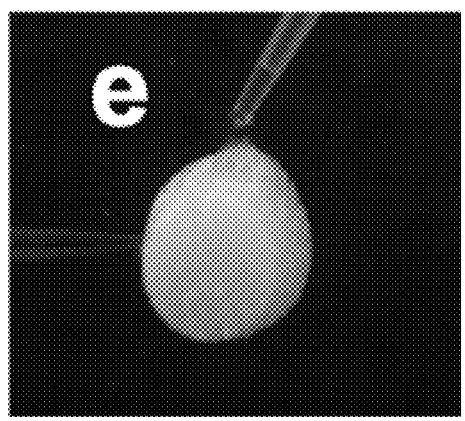
Figure 30F:
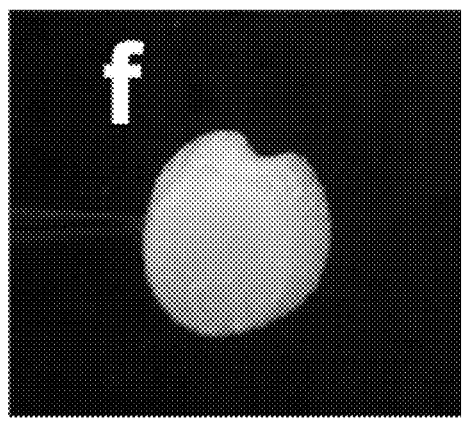

All aerogels exhibit characteristic cellulose Iβ crystal structure, showing peaks at around 14.7, 16.8 and 22.7° assigned to the 110, 110, and 200 crystallographic planes of the monoclinic lattice (FIG. 28B). The crystallinity index (CrI) of the starting cellulose is 84.4%; and that of the 11% COOH is 75.4% and those of the 46% COOH and 100% COOH are 72.5 and 71.2%, very slight decrease with increasing protonation. The thermal stability of the aerogels were improved with increasing protonation was examined using TGA (FIG. 28C-28D).

Aerogel Structure and Surfaces as Affected by Tubes. The 11% COOH CNFs were fabricated into aerogels in hydrophilic borosilicate glass or hydrophobic polypropylene (PP) tubes, both 14 mm in diameter. The aerogel from glass showed uniform honeycomb pore morphology internally and on the surface whereas that from PP displayed heterogeneous and concentric internal pore structure but nonporous surface (FIG. 29A-29F). While the aerogel formed in glass showed rapid wetting, transport and retention by water without any change in aerogel dimension that formed in PP displayed a concave indent upon deposition of a 10 μL droplet of water, attributed to the nonporous surface and larger and more heterogeneous peripheral macropores toward smaller pores at the core of the aerogel (FIG. 30A-30F).

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A method for preparing an aerogel or a foam, the method comprising:
   (a) freezing an aqueous suspension comprising cellulose nanofibrils, cellulose sub-micron fibers, or a combination thereof,
   (b) freeze-drying the frozen suspension, thereby forming an aerogel or foam; and at least one of the following:
   (c1) contacting the aerogel or foam with an organosilane under conditions sufficient to deposit the organosilane onto the aerogel or foam; or
   (c2) heating the aerogel or foam under conditions sufficient to carbonize the aerogel or foam.

2. The method of claim 1, wherein the cellulose sub-micron fibers are prepared by a method comprising electrospinning a cellulose ester, hydrolysis of the electrospun ester, and mechanical dispersion.

3. The method of claim 1, wherein the concentration of cellulose nanofibrils, cellulose sub-micron fibers, or combination thereof in the suspension is between about 0.01% and 10% by weight.

4. The method of claim 1, wherein the suspension is frozen at a temperature of about −50° C.

5. The method of claim 1, wherein the organosilane is methyltrichlorosilane.

6. The method of claim 1, wherein depositing the organosilane onto the aerogel or foam comprises contacting the aerogel or foam with the organosilane at a temperature of about 85° C. for about 30 minutes under a vacuum.

7. The method of claim 1, wherein carbonizing the aerogel or foam composite comprises contacting the aerogel or foam composite with nitrogen at a temperature of at least about 800° C. for a period of about 30 minutes.

8. An aerogel or foam prepared by the method of claim 1.

9. A supercapacitor electrode comprising the aerogel or foam of claim 8.

* * * * *